(12) United States Patent
Kassatly et al.

(10) Patent No.: US 11,435,739 B2
(45) Date of Patent: Sep. 6, 2022

(54) INTERFACE AND METHOD FOR CONTROLLING THE OPERATION OF AN AUTONOMOUSLY TRAVELLING OBJECT

(71) Applicants: L. Samuel A Kassatly, San Jose, CA (US); Gabrielle M Kassatly, San Jose, CA (US); Michelle M Kassatly, San Jose, CA (US)

(72) Inventors: L. Samuel A Kassatly, San Jose, CA (US); Gabrielle M Kassatly, San Jose, CA (US); Michelle M Kassatly, San Jose, CA (US)

(*) Notice: Subject to any disclaimer, the term of this patent is extended or adjusted under 35 U.S.C. 154(b) by 0 days.

(21) Appl. No.: 17/318,954

(22) Filed: May 12, 2021

(65) Prior Publication Data

US 2021/0325870 A1  Oct. 21, 2021

Related U.S. Application Data

(63) Continuation-in-part of application No. 16/724,320, filed on Dec. 22, 2019, now Pat. No. 11,048,407, which is a continuation-in-part of application No. 15/427,966, filed on Feb. 8, 2017, now Pat. No. 10,528,797.

(51) Int. Cl.
| | | |
|---|---|---|
| *G06F 3/048* | (2013.01) | |
| *G05D 1/00* | (2006.01) | |
| *G06F 3/0484* | (2022.01) | |
| *G06F 3/04886* | (2022.01) | |

(52) U.S. Cl.
CPC ........ *G05D 1/0038* (2013.01); *G06F 3/0484* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 8,166,421 B2 | 4/2012 | Magal et al. | |
| 8,321,134 B2* | 11/2012 | Al-Saleh | G06T 11/206 702/14 |
| 9,115,968 B1* | 8/2015 | Abruzzo | F42B 30/006 |
| 9,459,697 B2 | 10/2016 | Bedikian et al. | |
| 9,569,001 B2 | 2/2017 | Mistry et al. | |
| 9,740,396 B1* | 8/2017 | Ahaus | G06F 3/04883 |
| 9,986,206 B2 | 5/2018 | Fish et al. | |

(Continued)

*Primary Examiner* — Hua Lu
(74) *Attorney, Agent, or Firm* — S A Kassatly

(57) ABSTRACT

An interface autonomously collects input data to control the operation or travel path of an object, includes a plurality of independently operating sensors that detect the occurrence of an event. A master fractal controller initiates a space-variant fractalization protocol in order to collect the input data related to the detected event. In response to the input, the master fractal controller sends control signals to a servient controller to control the operation or travel path of the object. The master fractal controller initiates the space-variant fractalization protocol by identifying or defining a fractal space, and by further initiating sub-servient fractals in sub-servient spaces, within which an intersection of a graphical function layer that includes an executable grid with a graphical data layer causes a command or function be executed within the sub-servient fractal space.

20 Claims, 46 Drawing Sheets

(56) References Cited

U.S. PATENT DOCUMENTS

| | | | |
|---|---|---|---|
| 2004/0095373 A1* | 5/2004 | Schmidt | G06F 3/0481 715/716 |
| 2006/0284050 A1* | 12/2006 | Busse | G01S 3/783 250/203.1 |
| 2013/0275358 A1* | 10/2013 | Nugent | H04L 45/48 706/45 |
| 2013/0339433 A1* | 12/2013 | Li | G06K 9/00 709/204 |
| 2015/0077433 A1* | 3/2015 | Dai | G06T 3/40 345/629 |
| 2015/0169176 A1* | 6/2015 | Cohen | G06F 3/017 715/852 |
| 2015/0254214 A1* | 9/2015 | Rosenberg | G09B 7/08 715/202 |
| 2015/0260835 A1* | 9/2015 | Widmer | H02J 50/90 342/27 |
| 2015/0380355 A1* | 12/2015 | Rogers | H01L 23/5387 257/773 |
| 2016/0062560 A1* | 3/2016 | Le | G06F 16/21 715/810 |
| 2017/0004662 A1* | 1/2017 | Gong | G05D 1/0055 |
| 2017/0046024 A1* | 2/2017 | Dascola | G06F 3/04845 |
| 2017/0115736 A1* | 4/2017 | Patel | G06F 3/013 |
| 2017/0328679 A1* | 11/2017 | Smith | G05D 1/104 |
| 2017/0328683 A1* | 11/2017 | Smith | F41G 7/308 |
| 2017/0330374 A1 | 11/2017 | Horowitz et al. | |
| 2018/0101278 A1* | 4/2018 | Kandadi | G06F 3/0488 |
| 2018/0164101 A1* | 6/2018 | Villien | G01C 21/16 |
| 2018/0286035 A1* | 10/2018 | Kozicki | C08G 83/002 |
| 2019/0011989 A1 | 1/2019 | Schwesig et al. | |
| 2019/0138018 A1 | 5/2019 | Cave | |
| 2019/0176837 A1 | 6/2019 | Williams et al. | |
| 2019/0257939 A1 | 8/2019 | Schwesig et al. | |
| 2019/0314641 A1 | 10/2019 | Malchano et al. | |
| 2020/0197855 A1* | 6/2020 | Davis | A61B 5/082 |

\* cited by examiner

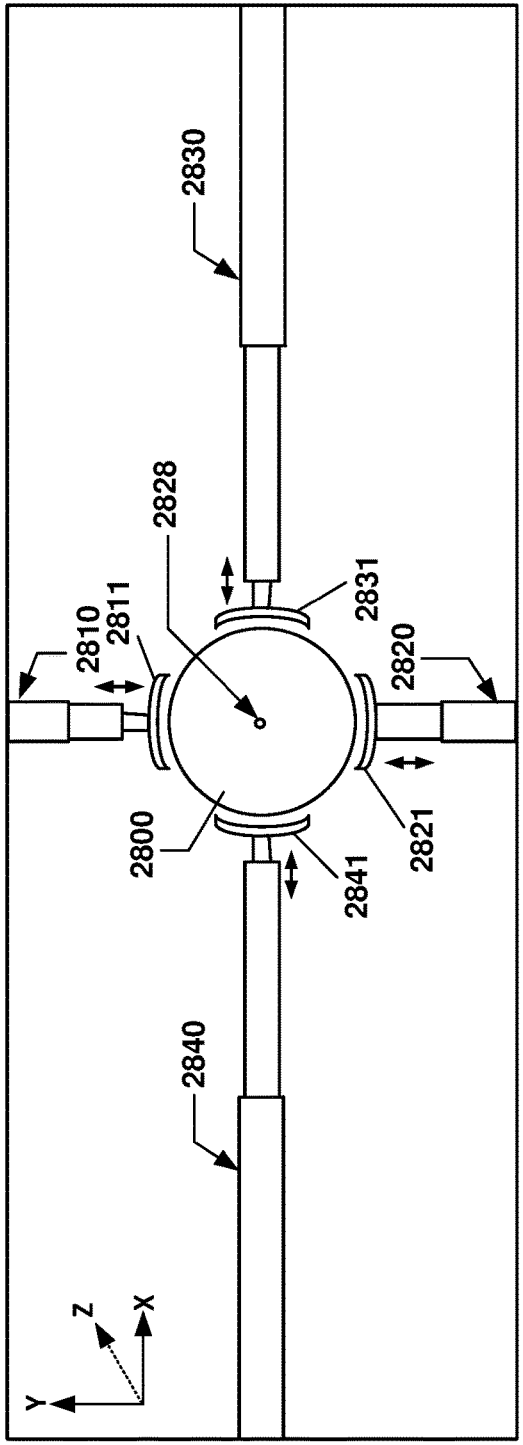
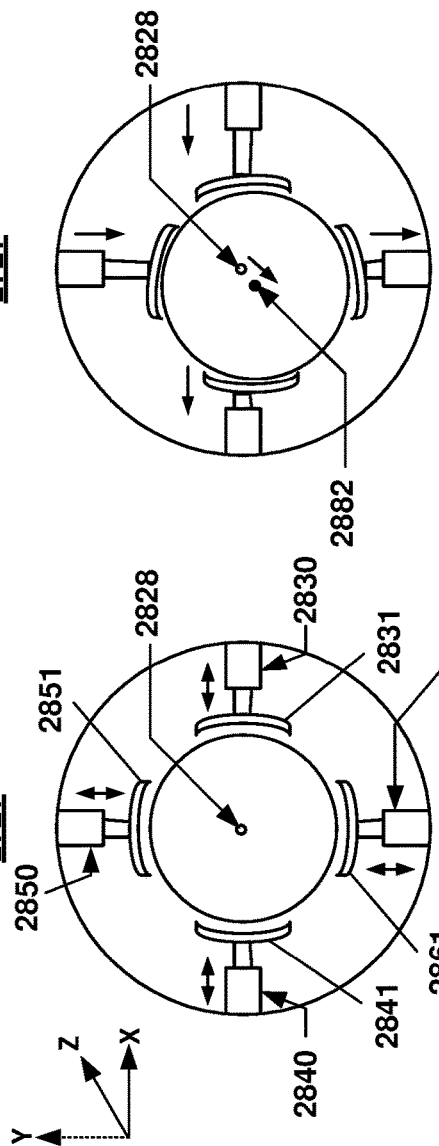
FIG. 28
FIG. 30
FIG. 29

| BLADE 1 (X) B1X | BLADE 1 (Y) B1Y | BLADE 1 (Z) B1Z | BLADE 2 (X) | BLADE 2 (Y) | BLADE 2 (Z) |
|---|---|---|---|---|---|
| BLADE 1 (-X) B1-X | BLADE 1 (-Y) B1-Y | BLADE 1 (-Z) B1-Z | BLADE 2 (-X) | BLADE 2 (-Y) | BLADE 2 (-Z) |
| BLADE 3 (X) | BLADE 3 (Y) | BLADE 3 (Z) | BLADE 4 (X) | BLADE 4 (Y) | BLADE 4 (Z) |
| BLADE 3 (-X) | BLADE 3 (-Y) | BLADE 3 (-Z) | BLADE 4 (-X) | BLADE 4 (-Y) | BLADE 4 (-Z) |

FIG. 37

ASCENDING FRACTALIZATION

DESCENDING FRACTALIZATION

INTERFACE AND METHOD FOR CONTROLLING THE OPERATION OF AN AUTONOMOUSLY TRAVELLING OBJECT

CROSS-REFERENCE TO RELATED APPLICATION

This application is a continuation-in-part of U.S. patent application Ser. No. 16/724,320, filed on Dec. 22, 2019, titled "Interface And Method For Self-Correcting A Travel Path Of A Physical Object," now issued as U.S. Pat. No. 11,048,407 on Jun. 29, 2021, which in turn, is a continuation-in-part of co-pending U.S. patent application Ser. No. 15/427,966, filed Feb. 8, 2017, titled "Social Medium, User Interface, And Method For Providing Instant Feedback Of Reviewer's Reactions And Emotional Responses," now issued as U.S. Pat. No. 10,528,797, both of which parent applications are incorporated herein in their entireties by this reference, as well as this application claims the priority dates of both of its parent applications.

FIELD OF THE INVENTION

The present invention relates in general to the field of inputting, selecting, and executing operations and commands on a computing device or a user interface, and in particular to a system, social medium, user interface, and associated method for providing instant feedback of reviewer's reactions and emotional responses.

BACKGROUND OF THE INVENTION

The field of social media has pervaded our lives in an unprecedented way. It enables us to communicate instantly for various purposes, such as to execute a business transaction or simply to chat. A sender can, for example, transmit a text message and expect an almost instantaneous text message response back from the receiver.

Such communication is an example of what is termed herein as "blind communication" because it does not allow one or more parties to such communication to actually view and experience the physical reactions of the other party while responding to a blind communication.

In the foregoing example, the sender of the text message is unable to view the receiver's reaction to the sender's text message. This constitutes a shortcoming in the field of communication, in that communication relies heavily on verbal and non-verbal cues, such as physical reactions, body language, and emotions.

As a result, emojis have been introduced for the parties to express their sensations, feelings, and reactions. However, no matter how communicative and entertaining these emojis are, they remain deficient in that they do not necessarily reflect the communicating party's true emotions.

In addition, conventional processes of inputting data into a computing device include such methods as entering and executing data manually such as by typing or using an instrument such as a stylus or a keyboard. Data entry and execution can also be done using free space gesturing, as described for example in the following U.S. patents and U.S. patent applications, all of which are incorporated herein in their entireties:

U.S. Pat. Nos. 8,166,421; 9,459,697; 9,569,001; and
U.S. Patent Applications: 2015/0169176; 2017/0330374; 2018/0101278; 2019/0011989; and 2019/0257939.

However, all of these input methods lack the flexibility and continuity in inputting data and executing commands whether sequentially or out of order. Such flexibility and continuity will enhance the conventional systems and will significantly facility the entry of data and instructions on computing devices, and render the associated easier to end users, such as handicapped patients.

Much effort has been spent attempting to improve upon the accuracy of long range artillery munitions, such as projectiles. With the development of semiconductors and the integrated circuits, it has become possible to install embedded controllers to measure in-flight dynamics and to correct for inaccuracies and disturbances as integral components of the artillery rounds. Factors that contribute to the increased flight dispersion are winds aloft (meteorological data), propellant temperature variations, and marginal errors in gun elevations.

Winds aloft present one form of disturbance in that crosswinds can send a projectile left or right relative to the intended target, and head and tail winds can propel the projectile too far or too short of the intended target.

Recently, different propellants have been used, some combust more quickly and propel the projectiles out of the cannon at higher velocities than others. As a result, resources have been dedicated to characterize the different production lots of propellants, as they leave the factory. Ambient temperature also affects the propellant in a gun in that a hot propellant typically produces increased muzzle velocities, while a cold propellant produces lower muzzle velocities.

In addition to external dynamics, there are issues that affect the performance of the electronics installed within the projectiles. For inertial sensors, the severe gun-launch environment often produces permanent bias shifts in the measured acceleration of the projectiles. Additionally, the high spin rate of the stabilized projectiles may also affect the readings on a sensor, by adding spurious centrifugal forces to the sensor that are not, in reality, affecting the projectile.

One method to improve the accuracy of the projectile is to install GPS receivers that input an accurate estimate of the physical location of the projectile into the controller. However, incorporating guidance into artillery rounds increases the cost of the entire system.

GPS denial is a modern concern, between land/space based intentional jamming of signals by adversarial actors, solar activity also can prevent GPS signals from being received or correctly interpreted. However, should the electronics on-board the projectile be duds, then the projectile will fly past the intended target and potentially cause collateral damage.

U.S. Pat. No. 9,115,968 B1, which is incorporated herein by this reference, describes an exemplary projectile that is capable of autonomously self-correcting its course toward an intended target, during flight. There still remains a need for an alternative course, self-correcting interface and method for use in projectiles, vehicles, drones, and similar systems.

SUMMARY OF THE INVENTION

The present disclosure addresses the above-identified concerns, and presents a novel system, device, processor implemented utility, social medium, user interface, a computer-implemented method of operation, workflow, and application residing on a non-transitory computer-readable medium (also collectively referred to herein as "user station"), for inputting, selecting, and executing operations and commands on a computing device or a user interface, and more specifically for providing instant feedback of reviewer's reactions and emotional responses, such as providing instant and automatic feedback of reviewer's verbal and non-verbal cues, reactions and emotional responses.

According to one embodiment of the present invention, data is inputted via a gridded user interface that enables a user to effect complete operations (or functions) with a single digit (or instrument, such as a pen) by continuously swiping the digit across the touchscreen, without interrupting the swipe and without removing the digit from the touchscreen.

To this end, the present invention describes a user interface for use in a user station to communicate with other user stations by means of a single uninterrupted, continuous, swiping motion while in continuous contact with the user interface, includes a contacts selection module that enables a user to select desired recipient contacts. In another embodiment, the swiping motion does not need to be continuous or single or uninterrupted. A response selection module, R, authorizes the acquisition of the user's reaction. A reaction module captured the user's authorized reaction. A message selection module, M, enables the selection of the user's message. A query selection module, Q, enables the selection of the user's query to be selectively transmitted to said other user stations. An object transmission module selectively transmits the user's authorized reaction, the user's optional message, and the user's query to the other user stations.

It should be understood that the user is able to send a message to himself/herself; to edit his/her reaction; to delete his/her reaction; to mark his/her and the received messages and reactions as read or unread; to use emojis, gifs, or videos as a reaction. In other terms, the user's reaction is not limited to the user's actual reaction but it can be a selected video, memory, photo, or any other object or file from a database on or associated with the user station. In one embodiment, the video length may be either set by the recipient user, by the sender user, by the recipient's user station, or manually.

The user interface includes an executable grid that defines the contact selection module, the response selection module, the message selection module, and the query selection module. In one embodiment, the executable grid is defined by at least one executable outline (or line). According to another embodiment, the at least one executable outline defines at least two executable quadrants.

In addition, the present invention is not limited to communications with other user stations, but could alternatively be used on the user's own station. As an example, while the user is running an application on the user station, the user's real time reactions are monitored by the user station or another device, so that the user's real time reactions can trigger a response, a reaction, or an application on the user's station. For illustration purpose, as the user is playing a video game, a look of fear, anticipation, or any other expression, as determined by facial recognition i.e., widened pupils, sweating, heart racing, heart beat, heat emitted from the hand, eye movement, movement of the body, breathing rate causes the video game to interact and respond in a certain way. In addition, the camera (or other devices) of the user station may also collect data such as environmental data, lighting, temperature, pressure, location, etc. For learning videos, if the student becomes stressed, the program could "go easier" on the student. For action video games, if the player is scared, the application reduces the amount of violence in the video games. Alternatively, if the player or student appears to become bored, the application increases the learning pace, or the amount of action, lights, and flashing excitement triggers in the video games. This would allow the present invention to be used as part of numerous devices, including but not limited to a video game console, an application on a smart phone, etc.

An additional feature of the present invention is that it enables the narrowing of the search result. As an example, if a user station receives several messages in addition to the messages saved on his/her user station, the user might need to conduct a search for the most appropriate messages to forward to other users or to view. In this case, the user station provides a random search function that can be narrowed down by successive steps. As an example, the user can enter or select the desired search terms, and then select a random search button on the user interface to conduct the first random search. This first random search will use the search terms and in addition, use a Gaussian spatial distribution to select nearby results. A second random search may be similarly conducted on the first random search result in order to further narrow down the search result. Similar successive random searched may be conducted until the desired convergence limits or parameters are attained, at which time, the final search result is attained. This search method may be used in games or applications that used random selection, such as lottery, dating applications, social networking, etc.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 28 is a top two-dimensional view of the course self-correcting mechanism of FIG. 27 shown in a resting position;

FIG. 29 is a side two-dimensional view of the course self-correcting mechanism of FIG. 28 shown in a resting position;

FIG. 30 illustrates the side two-dimensional view of the course self-correcting mechanism of FIG. 29 shown in an offset position that changes the center of gravity of the projectile in order to alter its flight path;

FIG. 37 provides real-time positional values of the four blades of FIG. 33 in three-dimensional space;

It should be understood that the sizes of the chart and the different components in the figures might not be in exact proportion, and are shown for visual clarity and for the purpose of explanation.

DETAILED DESCRIPTION OF PREFERRED EMBODIMENTS

Figure 1:
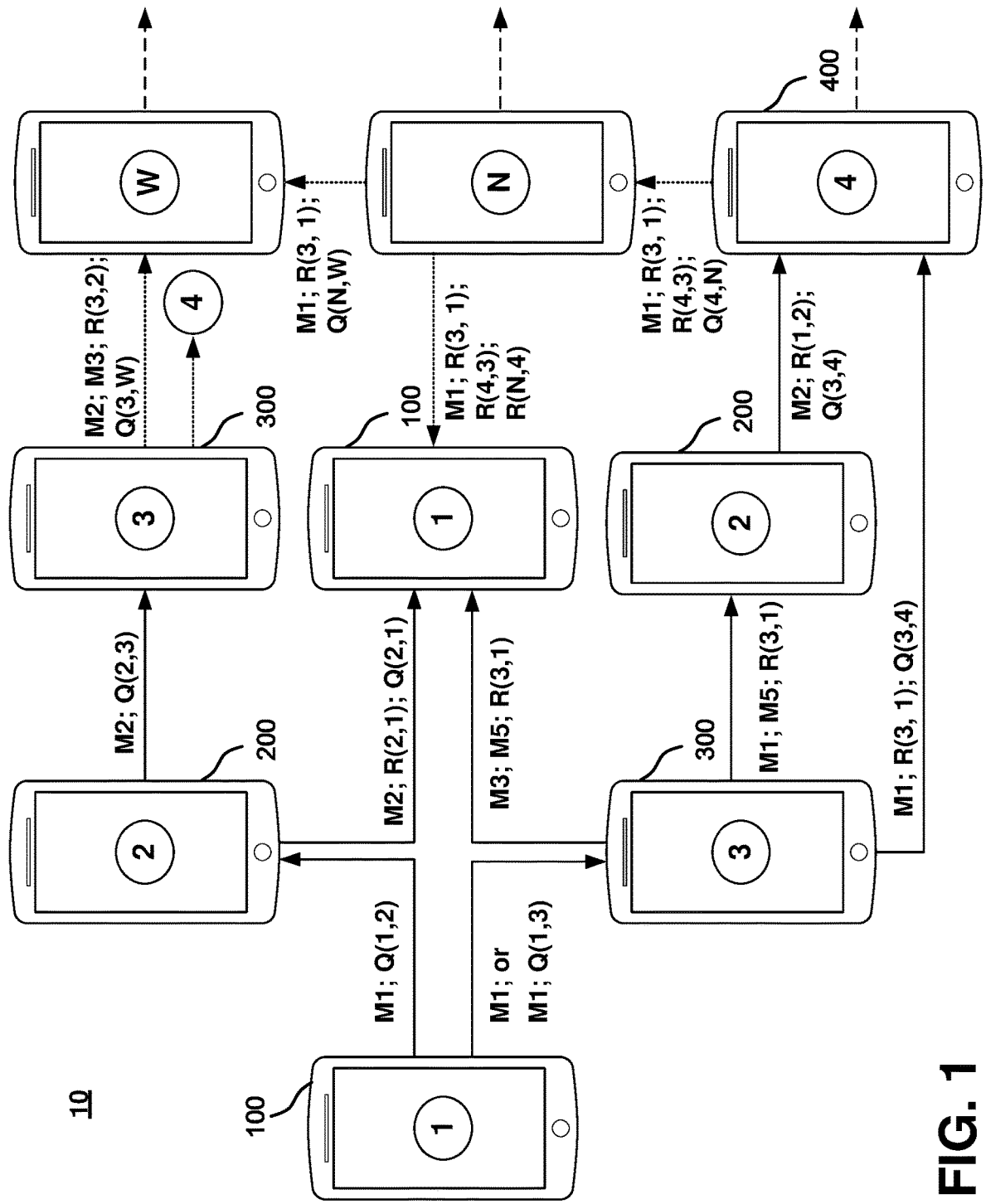
FIG. 1 depicts an overall view of an exemplary social network setting in which the present invention operates according to one embodiment.

FIG. 1 depicts an overall view of an exemplary social network setting 10 in which the present invention operates according to one embodiment. The exemplary setting 10 illustrates a plurality of user stations 1, 2, 3, 4, . . . , N, W that communicate whether remotely over a network such as the Internet, or via direct communication. Although the user stations 1, 2, 3, 4, . . . , N, W can be functionally similar or identical, their functions can be different, such as for instance, one user station can include a smart phone, while another user station can include a server or another communication device.

In the illustrated scenario, a user 1 (also referred to herein as user station 1 and referenced by the numeral 100) concurrently sends a message M1 along with a query Q(1, 2) to user station 2 (also referenced by the numeral 200), along with the same message M1 (or alternatively a different message) to user station 3 (also referenced by the numeral 300).

The message M1 can be include any type of data, whether video, still or moving (live) photos, screen shots, a written message, an audio file, an emoji, or any other suitable content. As used herein, the term "query" may refer for example, to a request from the message sender (e.g., user station 1) to the message receiver (e.g., user station 2), in which the sender requests authorization from the receiver to have his/her/its reaction to the message be taken or recorded. In other terms, Q(1,2) refers to a request from user station 1 to user station 2, asking for user station 2's authorization to have user station 2 capture user 2's reaction to user 1's message 1 (M1). It being noted that the authorization can be given manually by an actual user, or automatically via the user stations, by pre-setting the user stations.

If the receiver user's authorization is granted, then user station 2 may automatically capture user 2's reaction to message M1, by means of a reaction capturing module 910, such as for example, a built-in camera, to replace or complement the conventional emojis. As an example, the reaction can reflect the following nonverbal cues including actual real time "emotions": "sad," "happy," "bored," "scared," "worried," "disgust," "trust," "anger," "depression," "admiration," "acceptance," "anticipation," "expectation," "annoyance," "surprise," "shame," "confidence," "courage," "fear," "worry," "calm," "enmity," "cruelty," "pity," "indignation," "envy," "love," etc. In addition, the reaction to message M1 can include or be accompanied by a physical gesture by the recipient user.

Figure 2:
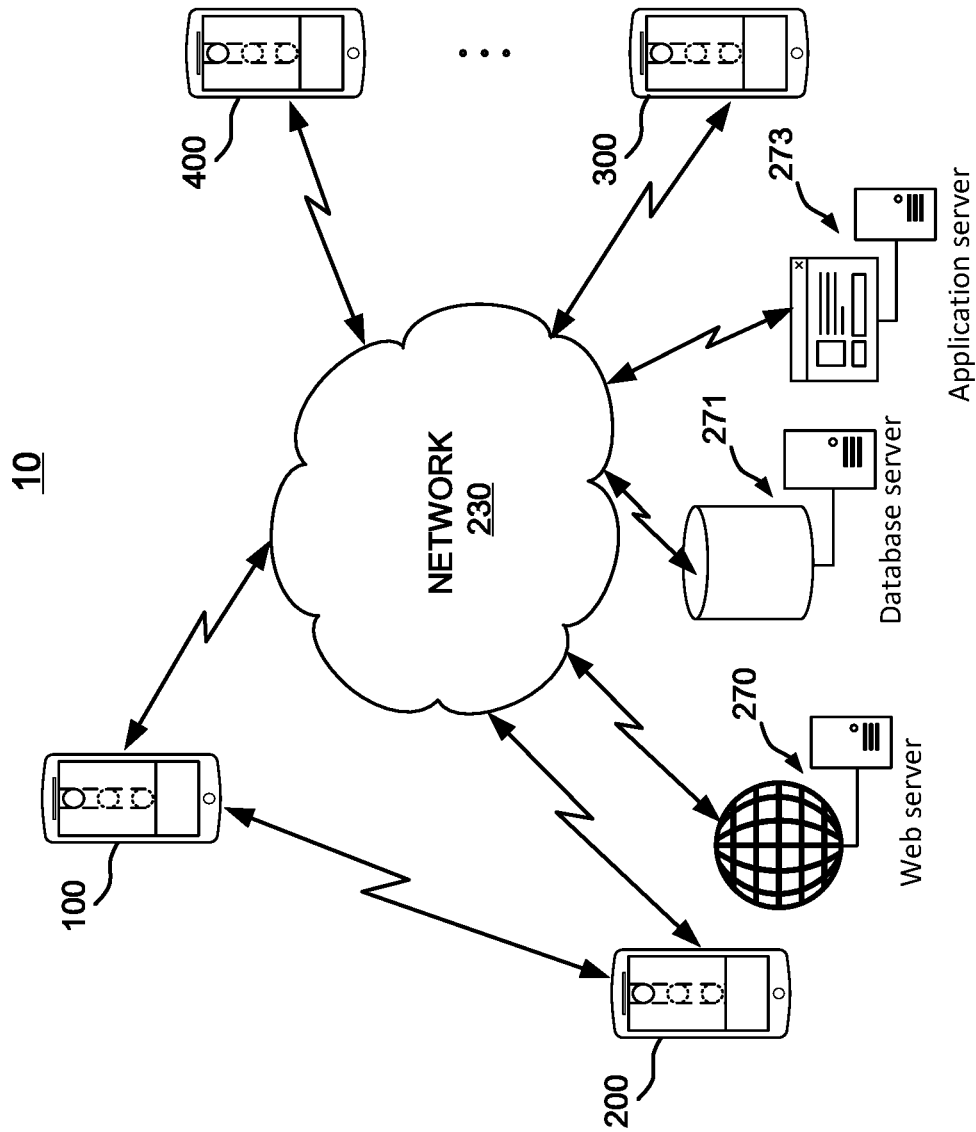
FIG. 2 illustrates a high-level view of the social network setting of FIG. 1, in which a plurality of user stations communicate with each other and various servers, either remotely over a network, such as the Internet, or via direct communication.

In one embodiment, the captured reaction is compared to pre-recorded or tabulated templates, and assigned a capture value, V, which may be assigned a specific reference value, a pre-tabled value, or a set of pre-tabled values, which values are then transmitted to the initiating user station 100, or other user stations, servers, or devices illustrated for example in FIG. 2. These recipient devices or stations may then interpret the received values and apply the interpretation(s) to specific applications residing within a specific device or devices, whether locally or on the network 230. It should be clear that the captured reaction is not necessarily limited to a single capture but rather may extend for the duration of the connection between the initiating and receiving devices or user stations, and possibly beyond the end of the connection, as necessitated by the applications. It should be understood that the capture of the reactions should be limited by the community ethics and prevailing rules of law.

Returning back to the scenario of FIG. 1, user 1 is interested in user 2's reaction but not the reaction of user 3 and so user 1 does not send query Q(1,3) to user 3. Alternatively, user 2 may be interested in user's 3 reaction and send Q(1,3) to user 3. In response to message M1 and the accompanying query Q(1,2) or lack thereof, user 2 resorts for example, to user interface 510 of FIG. 5 (as it will be explained later in more detail), to send message M2 accompanied by query Q(2,3) to user 3, requesting user 3's authorization to capture user 3's reaction to message M2 (or to the communication thread). In addition, user 2 responds to user 1 by sending a response message M2, the captured reaction R(2,1) of user 2 to message M1, along with user 2-initiated query Q(2,1) to capture user 1's reaction to message M2 and query Q(2,1).

In turn, user 3 responds by sending message M3 to user 1 along with user 3's reaction to message M1, even though user 1 may not have requested user 3's reaction. In addition, user 3 forwards message M1 to user 2, along with the captured reaction R(3,1). User 3 further expands the original communication circle comprised of users 1, 2, 3, and adds user 4 to the network by forwarding message M1, capture reaction R(3,1), as well as user 3's own query Q(3,4), to user 4 (or user station 4, also referenced by the numeral 400), requesting user 4's reaction to message M1, and captured reaction R(3,1). The communication network can similarly be expanded to numerous (or unlimited number of) users, N, or groups of users, W.

While the queries are shown to be requested with each communication, it should be understood that a pre-acceptance to accept or reject the queries from specific users or groups of users can be pre-selected in the settings of the user interface, e.g., 505. The captured responses, R(x,y), can be acquired automatically by the camera of the recipient's user station or it can be taken by, and then imported from an external camera.

FIG. 2 illustrates a high-level view of the social network setting 10 of FIG. 1, in which the plurality of user stations 100, 200, 300, 400, communicate with each other and various servers 270, 271, 273, either remotely over a network 230, such as the Internet, or via direct communication.

Figure 3:
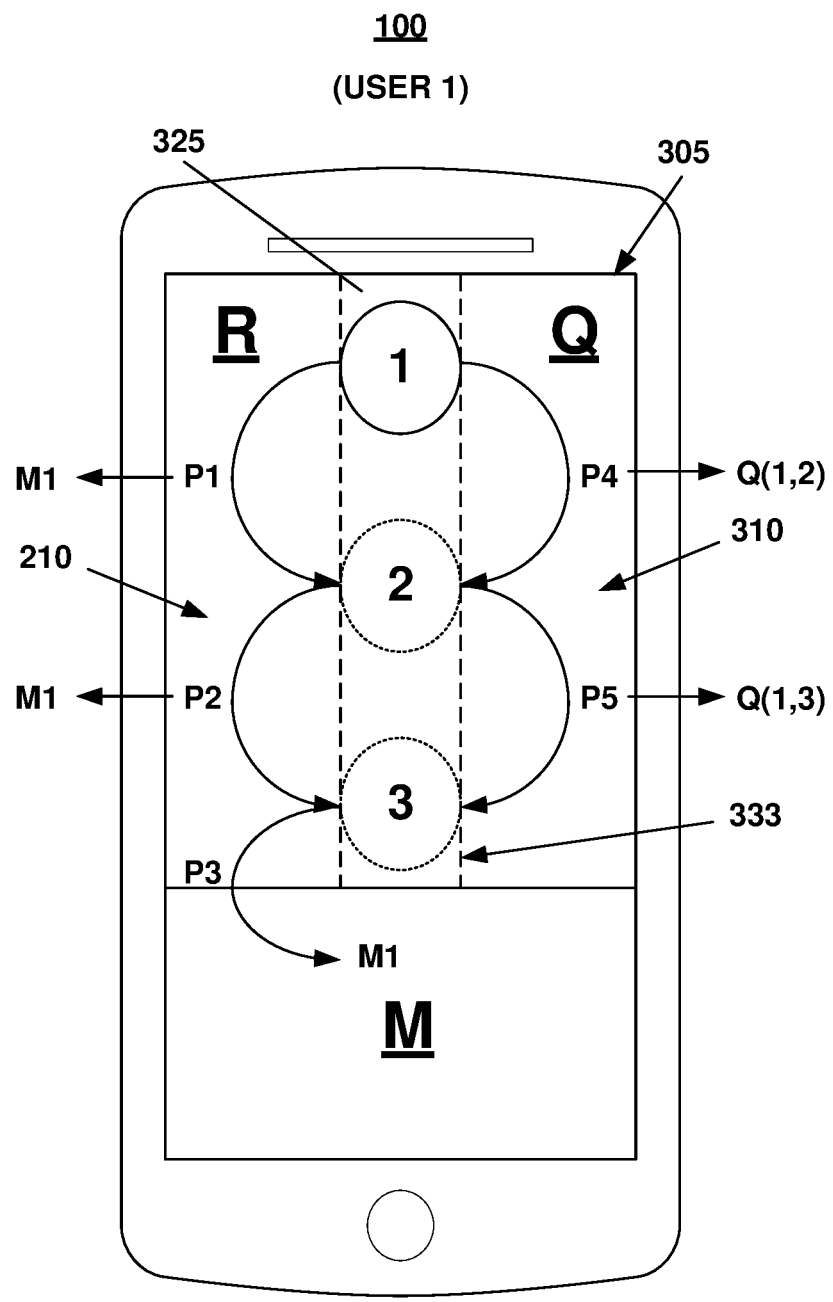
FIG. 3 depicts a view of an exemplary user station (or computing device) of FIG. 2 that includes a touchscreen, and that illustrates a gridded user interface which enables the user station to communicate with other user stations according to one embodiment of the present disclosure, using a single digit (or instrument, such as a pen or a stylus) data entry by continuously swiping the digit across the touchscreen, without interrupting the swipe and without removing the digit from the touchscreen.

Referring now to FIG. 3, it depicts a view of an exemplary user station 1 (or computing device) 100 that includes a touchscreen 305 which illustrates a gridded user interface 310 that enables the user station 100 to communicate with other user stations (FIGS. 1 and 2), according to an exemplary embodiment of the present disclosure. While the term touchscreen is used herein, it should be understood that this term is not limited to an actual physical device, but may also include equivalent devices that simulate entries onto a touchscreen, such as by using gesture-related free space motion, or off-the-screen, eye movements, neural signals, virtual entries, remote entries, and neural feedbacks. Some exemplary equivalent devices are listed in the publications below, all of which are incorporated herein by this reference in their entireties: Magal et al., U.S. Pat. No. 8,166,421 B2; Bedikian et al., U.S. Pat. No. 9,459,697 B2; Mistry et al., U.S. Pat. No. 9,569,001 B2; Fish et al., U.S. Pat. No. 9,986,206 B2; Kandadi et al., U.S. Patent Application, Publication No. 2018/0,101,278; Schwesig et al., U.S. Patent Application, Publication No. 2019/0,011,989; Schwesig et al., U.S. Patent Application, Publication No. 2019/0,257,939; Cohen et al., U.S. Patent Application, Publication No. 2015/0,169,176 A1; Horowitz et al., U.S. Patent Application, Publication No. 2017/0,330,374 A1; and Malchano et al. U.S. Patent Application, Publication No. 20190314641.

In this particular embodiment, the gridded user interface 310 includes a grid 333 that divides the touchscreen 305 into four cells (also referred to herein as "fields"): a contact cell 325, an R cell, a Q cell, and an M cell. As used herein a "cell" can mean a "module" and can be implemented as hardware modules, or as software modules that encompass a software, instruction codes, hardware module, or a combination thereof, which provides the respective functionality, and which can be stored in memory 905 (or in another memory that may be accessible by the processor 901) of FIG. 9.

It should be understood that the grid 333 is not limited to a tabular form that includes straight cell dividing lines; rather, the grid 333 could alternatively be hand-drawn by the user to better suit the application for which it is designed. In addition, since each cell of the executable grid 333 can be a module, the grid 333 can be construed modularly, that is the number of cells can be increased or decreased by the user.

In this exemplary embodiment, the contact cell 325 includes the contact addresses (e.g., email addresses, group addresses, or message addresses, etc.) of the user station 100, and the other user stations (or users) that the user station 100 wishes to communicate with. In this simplified example, contact 1 refers to the user station 100 or user 1, while contacts 2 and 3 refer to user stations (or users) 2 and 3 respectively (FIGS. 1 and 2). The R cell is also referred to as the response cell, and allows user 1 to select the contacts to whom he/she wishes to address a message; e.g., message M1.

The Q cell is also referred to as the query cell, and allows user 1 to select the contacts to whom he/she sends a query; e.g., Q(1,2), in order to elicit a response; e.g., response R(2,1). The M cell is also referred to as the message cell, and allows user 1 to draft a message; e.g., message M1, to the selected contacts.

Figure 8A:
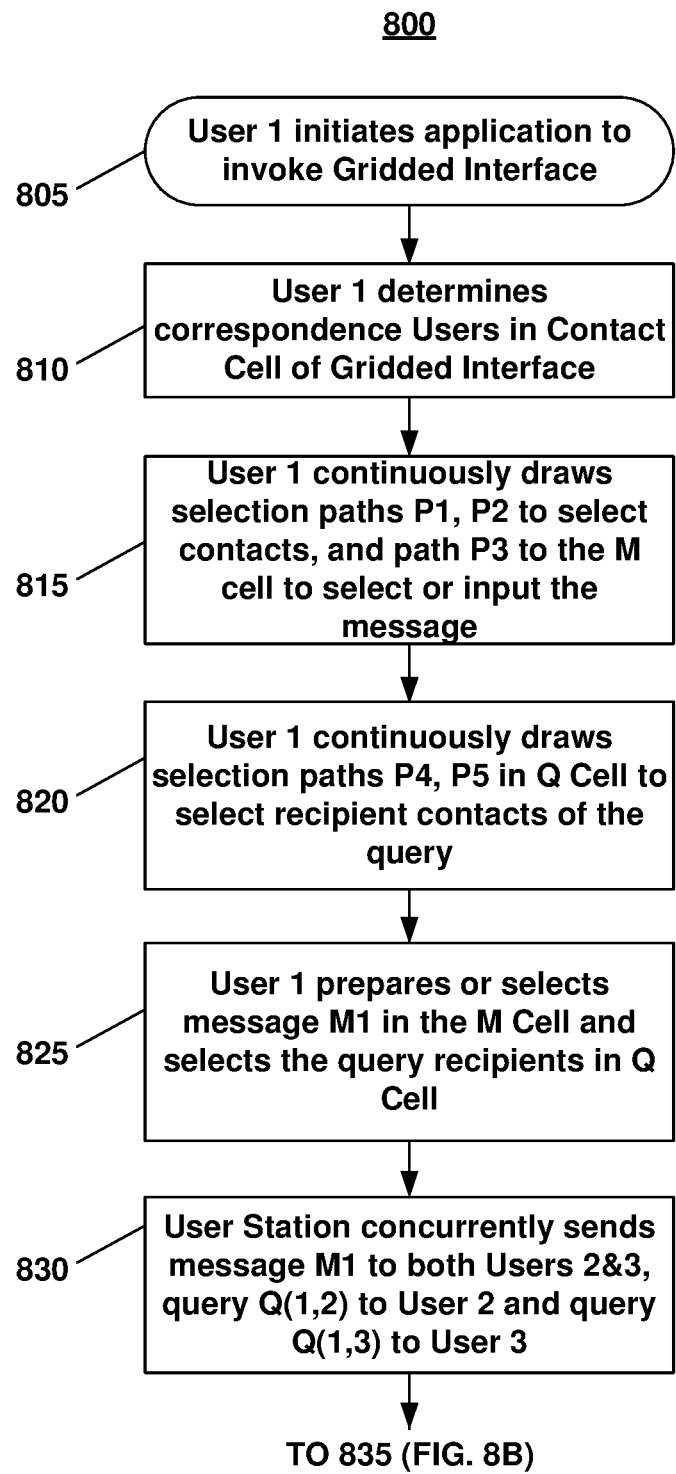
FIG. 8 is comprised of FIGS. 8A and 8B, and depicts a flow chart illustrating an exemplary operation of the user stations of FIG. 1, according to one embodiment of the present disclosure.
Figure 8B:
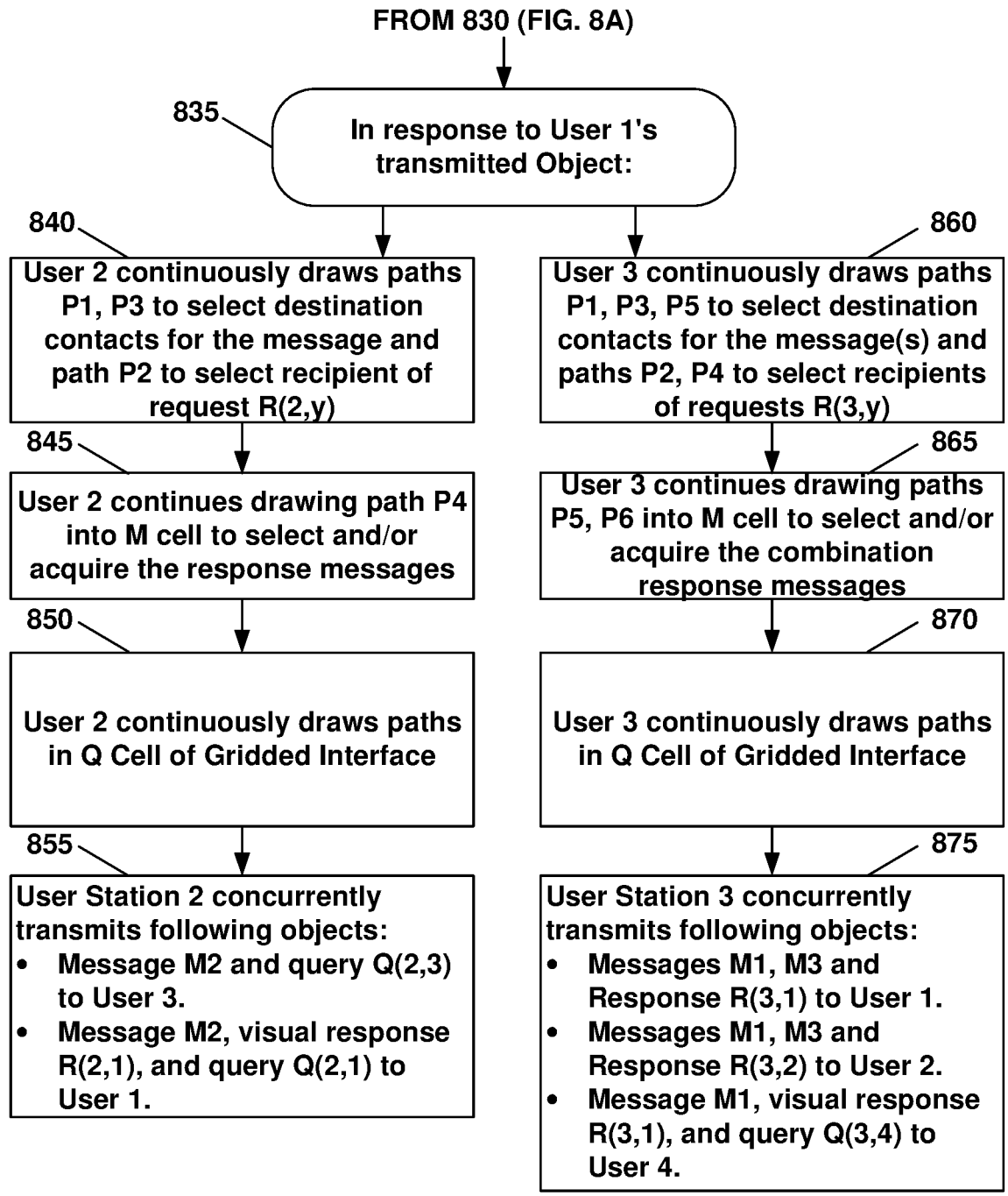

With further reference to FIG. 8 (FIGS. 8A, 8B), it depicts a flow chart of an exemplary operation (or method of use) 800 of the user stations of FIG. 1, according to one embodiment of the present disclosure. In operation, user 1 initiates an application, at step 805, in order to invoke the gridded user interface 310. The application can be downloaded online or independently purchased and installed.

At step 810, user 1 identifies the contacts he/she wishes to correspond with, as shown in FIG. 3. In this scenario, user 1 wishes to send message M1 to users 2 and 3. In order to effect this selection, user 1 draws a first path P1 that connects users 1 and 2. Path P1 instructs the user station 100 that user 1 wishes to send message M1 to user 2 (or contact 2).

However, user 1 also wishes to send the same message M1 to user 3. To this end, user 1 continues drawing another path P2, in succession of path P1, without interruption. Path P2 connects users 2 and 3and instructs the user station 100 that user 1 also wishes to send message (the same message M1) to user or contact 3. If user 1 wishes to send message M1 to other users then user continues adding the corresponding paths serially, by drawing the respective paths, preferably continuously and without removing the pointing device or digit off the user interface 310.

Figure 4:
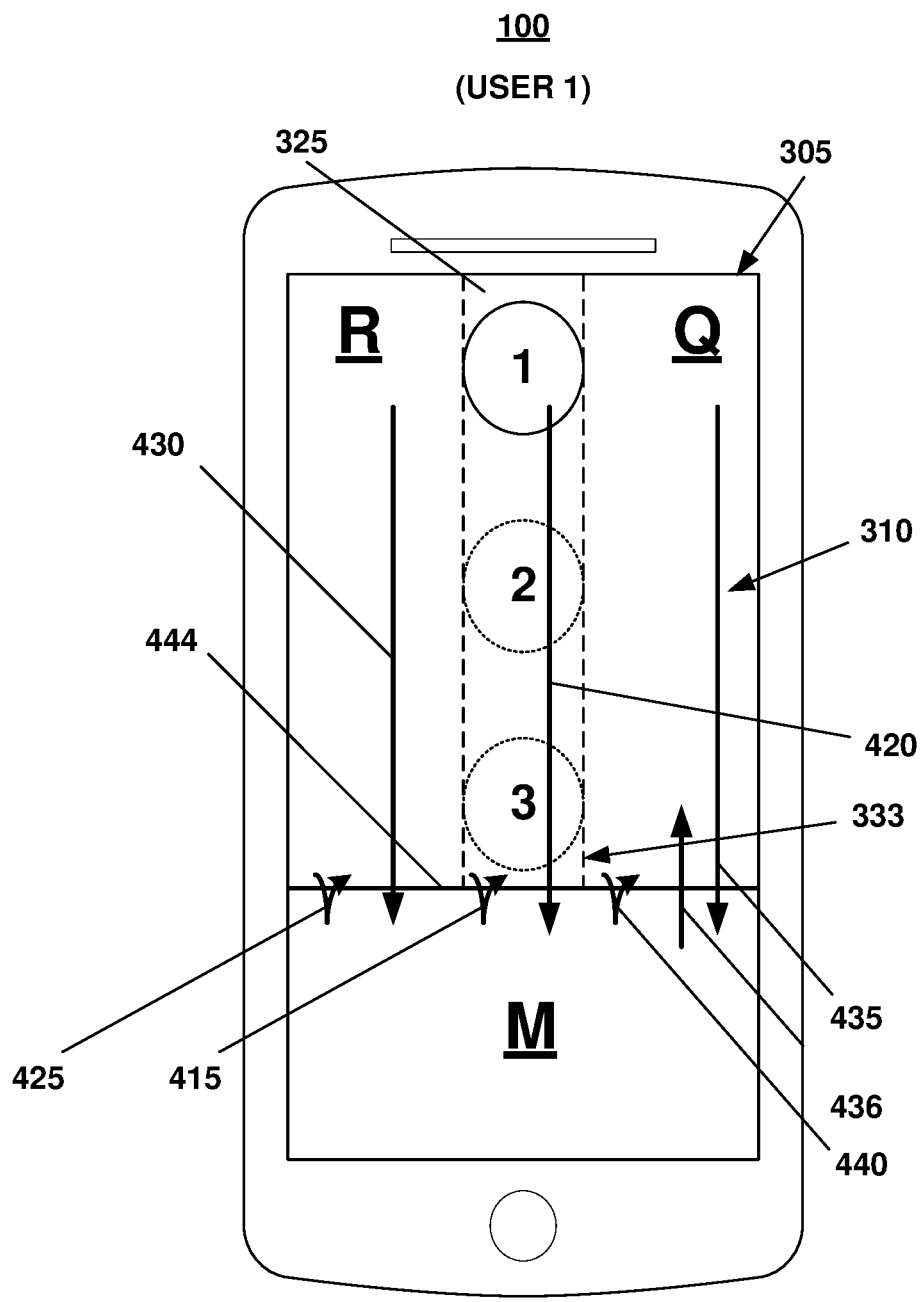
FIGS. 4, 5, 6, 7 depict additional exemplary user stations of FIG. 2, illustrating the gestural use of the gridded user interface according to various embodiments of the present disclosure.

According to another embodiment, user 1 wishes to select more contacts than would fit within the contacts cell 325 of FIG. 4. So, user 1 will need to instruct the user interface 310 to enlarge or expand the contacts cell 325 (or shown another broader cell), so that more contacts are shown and available for selection. To this end, the user interface 310 uses an executable grid 333 in that at least some of (or all) the lines or features (e.g., executable line 444) that define (or are included within) the grid 333 (and the cells formed thereby) contain executable functions, and are referred to as executable lines (also referred to as executable graphics, features, areas, or fields).

In other terms, as the user's pointing device or digit (finger) crosses one of the executable lines, whether virtually or physically, a corresponding function is executed. In one embodiment, at least some (or all) the executable lines cause the same executable function to be executed. In another embodiment, each executable line relates to a distinct and different executable function.

With reference to FIG. 4, the user interface 310 can cause the contacts cell 325 to be expanded by, for example, having user 1 draw or form a directional line 420 that originates in the contacts cell 325 and that crosses the executable line 444 (in this illustrative example, toward the M cell). The crossing of the directional line 420 over the executable line 444, causes an executable or programmable function to be executed.

Figure 5:
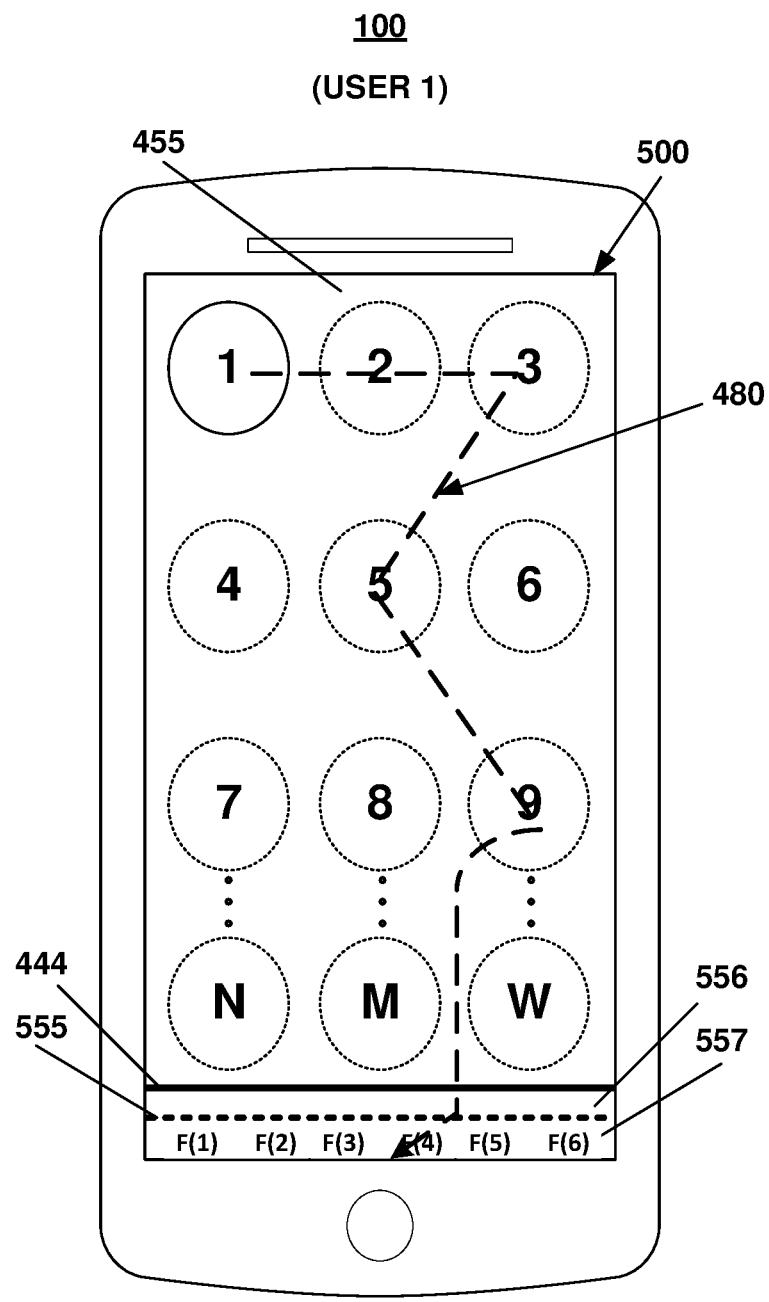

With further reference to FIG. 5, as it relates to the present scenario, the executable function causes the user interface to open another screen 500, that lists or shows an expanded list of contacts, or users, e.g., 1 through 9, N, M, W. As an example, user 1 wishes to communicate with users 2, 3, 5, and 9. To select these users, user 1 draws a continuous line (graph or graphic) 480 that connects these users. Line 480 continues past, and crosses the executable line 444, thus instructing the user interface to revert back to the original (or previous) user interface 310 screen (FIG. 4).

With reference to FIG. 5, an alternative embodiment would be to have another (or an additional) executable line 555 so that as the line or path 480 crosses the executable line 555, another different function is executed. In this example, the executable lines 444 and 555 create two executable fields 556 and 557, so that when line 480 enters (crosses or lands on) one of these two fields, 556, 557, a pre-selected (or pre-programmed) function is executed. In addition, FIG. 5 illustrates that field 557 contains several functions: F(1), F(2), F(3), F(4), F(5), F(6), so that when line 480 lands or terminates on any one of these functions (e.g., F(4)), then this specific function is executed. Variations of this concept are anticipated by the present disclosure. In another embodiment, the executable lines, e.g., 444, 555 are programmable.

Referring now to FIG. 4, instead of the user drawing line 420, user 1 has the option to draw a (wiggled or straight) short line 415 within the contacts cell 325, that crosses the executable line 444, to either generate the same result as described earlier in connection with FIG. 5, or to cause another function to be executed.

Similarly, if user 1 wishes to execute a function that relates to the other fields, R, Q, M, then user 1 can draw directional lines, e.g., 430, 435, 436, respectively, or wiggled lines 425, 440, that cross the executable line (or outline) 444.

According to yet another embodiment of the present disclosure, the different directions of crossing the same executable line cause different equations or functions to be executed. This feature is referred to herein as "directionality of the function execution," and is illustrated in FIGS. 6 and 7.

Figure 6:
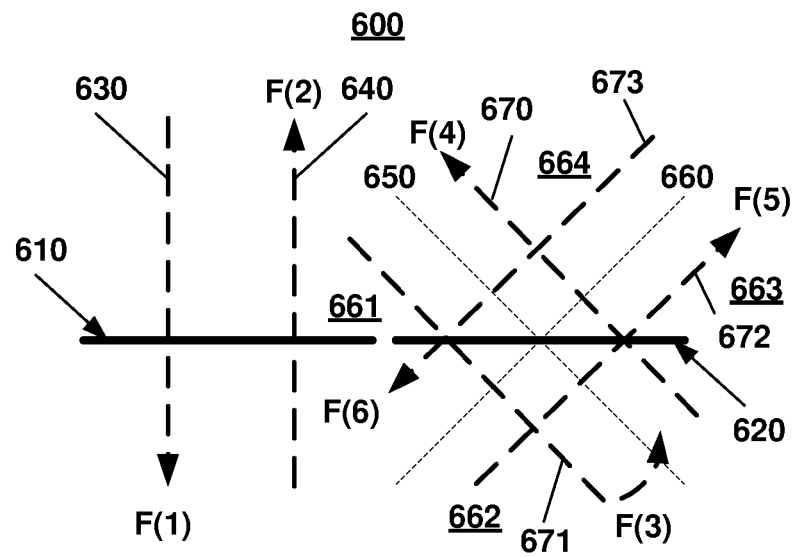
Figure 7:
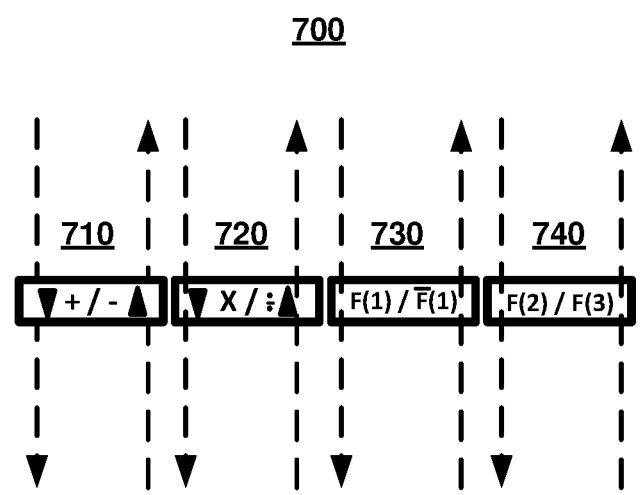

FIG. 6 illustrates an executable line (or outline) 600 that is programmed with a directional execution function. One feature of the executable line 600 is that it is modular in that it can be composed of more than just a single executable line. As an illustration, the executable line 600 that is shown in FIG. 6 is composed of two separate (not necessarily physically separated) executable segments (or sublines) 610, 620, that may be programmed with the same, similar, or different directional functions.

Considering the executable line 610, if a path 630 crosses it in one direction, a first function F(1) is executed, while if a path 640 crosses it in the reverse direction, a second function F(2) that may be different than F(1) is executed. In a simple illustration, both functions F(1) and F(2) are identical and the direction of travel (or direction of crossing) may be irrelevant. According to another embodiment, function F(2) is the inverse of function F(1), so that the sequential (or serial) execution of both functions F(1) and F(2) results in the annulment of the execution of function F(1). This is applicable in the exemplary event where the user wishes to cancel a transaction (e.g., a financial or other transaction), in order to correct an error.

The executable line (or outline) 620 illustrates a more complex implementation of the directionality of the function execution. The directionality of the function execution of the executable line 610 is shown to be in two directions, generally perpendicular to the executable line 610. However, the directionality of the function execution of the executable line 620 is shown to be in four directions, thus enabling the execution of four functions.

To this end, two perpendicular centerlines 650, 660 (shown in dashed lines) are either virtually drawn (i.e., effectively drawn but are not visible to the user) or visibly shown to the user, that separate the space around the executable line 620 into four executable quadrants 661, 662, 663, 664. It should be understood that the present invention is not limited to four quadrants, but could be divided into a different number of quadrants, cells, or fields.

More specifically, a path 671 originates in quadrant 661 and crosses the executable line 620 to cause function F(3) to be executed. It would preferable for the path 671 to be generally parallel to the centerline 650. However, according to another embodiment, the only requirements for the execution of function F(3) is that path 671 originates in quadrant 661 and that it crosses the executable line 620, along one direction, while the exact disposition of the path 671 with respect to the executable line 620 would be irrelevant (i.e., they do not need to be parallel).

In one embodiment, the centerlines 650, 660 are not executable lines (i.e., they do not cause functions to be executed). However, in a more complex embodiment, the centerlines 650, 660 can be executable, and the crossing of a path, e.g., 671 across either one or both centerlines 650, 660 may cause the centerline functions to be executed. It being understood that the path 671 is not limited to a straight line, but could include a serpentine section to facilitate the crossing of multiple executable lines.

Similarly, path 670 originates in quadrant 663 and crosses the executable line 620 in an opposite (or different) direction than the path 671, to cause a different function F(4) to be executed. Path 672 originates in quadrant 662 and crosses the executable line 620 in a direction that causes the execution of function F(5). Path 673 originates in quadrant 664 and crosses the executable line 620 in an opposite (or different) direction than the path 672, to cause a different (or inverse) function F(6) to be executed.

FIG. 7 illustrates another executable line 700 according to another embodiment of the present invention. The executable line 700 is comprised of several segments, in this illustration four segments 710, 720, 730, 740 that are generally similar in function to the segments 610, 620 of FIG. 6. At least one segment, such as segment 710 is represented by a two-dimensional graphic, such as a rectangle, which enables the insertion of the directionality of the function, by, for example, an arrowhead, and the function itself.

As an illustration only, segment 710 illustrates a down arrowhead and an up arrowhead, which provide a visual representation of the directions of movement of the path formed by the user, as well as the respective addition and subtraction functions. Similarly, the segment 720 illustrates a down arrowhead and an up arrowhead, which provide a visual representation of the directions of movement of the path formed by the user, as well as the respective multiplication and division functions. As a result, the two segments 710, 720 provide the functionality of a basic calculator, with the added benefit of enabling the user to quickly enter the numbers and functions to be executed, by continuously swiping the digit, whether virtually or actually, across the touchscreen, without interrupting the swipe and without removing the digit from the touchscreen. As a result, the entries to the calculator are done at a faster pace, as it will be described later in greater detail.

Segments 730 and 740 may be added to complement the segments 710, 720, or, alternatively they can be functionally unrelated to the functions of the segments 710, 720. The directional arrowheads may or may not be included to facilitate the use of the user station. Segment 730 provides at least two inverse executable functions F(1) and inverse F(1), while segment 740 provides at least two unrelated functions F(2), F(3).

Returning now to FIG. 3 and to step 815 of FIG. 8A, user 1 continuously draws selection paths P1, P2 to select the desired contacts shown in the contact cell 325, to whom the various components of the correspondence will be selectively transmitted, as it will be explained in greater detail. Although FIG. 3 shows the selection paths P1, P2 as being drawn in the R cell of the gridded interface 310, it should be clear that these selection paths P1, P2 can alternative be drawn within the contacts cell 325. Upon completing the selection path P2, user 1 continues drawing path P3 into the M cell, in order to instruct the user station 100 that a message M1 is intended to be selectively sent to the contacts (e.g., users 2, 3) who have been designed by the selection paths P1, P2.

As illustrated in FIG. 3, path P1 instructs the user station 100 to send the message M1 to user 2. Similarly, path P2 instructs the user station 100 to send the message M1 to user 3. At step 825 of FIG. 8A, Path P3 instructs the user station 100 to send the message M1 which will either be selected in the M cell from a plurality of pre-recorded messages, emojis, etc., and/or will allow user 1 to input a new message (at least in part).

With further reference to step 820 of FIG. 8A, user 1 continuously draws selection paths P4, P5 in the Q cell of gridded interface 310, to select or designate the recipient contacts in the contacts cell 325 to whom the query or queries will be addressed (at step 825 of FIG. 8A). In this example, the query Q(x,y) to be sent to the selected contacts is pre-programmed and does not need to be selected or inputted by user 1.

Figure 12:
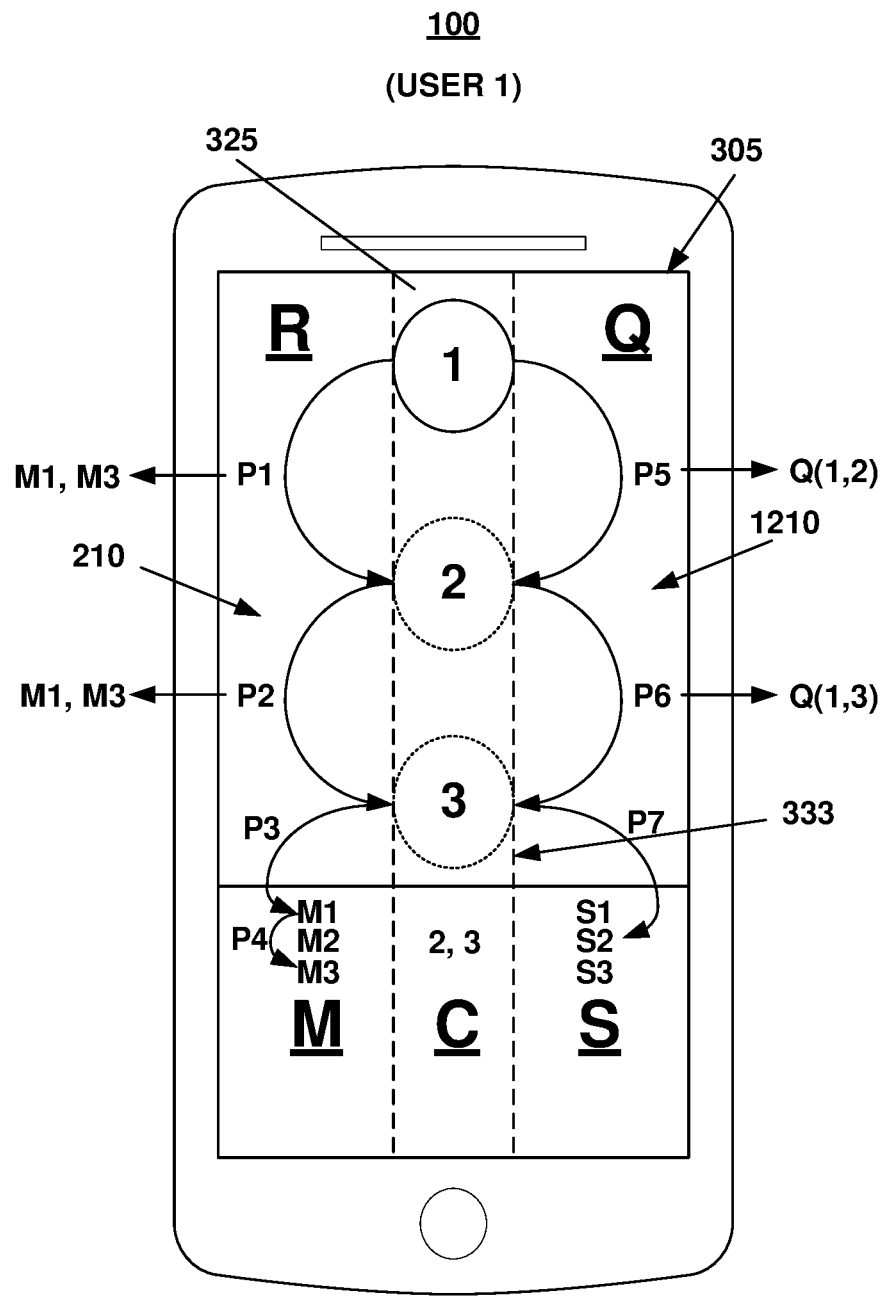

In more complicated applications, the query Q(x,y) or queries may need to be either selected from a list of pre-drafted (or pre-programmed) queries and/or inputted by user 1. FIG. 12 shows a user interface 1210 that is generally similar to the interface 310 (FIG. 3), with the added features that the bottom row of the gridded interface 1210 is now divided into more than just one cell M (as shown in FIG. 3). The bottom row may be divided into two or more cells. In this example, the bottom row is divided into three cells: M (Message) cell, C (Contacts) cell, and S (Query Listing) cell. The user may draw paths P3, P4 (FIG. 12) to select messages M1, M3 for transmittal to the following contacts: users 2 and 3 (shown in cell C). In addition, the user may also draw path P7 (or more than one path) to select one (or more) of pre-stored queries S2 (shown in cell S).

At step 830 of FIG. 8A, the user station 100 concurrently sends message M1 to both users 2 and 3, query Q(1,2) to user 2 and query Q(1,3) to user 3. Each of the transmitted, bundled message M1 and query Q(1,2) to user 2, and bundled message M1 and query Q(1,3) to user 3, are also referred to herein as "object" or "objects."

As described earlier, the path P3 to the M cell enables user 1 to either select a message from a plurality of pre-prepared messages (e.g., M1, M2, M3, etc.) or to input a new message. The C cell displays a visual representation of the contacts 2, 3 that have been selected to selectively receive the messages and queries. A new path P6 to an S cell enables user 1 to either select a query from a plurality of pre-prepared queries (e.g., Q1, Q2, Q3, etc.) or to input a new query Q(x, y).

Figure 10:
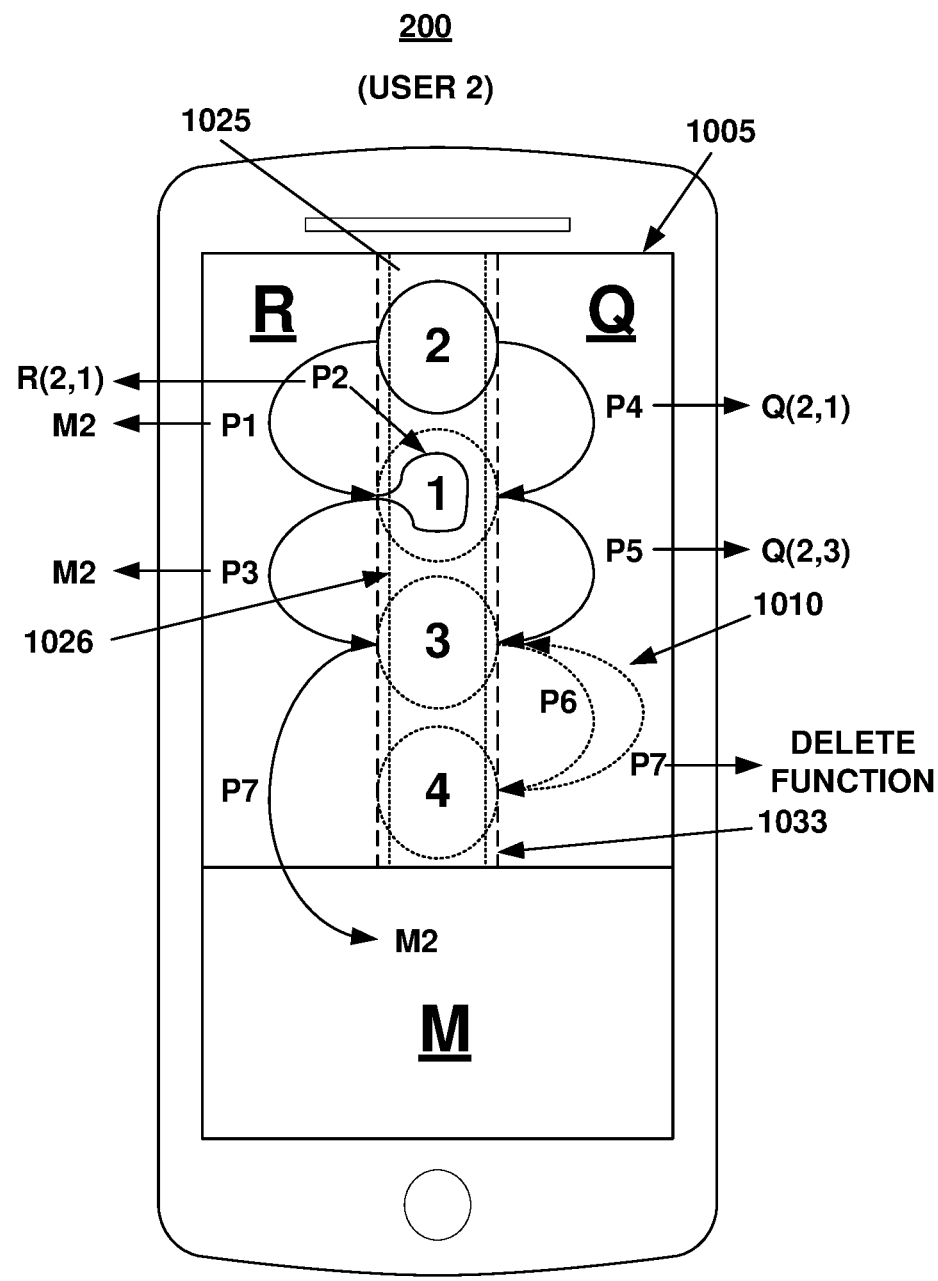

In query Q (x,y), x designates the source user 1, and y designates the destination user or users (e.g., 2, 3). So, in the illustrations of FIGS. 3 and 10, selection path P4 generates a query Q(1,2) from user 1 to user 2, while selection path P5 generates a query Q(1,3) from user 1 to user 3. The query Q(x,y) is selected by means of path P6 (FIG. 10). According to another embodiment, at least some of the various selection, e.g., paths P1, P2, P3, P5, etc. can be pre-drawn so that the user is not required to draw these paths, but rather has the ability to select at least some of them.

At the completion of step 830, process 800 proceeds to step 835 (FIG. 8B). With further reference to FIG. 10, it depicts a view of an exemplary user station (or computing device) 200 that includes a touchscreen 1005 which illustrates a gridded user interface 1010 that enables the user station 200 to communicate with other user stations (FIGS. 1 and 2), according to an exemplary embodiment of the present disclosure. The gridded user interface 1010 includes a grid 1033 that divides the touchscreen into four cells (also referred to herein as "fields"): a contacts cell 1025, an R cell, a Q cell, and an M cell. It should be understood that the grid 1033 is not limited to a tabular form that includes straight cell dividing lines; rather, the grid 1033 could alternatively be hand-drawn by the user to better suit the application for which it is designed.

In this exemplary embodiment, the contacts cell 1025 includes the contact addresses (e.g., email addresses, group addresses, or message addresses, etc.) of the user station 200, and the other user stations (or users) that the user station 200 wishes to communicate with. In this simplified example, contact 1 refers to the user station 100 or user 1, while contacts 2 and 3 refer to user stations (or users) 2 and 3 respectively (FIGS. 1 and 2). The R cell is also referred to as the response cell, and allows user 2 to select the contacts to whom he/she wishes to address a message; e.g., message M2.

The Q cell is also referred to as the query cell, and allows user 2 to select the contacts to whom he/she sends a query; e.g., Q(2,1), in order to elicit a response; e.g., response R(1,2). The M cell is also referred to as the message cell, and allows user 2 to select or draft a message; e.g., message M2, to the selected contacts.

With further reference to step 840 of FIG. 8B, user 2 draws a selection path P1 from user 2 to user 1, instructing the user station 200 to send message M2 to user 1. Upon reaching contact 1 (or user 1), user 2 draws a response path P2 around user 2, thus instructing the user station 2 to send a response R(2,1) to user 1. In this example, the response R(2,1) may be user 2's response to user 1's message M1, and as explained herein, this response can be captured by means of a camera or any other suitable means.

The response path P2 does not need to encircle contact 1, rather it can a sinuous path within the contacts cell 1025, in contact with, in the direction of, or in the vicinity of contact 1. According to another embodiment, a response cell 1026 may be created within the contacts cell 1025, as shown by the two parallel, dotted lines, so that the crossing of path P2, within the response cell 1026, in contact with, in the direction of, or in the vicinity of contact 1, will instruct the user station 2 to send a response R(2,1) to user 1.

At step 845, and with further reference to FIG. 10, user 2 continues with response path P2 and draws a selection path P3 to (or toward) user 3, thereby selecting contact 3 as a recipient of message M2 which is initiated by user 2 (message M1 being initiated by user 1). User 2 does not encircle contact 3, thereby instructing the user station 200 not to send user's response (or feedback) to user 3. User 2 skips user 4, thus instructing the user station 200 not to send message M2 to user 4. User 2 then continues with selection path P3 and draws path P8 onto the M cell.

At step 850, user 2 proceeds with the drawing of selection paths P4, P5, so that the user station 200 transmits query Q(2,1) to user 1 and query Q(2,3) to user (or recipient) 3.

Assuming that user 2 inadvertently (or in error, or later changes his/her mind) draws selection path P6 to user 4, then user 2 can readily correct this mishap by drawing a reverse selection path P7, in the reverse direction of selection path P6, in order to offset or cancel the prior selection path P6. In a simplified manner, path P7 executes a delete or cancel function.

Upon completion of the selection steps 840, 845, 850, and user 2 selects or drafts message M2, user 2 can instruct the user station 2 to execute the corresponding instructions at step 855 so that user station 200 concurrently transmits the following objects:

Message M2 and query Q(2,3) to User 3.
Message M2, visual response R(2,1), and query Q(2,1) to user 1.

Figure 11:
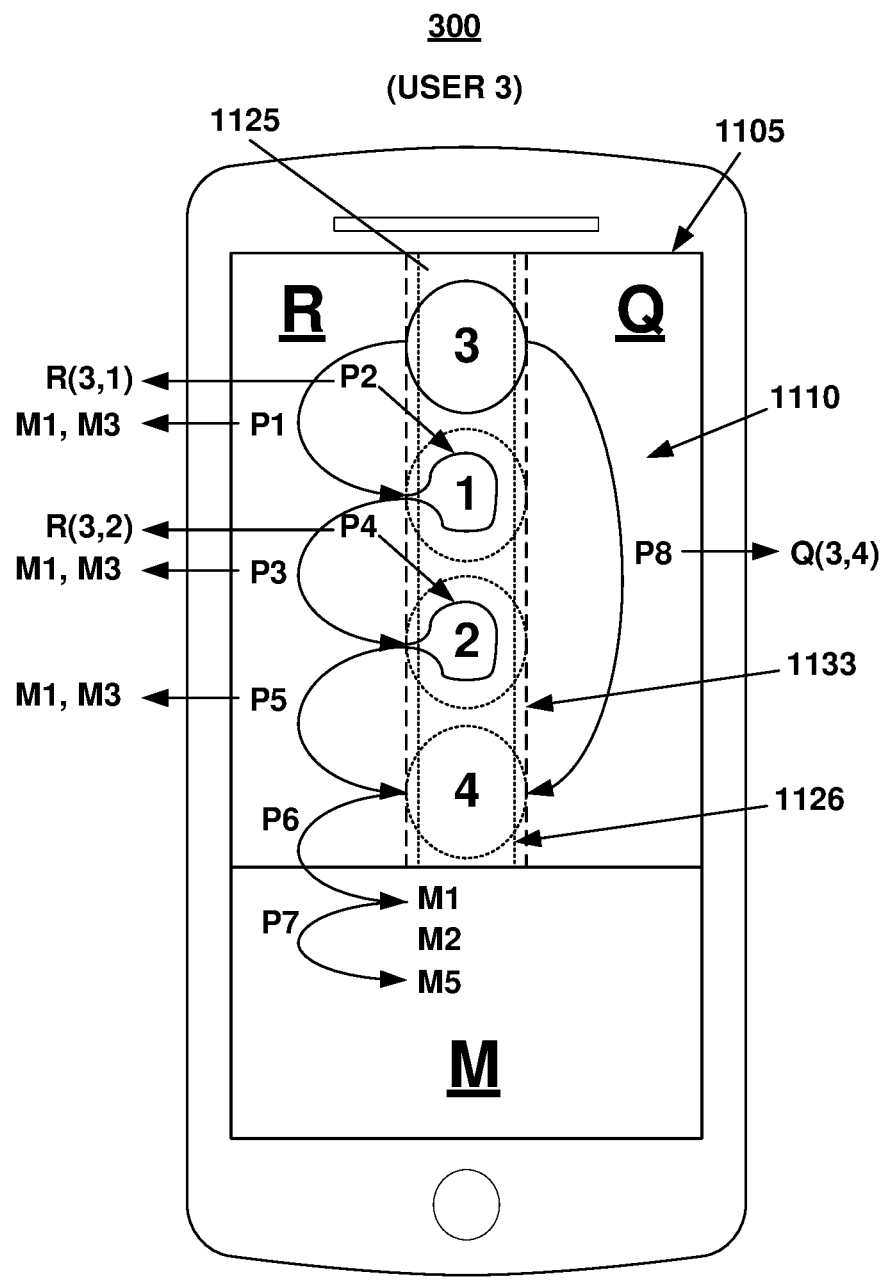

With further reference to FIG. 11, it depicts an exemplary user station (or computing device) 300 that includes a touchscreen 1105 which illustrates a gridded user interface 1110 that enables the user station 300 to communicate with other user stations (FIGS. 1 and 2), according to an exemplary embodiment of the present disclosure. The gridded user interface 1110 includes a grid 1133 that divides the touchscreen into four cells (also referred to herein as "fields"): a contacts cell 1125, an R cell, a Q cell, and an M cell. It should be understood that the grid 1133 is not limited to a tabular form that includes straight cell dividing lines; rather, the grid 1133 could alternatively be hand-drawn by the user to better suit the application for which it is designed.

In this exemplary embodiment, the contacts cell 1015 includes the contact addresses (e.g., email addresses, group addresses, or message addresses, etc.) of the user station 300, and the other user stations (or users) that the user station 300 wishes to communicate with. In this simplified example, contact 1 refers to the user station 100 or user 1, while contacts 2 and 3 refer to user stations (or users) 200 and 300 respectively (FIGS. 1 and 2). The R cell is also referred to as the response cell, and allows user 2 to select the contacts to whom he/she wishes to address a message; e.g., message M3 or a combination of messages M1, M3.

The Q cell is also referred to as the query cell, and allows user 3 to select the contacts to whom he/she sends a query; e.g., Q(3,4), in order to elicit a response; e.g., response R(4,3). The M cell is also referred to as the message cell, and allows user 3 to select or draft one or more messages; e.g., message M3 or a combination of messages M1, M3, to the selected contacts.

With further reference to step 860 of FIG. 8B, user 3 draws a selection path P1 from user 3 to user 1, instructing the user station 300 to send a combination of messages M1, M3 to user 1. Upon reaching contact 1 (or user 1), user 3 draws a response path P2 around user 1, thus instructing the user station 3 to send a response R(3,1) to user 1. In this example, the response R(3,1) may be user 3's response to user 1's message M1, and as explained herein, this response can be captured by means of a camera or any other suitable means.

As explained earlier, the response path P2 does not need to encircle contact 1, rather it can a sinuous path within the contacts cell 1125, in contact with, in the direction of, or in the vicinity of contact 1. According to another embodiment, a response cell 1126 may be created within the contacts cell 1125, as shown by the two parallel, dotted lines, so that the crossing of path P2, within the response cell 1126, in contact with, in the direction of, or in the vicinity of contact 1, will instruct the user station 3 to send a response R(3,1) to user 1. Similarly, user 2 draws paths P3, P4, P5.

At step 865, user 3 continues with response path P5 and draws selection paths P5, P6 to (or toward) users 2 and 4respectively, thereby selecting contacts 2 and 4 as recipients of the combination messages M1, M3, wherein user-initiated message M1 (or another message) has been saved (or stored) on user station 300, and message M3 being initiated by user 3. User 3 then continues with the drawing of selection paths P6, P7 onto the M cell, to select messages M1 and M5.

At step 870, user 3 proceeds with the drawing of a single selection path P8, so that the user station 300 transmits query Q(3,4) to user 4, bypassing message recipient users 1, 4.

Upon completion of the selection steps 860, 865, 870, and user 3 selects message M1 and drafts message M3, user 3 can instruct the user station 3 to execute the corresponding instructions at step 875 so that user station 300 concurrently transmits the following objects:

Messages M1, M3 and Response R(3,1) to user 1.
Messages M1, M3 and Response R(3,2) to user 2.
Message M1, visual response R(3,1), and query Q(3,4) to user 4.

Figure 9:
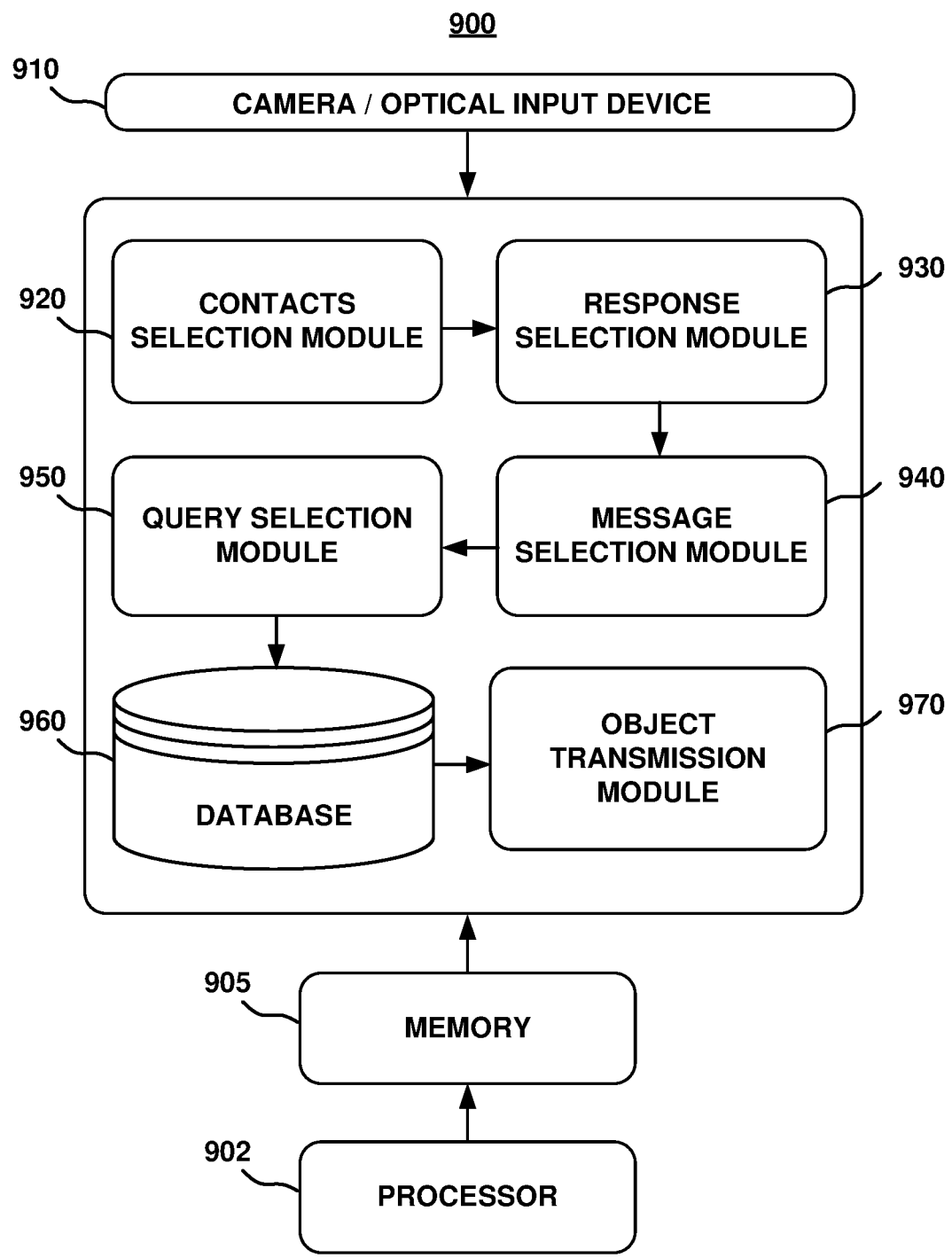
FIGS. 9, 10, 11, 12, 13, 14, 15, 16, 17, 18 depict additional exemplary user stations of FIG. 2, illustrating the gestural use of the gridded user interface according to various embodiments of the present disclosure.

Turning now to FIG. 9, it represents a block diagram of an exemplary user station 900, such as user station 100 (FIG. 3), according to one embodiment of the present disclosure. User station 900 includes at least one camera or optical input device that selectively captures the user's response or reaction to a received object. The captured user's response or reaction can be saved on memory 905 or database 960. It should be understood that the object may be received on the user station 900 and/or on a different device or user station.

User station 900 further comprises a plurality of processing modules or logical instructions that can be executed by a computer or a processor 902. A "module" as understood herein can be implemented as hardware modules, or as software modules that encompass a software, instruction codes, hardware module, or a combination thereof, which provides the respective functionality, and which can be stored in memory 105 (or in another memory that may be accessible by the processor 902). Besides processor 902 and memory 905, the user station 100 can also include (or be connected to) user input and output devices such as a keyboard, mouse, stylus, and a display/touchscreen. As it will be explained in the following discussion, processor 902 can execute logical instructions stored on memory 905, perform object analysis and other quantitative operations, resulting in an output of results to the user station 900 or via a network.

More specifically, the user station 900 includes a contact selection module 920 that enables the implementation of step 815 (FIG. 8A) as well as steps 840, 860 (FIG. 8B), as explained earlier. A response selection module 930 enables the implementation of step 815 (FIG. 8A) as well as steps 845, 865 (FIG. 8B). A message selection module 940 enables the implementation of step 815 (FIG. 8A) as well as steps 840, 860 (FIG. 8B).

A query selection module 950 enables the implementation of step 820 (FIG. 8A) as well as steps 850, 870 (FIG. 8B). The outputs of the contacts selection module 920, the response selection module 930, the message selection module, and the query selection module 950 are stored and tabulated, as needed, in a storage or database 960, and the stored or tabulated outputs are collectively referred to as object. An object transmission module 970 selectively transmits and distributes the various components of the objects to the intended destinations.

Figure 13:
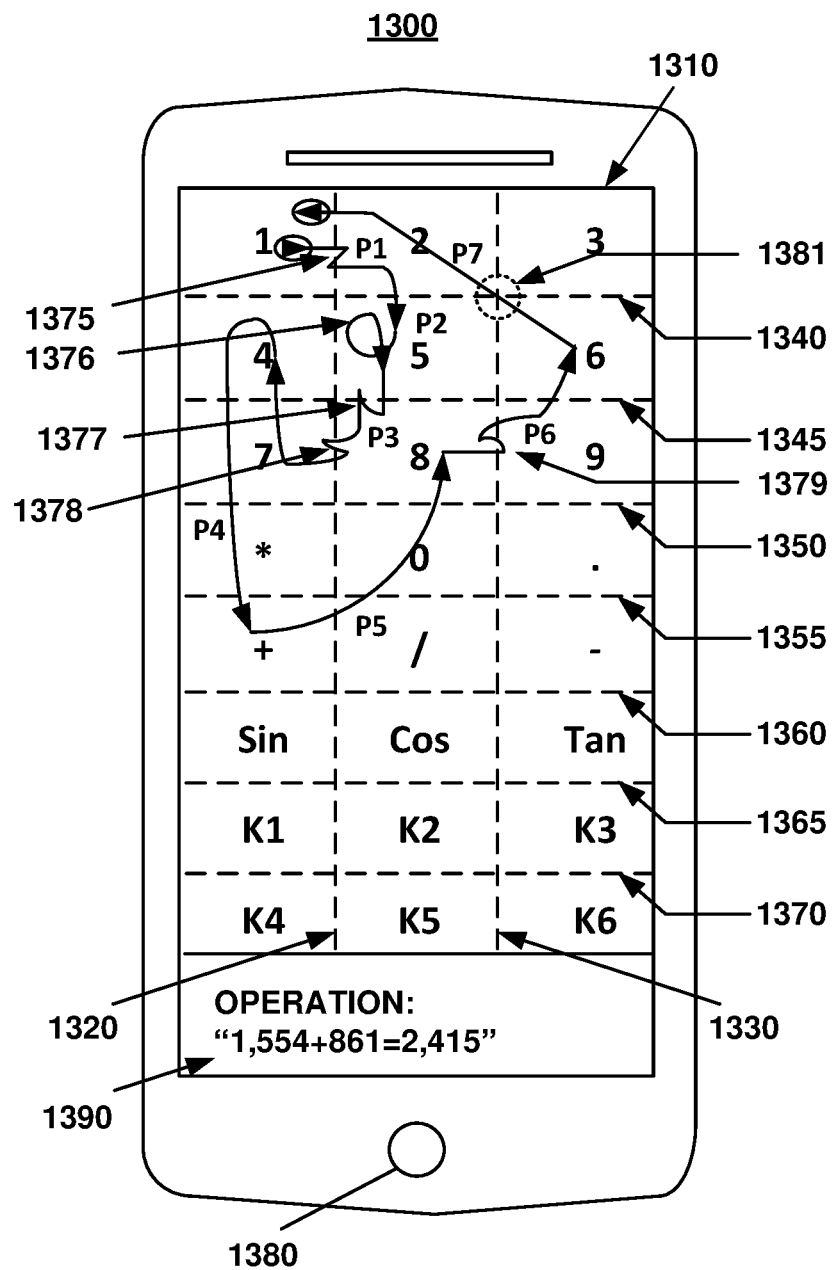

Referring now to FIG. 13, it illustrates a user station 1300 that can be used, for example, as a calculator. In this illustration, the user station displays an executable (and/or programmable) gridded interface 1310. The interface 1310 may be comprised of two sets of executable lines (or outlines) that form a plurality of tabulated cells (or keys). In this example, the interface 1310 includes a set of executable vertical lines 1320, 1330, and another set of executable horizontal lines 1340, 1345, 1350, 1355, 1360, 1365, 1370, that intersect to form numeric cells (1 through 0), function cells ("*" or multiplication, "+" or addition, "/" or division, "." or decimal, "Sin" or sine, "Cos" or cosine, and "Tan" or tangent). The interface 1310 may also include a plurality of programmable or selectable functions cells (e.g., K1-K6). In addition, the interface 1310 may include an operation cell that shows the arithmetic operation (or function or equation) being executed as well as the result.

In this example, the user starts by selecting the calculator function on the user station 1300. The user then starts drawing an uninterrupted (or partially uninterrupted) execution path that executes one or more functions or equations. The user starts the uninterrupted execution path at cell 1 to select "1" as the first digit, then draws path executable P1 that crosses executable line 1320, through cell 2, and into cell 5. Path P1 includes a sinuous section 1375, which is executed upon crossing, to instruct the user interface 1310 to ignore the next cell 2 (or more than one subsequent cell). In other terms, the user interface 1310 ignores the content of cell 2. The crossing of the executable line 1340 instructs the user interface 130 to select the next cell, i.e., cell 5 and accept its value, e.g., 5. As a result, the digits that are selected so far are "1" and "5."

The user then continues with drawing executable path P2 starting with cell 5. Although it would preferable for the user to avoid lifting the stylus to draw path P2, so that paths P1 and P2 form a continuous, uninterrupted line, it is possible for the user to lift the stylus once path P1 is completed, and then restart by drawing path P2.

Path P2 contains a repetition loop 1376 that instructs the user interface 1310 to re-select the content of cell 5. In this example, the repetition loop 1376 repeats the selection of the number "5" so that the selected digits so far are "1," "5," and "5." While the repetition loop 1376 is shown as an actual loop, it should be understood that the user interface 1310 may be programmed to interpret another graphical designation of the user's choice as a repetition loop, and thus the user interface 1310 is not limited to a specific loop.

The user then continues by drawing executable path P3, starting with cell 5, crossing the horizontal executable line 1345 with a sinuous section 1377 to ignore the content of cell 8, and then crossing the vertical executable line 1320 with another sinuous (or serpentine) section 1378 to ignore the content of cell 7, and then crosses the horizontal executable line 1345 to select the content of cell 4, namely the number "4". As a result, the selected digits so far are "1," "5," "5," and "4," generating the first number 1,554 to which the operation will be applied. Alternatively, the user may have drawn path P3 as going directly from cell 5, crossing the vertical executable line 1320, which would have rendered the same result.

Once cell 4 is reached, the user wishes to apply the addition operation to the selected number 1,554. To do so, the user can use a finger of the hand not holding the stylus, to press an omit function that is programmed on a start button 1380, in order to ignore all the executable functions until the desired operation is reached. It should also be understood that instead of selecting a physical button 1380, the use may select a functional key on the user interface 1310 in order to effect the same result. As an example, cell 6 may be program to execute the omit function.

In this example, the user wishes to ignore or omit the functions of all the cells it crosses until it reaches the addition (+) operation. So, the user draws an executable path P4 that terminates in the "+" cell. The user interface 1310 then executes the content of the addition cell.

The user then presses the omit function as explained earlier, and concurrently (or later) draws executable path P5 that ends in cell 8, instructing the user interface 1310 to accept (or select) the content of cell 8.

The user then continues drawing executable line P6, ignoring the content of cell, but selecting the content of cell 6. According to another embodiment, the user may select the omit function instead of drawing a sinuous section 1379, in order to omit the selection of the content of cell 9.

The user then continues by drawing executable path P7 through an intersection 1381 of executable horizontal line 1340 and vertical line 1330 (encircled within a dotted circle for ease of identification only), to end in cell 1, wherein the user lifts the stylus off the user interface 1310 to execute the operation as shown in the operation cell 1390.

Figure 14:
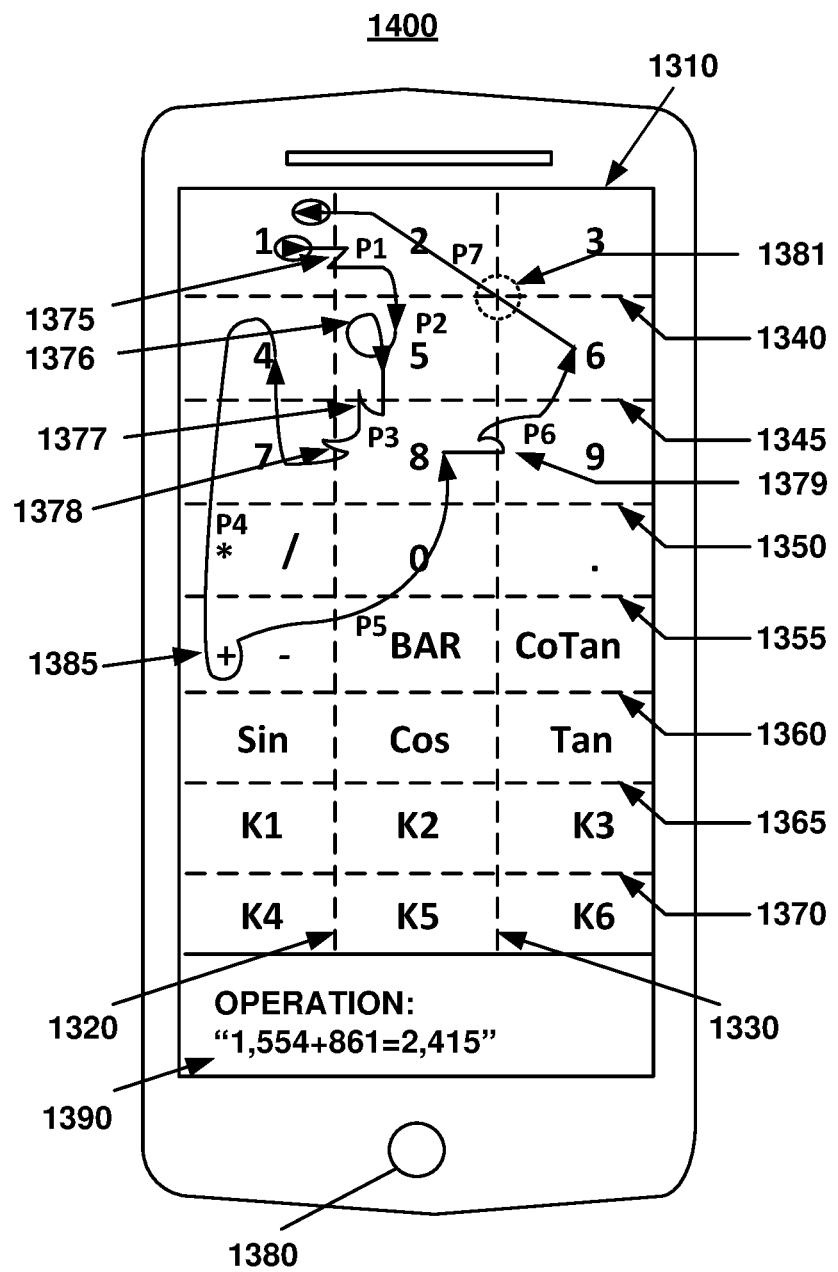

FIG. 14 illustrates another user interface 1400 that is substantially similar to the user interface 1300. The user interface 1400 illustrates the fact that one cell can contain more than one selectable and executable function. In this example, the "+−" cell shows two functions: addition and subtraction, from which the user can select. It should be understood that that more than two functions can be included in the cell, and the user has the ability to concurrently select more than just one function (or equation). In this example, the user decides to select the addition function, and so the user draws a loop (closed or open as shown) 1385 to instruct the user interface 1310 to execute the selected function (or alternatively to successively execute more two or more functions that are selected, in succession, using loops that are similar to loop 1385).

Figure 15:
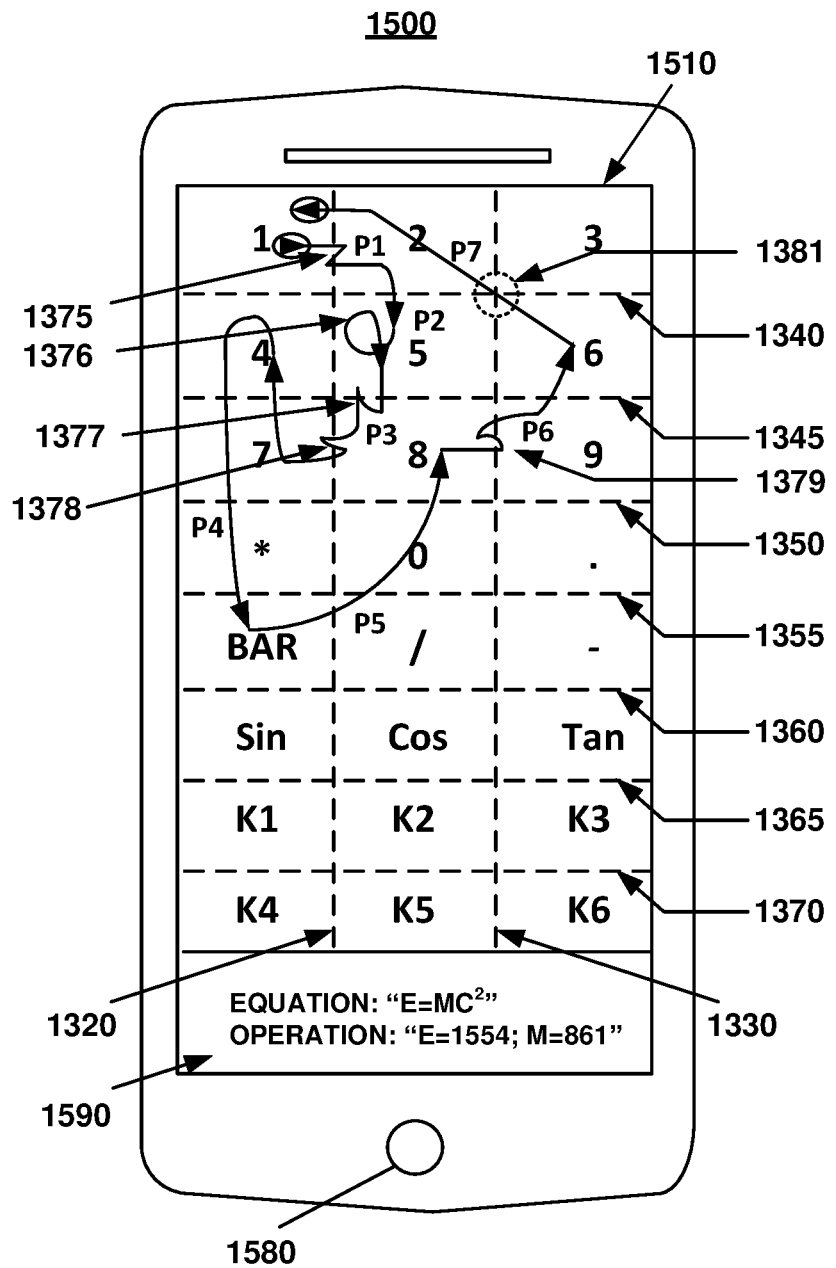

FIG. 15 illustrates another user interface 1500 that is substantially similar to the user interfaces 1300, 1400. The user interface 1500 illustrates the execution of an equation, e.g., $E=MC^2$. To do so, the user first selects the desired equation to be executed. For example, the equation could be preprogrammed in cell K1, and the user may simply press on cell K1 so that the equation to be executed appears in an execution display 1590. Thereafter, the first number to drawn by the user may be assigned to the first variable, E, in the equation, and the second number may be assigned to the second variable, C, it being understood that "M" represents a constant whose value is stored in memory 905 (FIG. 9). The units for each variable may also be stored in memory 905. In order to separate between the first and second numbers, a BAR cell is accessed between paths P4 and P5.

An execution button 1580 may be pressed by the user to start the execution of the operation and to generate an output. Alternatively, the processor 902 (FIG. 9) automatically executes the equation as soon as the numbers are entered by the users, without having to press the execution key 1580.

Figure 16:
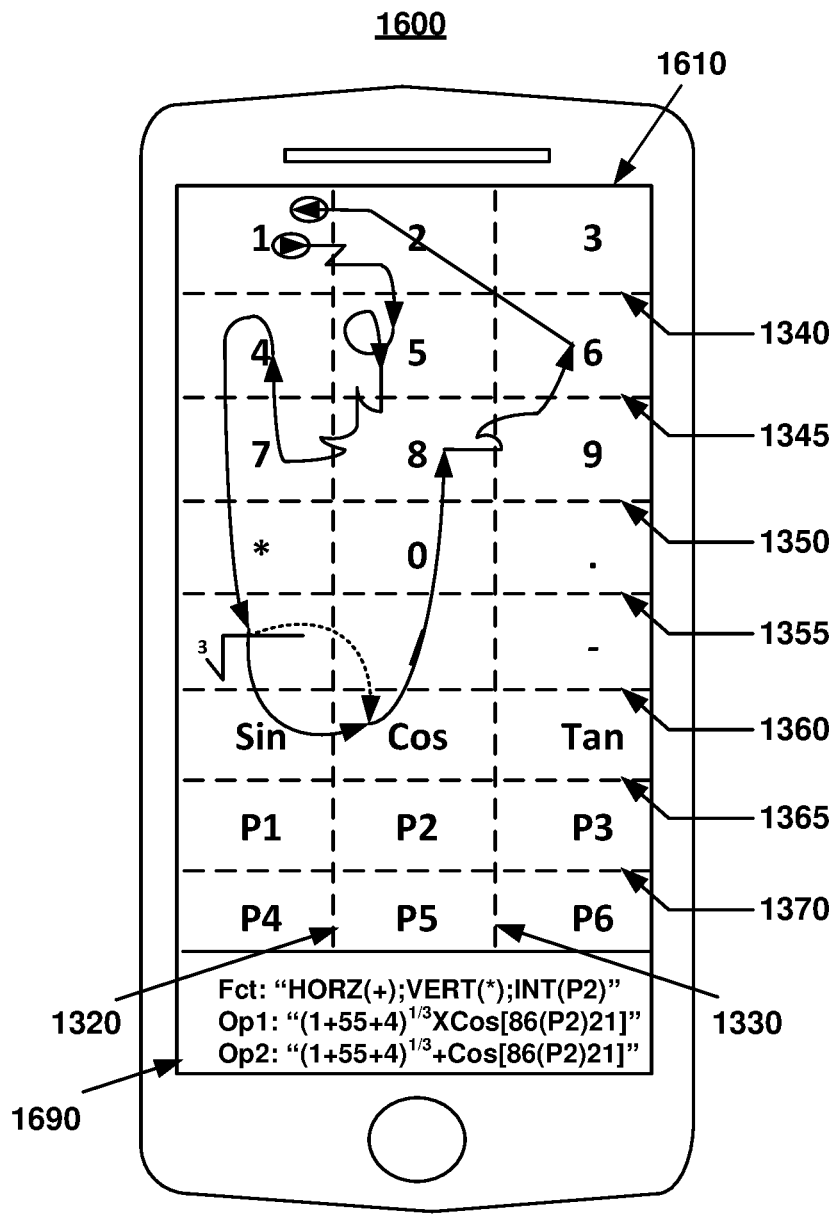

FIG. 16 illustrates another user station 1600 using an interface 1610, in a generally similar manner as the user interfaces 1400, 1500, with the added feature that the vertical and horizontal grid lines 1320 through 1370 are executable and thus, when the user draws a path that crosses any of these lines, a corresponding function is executed. In this example, an execution display 1690 illustrates the fact that the horizontal grid line executes an addition function, which the vertical grid line executes a multiplication function.

Figure 17:
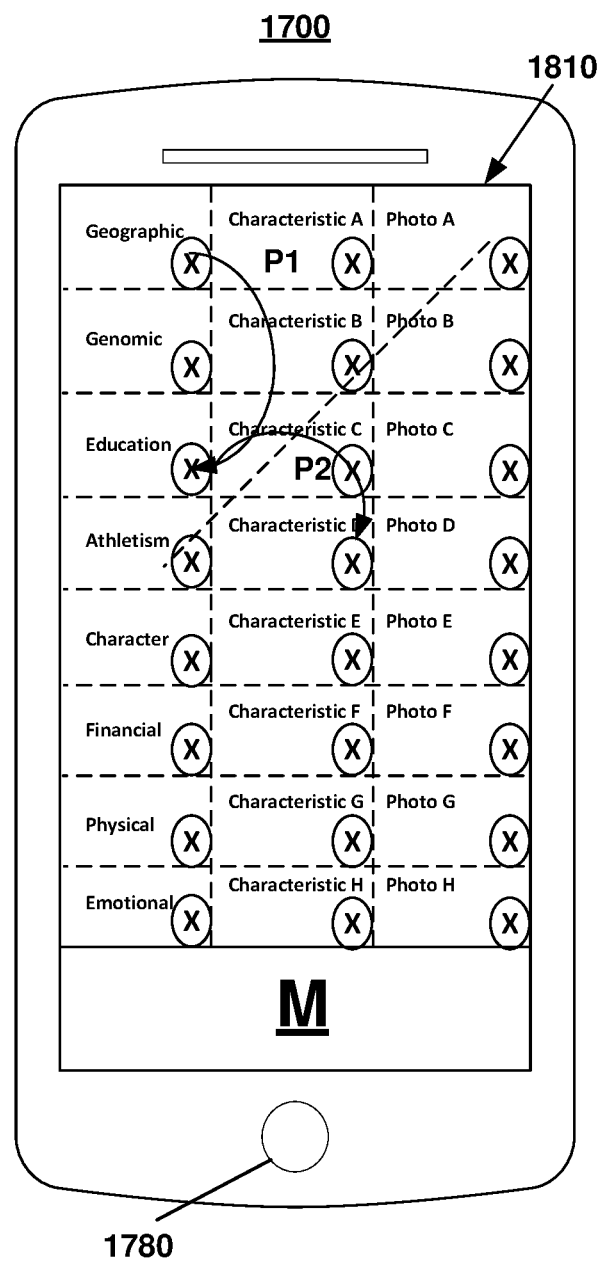

It should be noted that the user interfaces described herein are not limited to numbers and functions but may be used in various applications. FIG. 17 illustrates one such application wherein a user station 1700 includes a user interface 1710 that enables social matching of people. In this example, the user starts by selecting the Geographic cell by pressing the "X" in this cell, then draws path P1 to select the Education cell by pressing the "X" in this cell, and then draws path P2 to select a pre-programmed personal characteristic (such as desired blood type (or not a blood type), genotype, phenotype, homozygous recessive gene (aa), homozygous dominant gene (AA), heterozygote gene (Aa), etc.). In more sophisticated medical or biotechnological related applications, the available choices may include various alleles, molecules, nuclei, vector size, and/or other factors.

Figure 18:
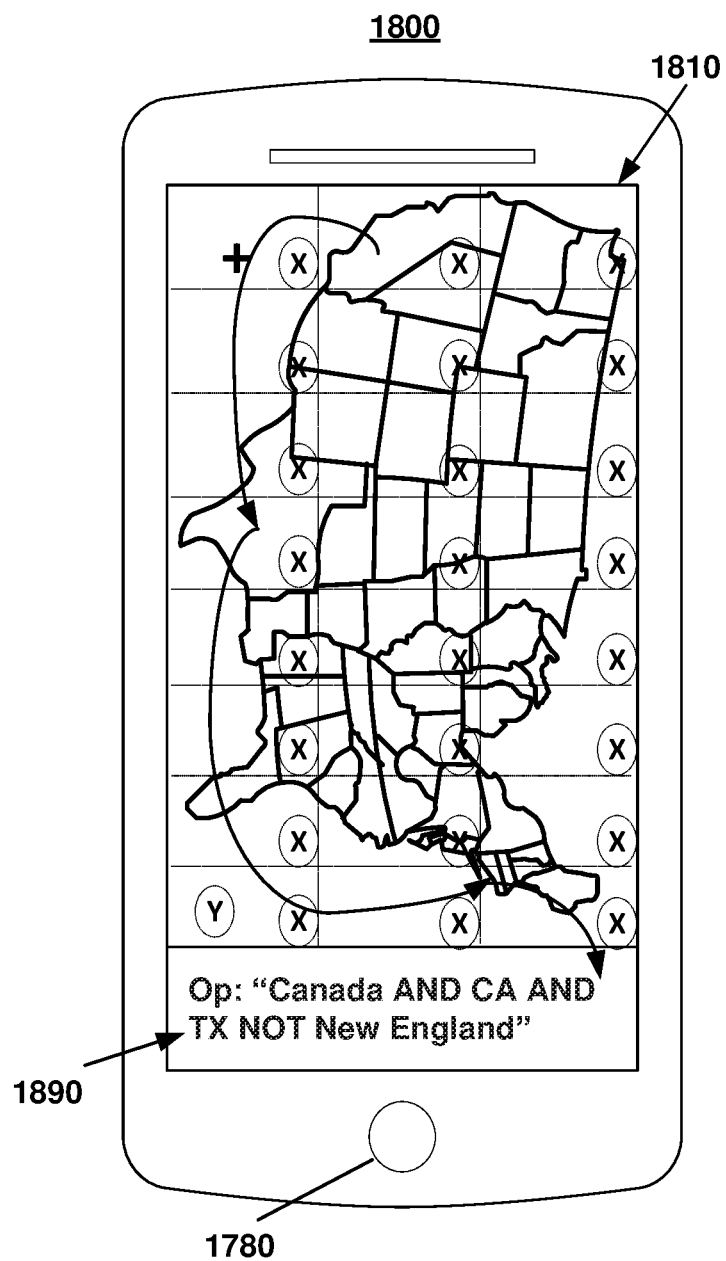

With each selection of the "X" in the cell, such as the Geographic cell, the user interface 1710, open a new user interface 1810 (FIG. 18) to enable the user to make additional selections (or filters) in this new user interface 1810, and when done, the user is returned automatically to the original user interface (or dashboard) 1700. The user interface 1810 allows the user to select the countries of interest using operations as described earlier to make specific selections, with the operation and the result being displayed in the display cell 1780. Once the selection is completed, the user may either press a selection (or return) key 1780 (using his/her finger) to return to the dashboard user interface 1710, or alternatively the user may select to draw a path to an exit cell that is labeled "Y" within a dotted circle (FIG. 18).

Figure 19:
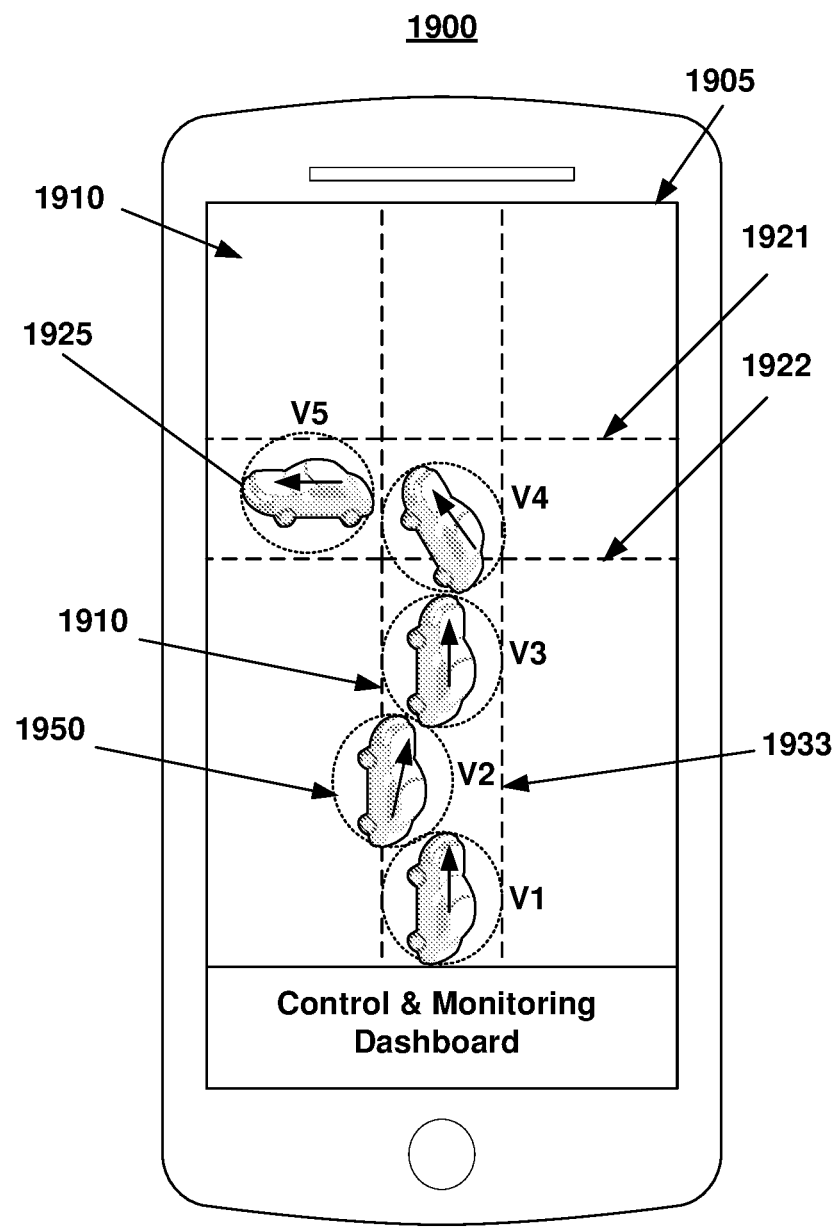
FIG. 19 illustrates a vehicle GPS or travel monitoring and control application on a gaming station, according to one aspect of the present disclosure.

The present invention may have applications beyond a portable communications user station. As an example, FIG. 19 illustrates a vehicle GPS, or travel monitoring and control application on a gaming station 1900, according to one aspect of the present invention. The gaming station includes a touchscreen 1905 which illustrates a gridded user interface 1910 that enables the gaming station 1900 to control the movements or characteristics of characters or items (in this example a vehicle 1919). In this example, the vehicle 1919 is racing on a path delineated by the executable grid between the executable vertical lines 1910, 1933, and the executable horizontal lines 1921, 1922.

Another application that may be similarly be associated with the station 1900 is the actual control of a vehicle (such as a driverless vehicle or for recording traffic violations). In this application, each of the executable lines of the executable grid may be programmed to execute a function or equation, as the executable line is crossed by the vehicle 1925. More specifically, position V1 of the vehicle 1925 shows that the vehicle is proceeding within the designated path, within the acceptable speed limit, and in the correct direction (as illustrated by the arrow) and as a result, no corrective action is desired.

At position V2, the vehicle 1925 has crossed the vertical executable line 1910, causing the execution of the function or algorithm associated with line 1910. The execution could be automatic or, in an alternative embodiment, in the form of a recommendation to the user to take the appropriate action. In this illustration, the angle of the arrow atop the vehicle 1925 with vertical line 1910 changes (sometimes visibly to the user) to aid (for example, the driver) in correction the driving path of the vehicle 1925. These arrows are referred to herein as "corrective" or "predictive" arrows.

In operation, the executable grid is overlaid onto the map of travel, so that each of the executable lines is defined and shown overlaying the map of travel. As the vehicle crosses an executable line, the associated function is automatically executed by the vehicle 1925.

In another embodiment, each vehicle is shown to be surrounded by a virtual, executable bubble 1950 (illustrated in dotted line), whose coverage is larger than that of the vehicle 1925, so that the bubble 1950 pre-crosses any one of the executable lines, prior to the actual vehicle 1925 crossing that executable line. As a result of such pre-crossing of the executable line by the bubble 1950 provides an advance warning or pre-execution of a function, equation, or algorithm, to minimize the effect of the upcoming crossing, or to take corrective action. It should be understood that such a pre-crossing prediction feature is equally useful in real-time, actual, physical applications, including but not limited to driverless vehicles.

In addition, this and other features of the present invention may have military applications, such as for munition, arms, drone, etc. airborne deployment, wherein the virtual projection of the airborne body path on a virtual or actual touchscreen with executable lines, provides means for automatically executing correctives measures or other flight measures, when the path of the airborne object crosses an executable line, cell, or outline. In this and similar applications, the user does not enter the path, such as Paths 1, 2, 3, 4, 5, 6, etc., as explained earlier; rather, it is an event (such as the driving path of the car) that causes an executable path to be drawn. This novel feature is referred to herein as an "event-driven path entry" or "event-driven path simulation."

Another feature of the executable outline, lines, or cells described herein is that they could be used as predictive indicia as well as self-correcting or self-executing functions that alter or affect the future path factors (e.g., speed, stability, angular velocity, angle of travel, etc.) for the object in travel. As an example, the travel of a drone, represented herein simplistically by a vehicle in FIG. 19, could be changed or altered. For illustration purpose, once the drone (as represented in FIG. 19 by vehicle V4) crosses the executable line 1922, its angle of travel relative to line 1933, as well as its velocity, flight angles, rotational angles, and similar other flight parameters, can be measured, and the embedded, self-executing function represented by the executable line 1922 be executed to correct or alter the flight path of the vehicle. In other applications, other parameters, such as external factors (e.g., pedestrians' presence, etc.) can be used to alter the driving path of a driverless vehicle.

It should be understood that while the present illustration is described in term of a continuous swipe, other strokes or swipes can be used, including discontinuous swipes. Furthermore, the swipe could possess additional dimensions, such as the speed and pressure at which the swipe (or stroke) are drawn. The variability of these dimensions could also affect, for example the selection and execution of the various modules in the user station.

In an alternative embodiment where the picture or video reaction is insufficient, a reaction analysis module (which could be an integral part or external part to the user station) analyzes the reactions and provides an additional review (or dimension) to the recipient's reaction, whether as a written message, or as a control signal that executes a specific application on the user station. As the user station learns from the reactions (such as by artificial intelligence), the user station can be a predictor or the recipient user's reactions, and can execute the appropriate instructions or applications.

The present application may also be used in database searching, organizing, and categorizing. The input to the user station may then be any kind of input, related to genomics, genes, sound, frequencies, colors, wavelengths, letters, numbers, etc. If the user wishes to narrow down a result of a database search with specific features (e.g., homozygous recessive genes) the user can add a search term by selectively using a swipe (or another motion) as described herein.

Figure 20:
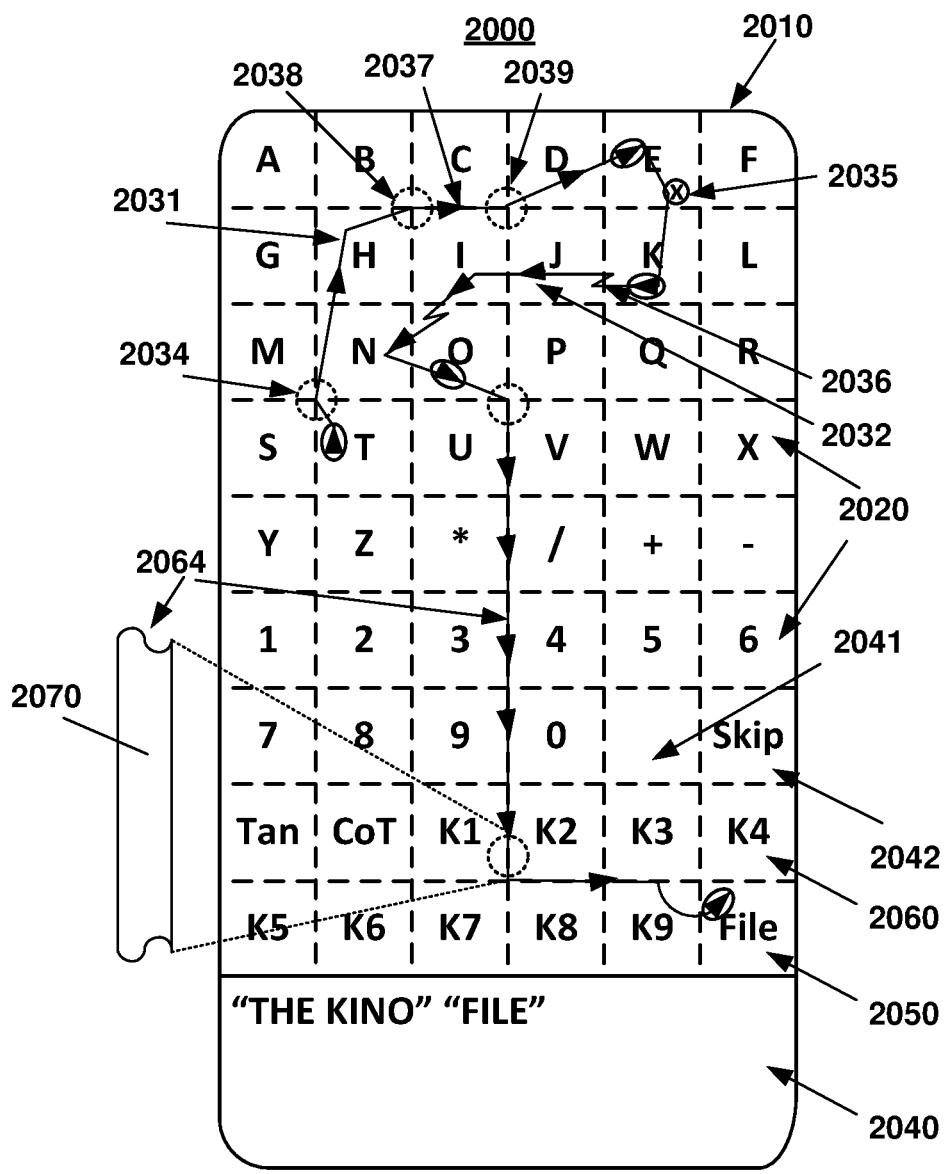
FIG. 20 illustrates another exemplary user station of FIG. 2, specifically illustrating exemplary alpha-numeric and function entries, depicting the gestural use of the gridded interface according to still another embodiment of the present invention.

In this regard, FIG. 20 illustrates another exemplary user interface 2000 of FIG. 2, specifically illustrating exemplary alpha-numeric entries and executable functions, and depicting the gestural use of the gridded interface according to still another embodiment of the present invention. To this end, the user interface 2000 includes an executable grid 2010 that forms a plurality of executable cells 2020. These executable cells 2020 include for example, numeric entries, alphabetical entries, functions, and various files. These files could include, for example, data, still images, video, and/or audio files.

In an exemplary use, a user wishes to enter the two words "THE KINO." According to the present invention, the user has the option of entering two distinct paths 2031, 2031 or a single path in order the enter the two desired words.

More specifically, the user starts by selecting the first letter "T" and wishes to enter the second letter "H" by traversing various intermediate executable cells, without triggering or executing the corresponding functions of these intermediate executable cells. To this end, path 2031 continues from the executable cell "T" to an executable node 2034, which can be, in this particular example, a corner of the executable cell "T." In this example, node 2034 executes a pre-defined function "IGNORE FUNCTION OF FOLLOWING CELL" which basically disregards the next executable cell, i.e., "N" along path 2031. While this example illustrates the use of an executable corner, it should clearly understood that other executable designations (e.g., an X in a circle 2035) or specific wiggling motions (e.g., serpentine or zig zag motion 2036), a blank cell 2041, a "SKIP" cell 2042, or any similar notations or an outline 2037 of the executable cell could alternatively be used.

Path 2031 continues through executable cell "H" without selecting it (that is without executing its embedded function). Path 2031 then continues to executable node 2038, then continues along the outline 2037 of executable cell "C" still without triggering the function (i.e., selecting its content), and continues to node 2039 of executable node "D," all without triggering its function. Path 2031 then continues to executable cell "E" selecting it, to form the first word "THE."

At this stage, the user has the option of either discontinuing path 2031 by removing, for example, the stylus from the touchscreen or grid 2010, or continuing path 2031 by selecting, in this illustration, the executable designation 2035, effectively adding a space and starting a new word by executing the next cell "K." Path 2032 then continues as described earlier in connection with the first word "THE."

An additional feature of this process is the addition of a visual, interactive screen 2040 that can be variably floating above executable grid 2010 or at a fixed location, such as at the bottom of the executable grid 2010. The screen 2040 assists the user by providing a visual representation of the paths 2031 and 2032, on a real time basis, as these paths develop or even before the next entries are selected.

Yet an additional feature of this process is the selection of files 2050 to accompany the alphanumeric entries or functions e.g., 2060. In the foregoing example, the user continues path 2032 downward, as path 2036, along the executable outlines of numerous executable cells, and then to the right until it reaches executable cell "K3" and then continues therefrom to the executable cell "FILE" 2050, selecting its content, or executing the function of opening up a separate, secondary search window which allows the user to select the file to attach, without affecting the accumulated selections that were previously made, as described earlier.

Still another feature of the present invention is the shaping of the executable outlines, such as executable outline 2060, in a shape that allows the capture of the intended movement while allowing for a certain degree of variation. More specifically, the present invention recognizes that while the selection process described earlier depends at least in part, on the use of straight lines, such as following outline 2064, and further depends on the speed and accuracy of the various entries. To this end, the executable outlines may be shaped so as to capture variations of the movements. In one example, the linear outline 2064 is shaped as a trough 2070 with enlarged width.

It should be understood that while the above illustration of FIG.>20 shows the executable grid 2010 as being formed a similarly dimensional executable cells, these executable cells may have different dimensions or shapes.

Figure 21:
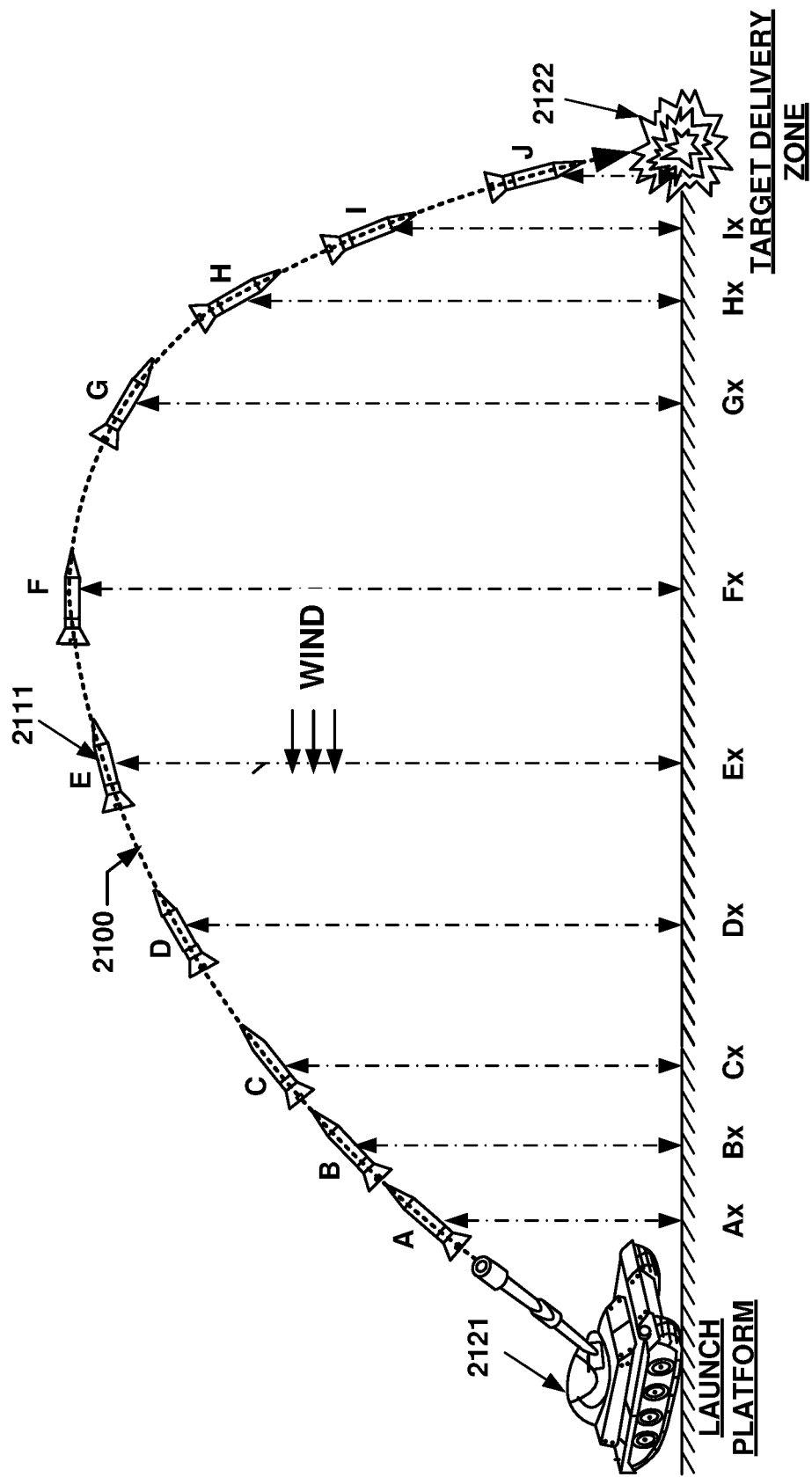
FIG. 21 illustrates a conventional projectile (i.e., missile, munition, or artillery) flight path, accounting for two-dimensional extrinsic forces that affect the optimal flight path.

FIG. 21 illustrates a conventional flight path 2100 of a projectile (i.e., missile, munition, or artillery) 2111 flight path, accounting for two-dimensional extrinsic forces, such as resistance due to winds, that affect the target optimal flight path. FIG. 21 illustrates a launch platform 212, a target delivery zone 2122, and various trajectory points (or reference points) A through J, along the flight path 2100. It would be desirable to account for unpredictable three-dimensional extrinsic forces and to enable the projectile 2211 to self-course adjust its flight path 2100 without remote input.

Figure 22:
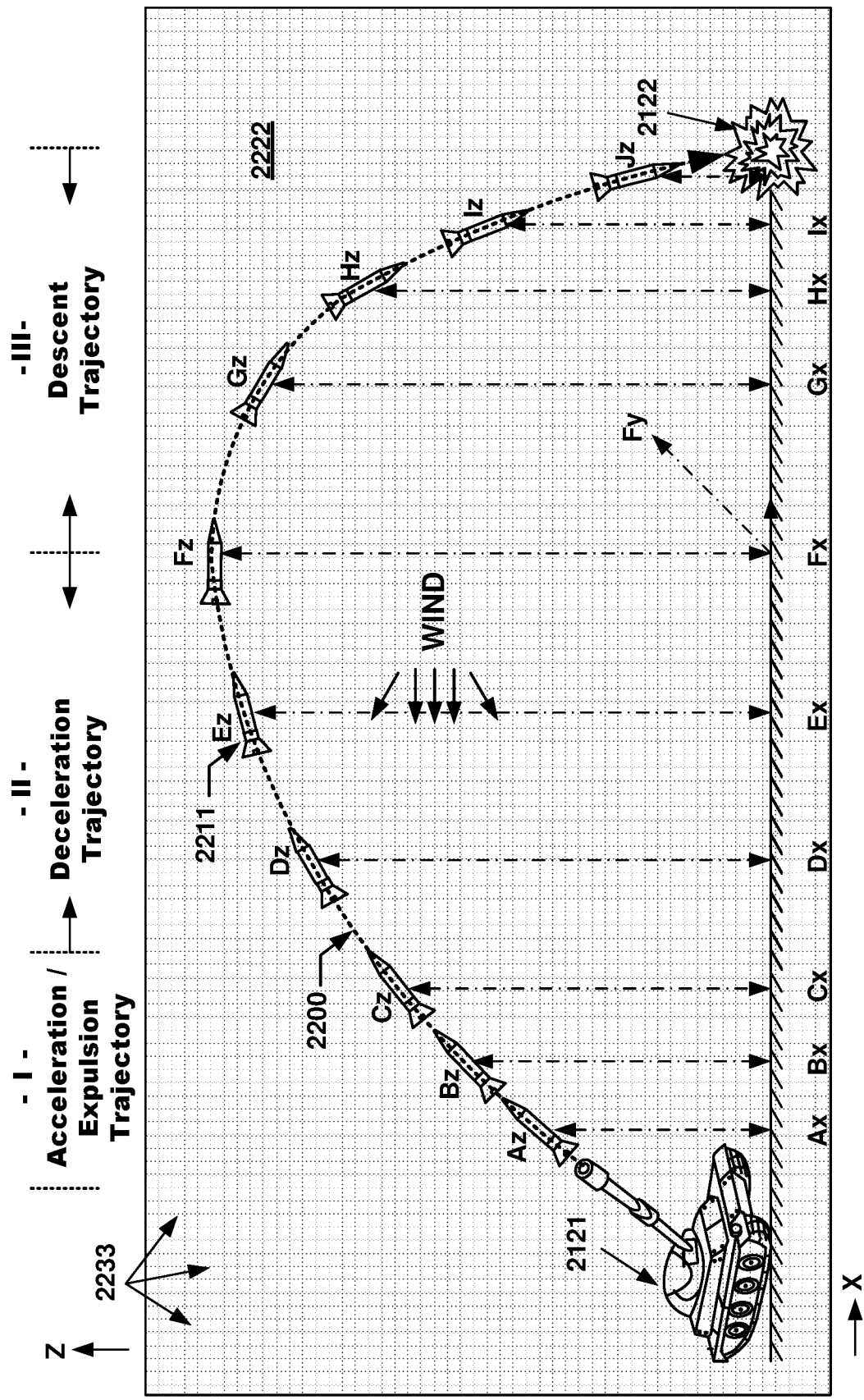
FIG. 22 illustrates a self-corrected flight path of a novel projectile according to one embodiment of the present invention, which accounts for unpredictable three-dimensional extrinsic forces without remote input.

FIG. 22 illustrates a self-corrected flight path 2200 of a novel projectile 2211 according to one embodiment of the present invention, which accounts for unpredictable three-dimensional extrinsic forces without reliance on corrective remote inputs. It should be understood that while the present invention is disclosed in connection with missiles, the same, equivalent, or similar concept would be applicable to various applications, including but not limited to self-driving vehicles, drones, etc.

In this illustration, the optimal flight path 2200 and/or the actual flight path of the projectile 2211 is/are superposed onto an executable grid 2222 which is described herein. In another embodiment, the optimal flight path 2200 contains an acceptable margin of errors. The executable grid 2222 defines a plurality of executable outlines or cells 2233.

In use, as the actual flight path (or alternatively the optimal flight path 2200) intercepts an executable outline or cell 2233, the recorded data are compared to the optimal flight path data, and self-course correction is made to the actual flight path so that it corresponds as closely as possible to the optimal flight path 2200. The recorded data may include for example, the flight time, missile velocity and acceleration, altitude along a Z-coordinate axis, horizontal distance traveled along an X-coordinate axis, and lateral deviation along a Y-coordinate axis.

More specifically, the optimal flight path 2200 undergoes three trajectory phases:
  Phase I: Acceleration/Expulsion Trajectory
  Phase II: Deceleration Trajectory
  Phase III: Descent Trajectory
Phase I covers the expulsion of the projectile 2211 from the launch platform 2121 during which the projectile 2211 accelerates. Phase II covers the deceleration trajectory of the projectile 2211 until the projectile 2211 reaches the apogee Fz, when the projectile 2211 reaches zero velocity. Phase III covers the descent trajectory until the projectile 2211 accelerates and reaches the intended target zone 2122.

In order to accommodate such variation in the acceleration of the projectile 2211, the executable grid 2222 may include executable cells 2233 of different sizes. As an example, the size of the executable cells 2233 along at least part of the Phase I: Acceleration/Expulsion Trajectory may be smaller than the executable cells 2233 along at least part of the Phase II: Deceleration Trajectory, but about equal is dimensions to the cell 2233 along at least part of the Phase III: Descent Trajectory. In this way, the monitoring of the overall trajectory would be done at about equal intervals of time, or to represent a gradient of variations.

Figure 23:
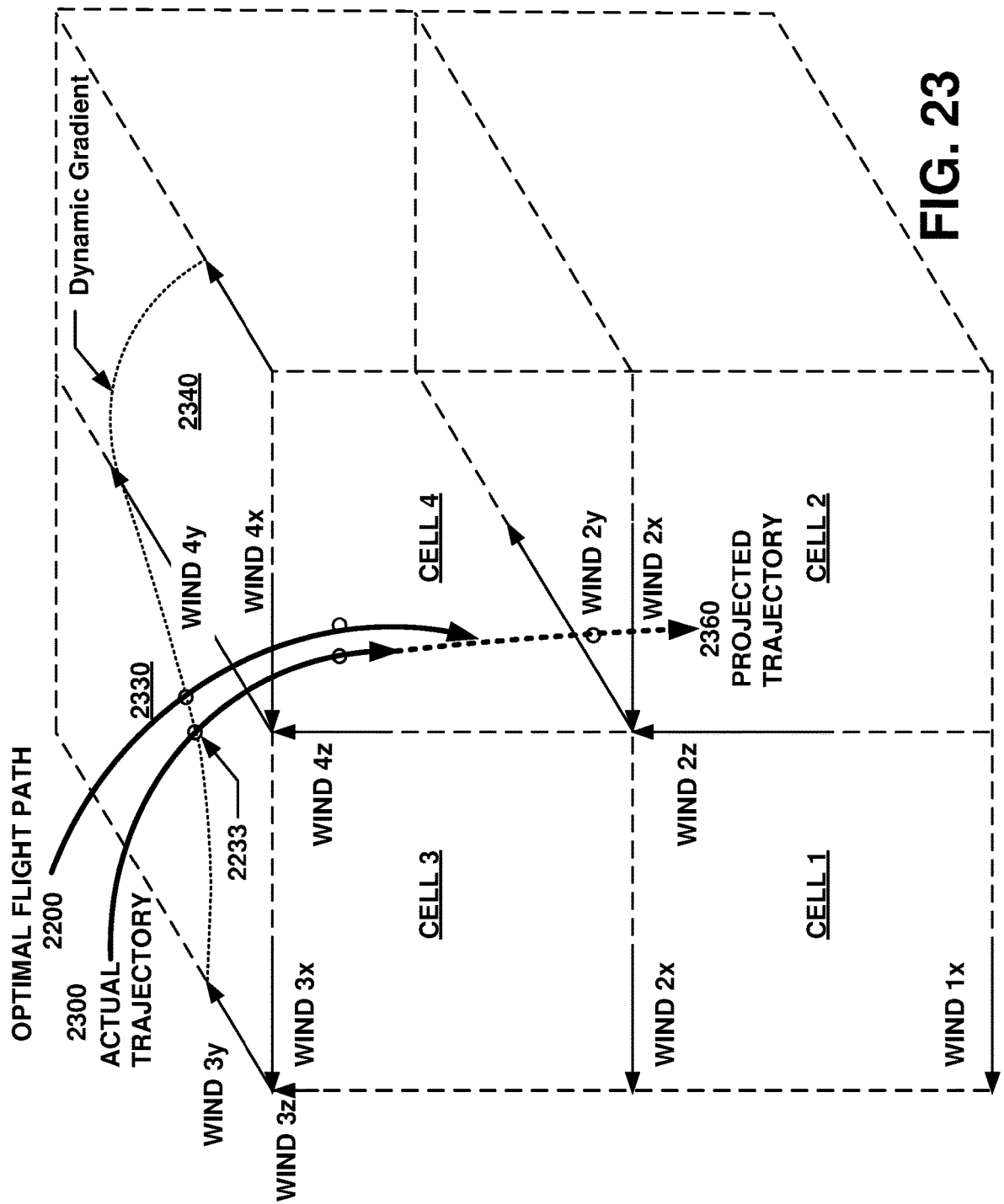
FIG. 23 illustrates a three-dimensional representation of four exemplary executable cells comprised within the executable grid, according to one embodiment of the present invention.

FIG. 23 illustrates a three-dimensional representation of four exemplary executable cells (e.g., Cell 1, Cell 2, Cell 3, Cell 4) that are comprised within the executable grid 2222 of FIG. 22, according to one embodiment of the present invention. The representation shows the various three dimensional components of wind, as a representative resistive force (e.g., WIND 3X, WIND 3Y, WIND 3Z). Furthermore, the representation illustrates the resistive forces as a dynamic gradient on two 2-dimensional faces 2330, 2340 of Cells 3 and 4, respectively.

In operation, as the actual trajectory 2200 of the projectile 2211 enters an executable cell, such as Cell 3, at entry point 2233, such entry triggers the execution of a function embedded within (or at the side face or faces) of Cell 3. As an illustrative example only, the executed function includes projecting the actual trajectory 2300 of the moving or travelling object (i.e., projectile 2211) onto the executable grid 2222, in a three-dimensional coordinate system that defines the executable cells, i.e., Cell 3, as three-dimensional shapes or outlines. As an exemplary illustration only, the shape of the executable Cell 3 may be a cube, wherein each of its six side faces, eight corners, twelve sides, and interior space may be independently executable, that is if a trajectory (representing a travel path or any similar path) intersects any of the constituent components (i.e., side faces, corners, sides, and interior space) of Cell 3, then a predetermined or learned function may be executed to effect a desired result (such as changing or altering the course of travel of the object).

In this particular illustration, the actual trajectory 2300 intersects the side face 2330 of Cell 3 and causes the corresponding embedded function to be executed. As an example, the interface will compute the various resistive wind components, the actual velocity of travel, the acceleration, the geographical position of object, the time of travel, etc., from which the interface will generate a projected trajectory 2360, and will compute the deviation of the actual and projected trajectories 2233, 2360 from the optimal flight path 2200. Based on these calculations, the interface will cause the object to deviate from its projected trajectory 2360, rapproaching it to the extent possible to the optimal flight path 2200. One method of causing such on-board, independent deviation will be described below.

Figure 24:
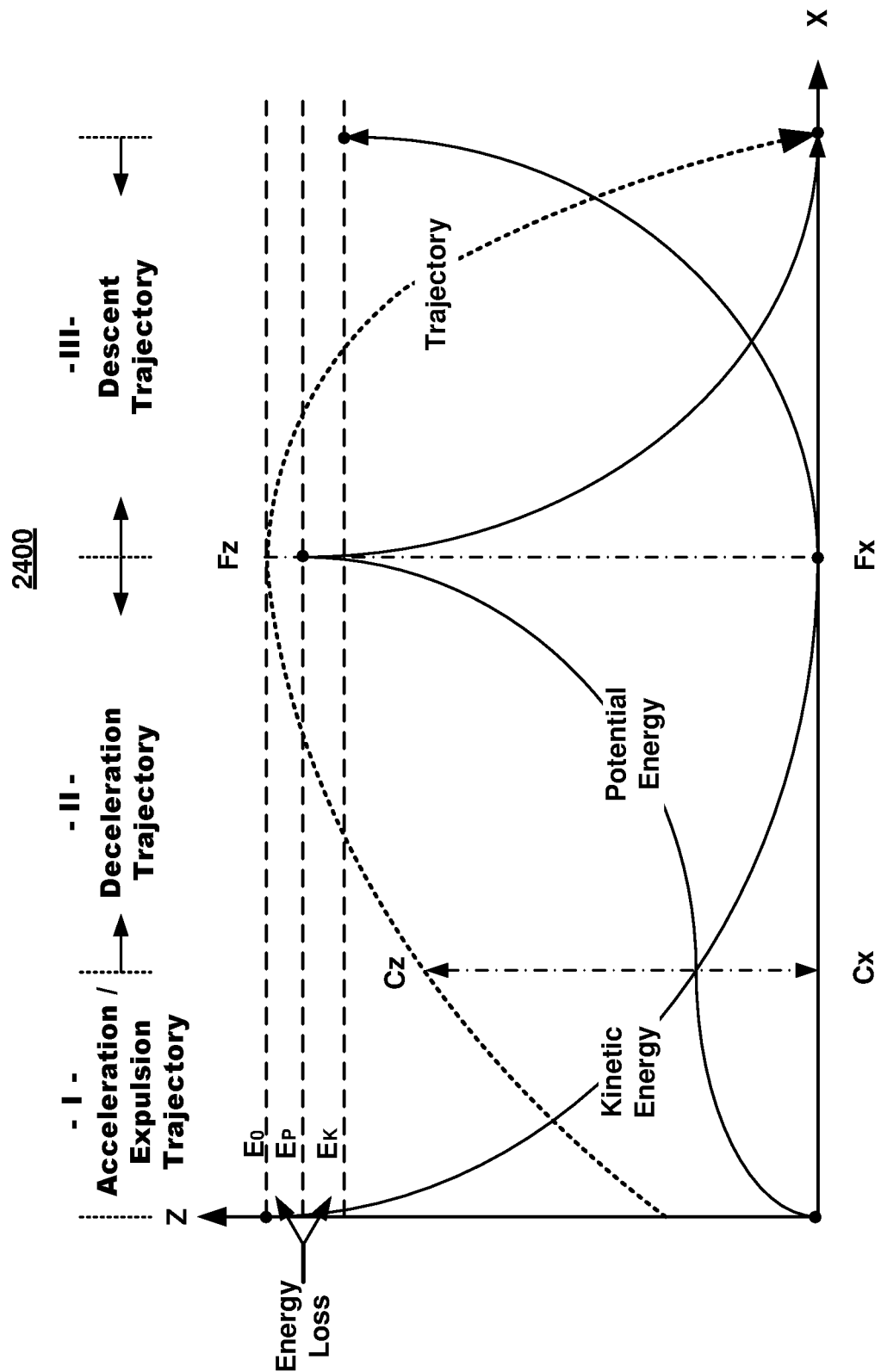
FIG. 24 illustrates an energy chart that illustrates the conversion of kinetic energy to potential energy and vice versa during the three phases of the flight trajectory of the projectile of FIG. 22.

FIG. 24 illustrates an energy chart 2400 that illustrates the conversion of kinetic energy to potential energy and vice versa during the three phases of the flight trajectory of the projectile 2211 of FIG. 22. Although this energy chart 2400 is shown as a two-dimensional illustration, it should be understood that a three-dimensional illustration could be extrapolated therefrom. In addition, this energy chart 2400 may be used by the interface of the present invention to rapproach the projected trajectory 2360 or the actual trajectory 2300 to the optimal flight path 2200, as discussed earlier in connection with FIG. 23.

Figure 25:
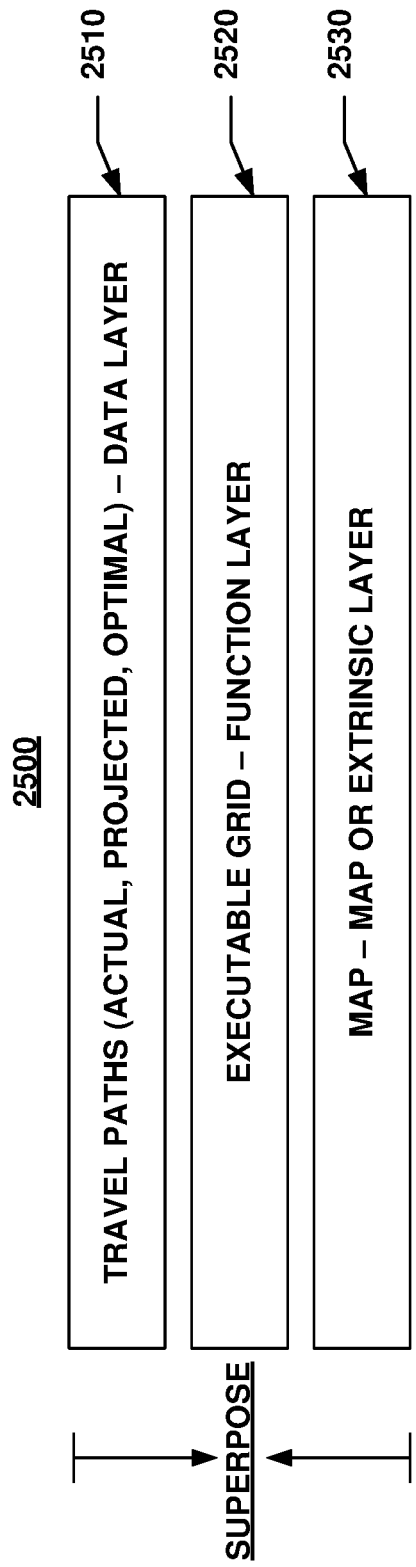
FIG. 25 illustrates the process of superposing one or more travel paths (i.e., actual, projected, and/or optimal) onto an executable grid, and further onto a map.

FIG. 25 illustrates the process 2500 of collecting and/or superposing one or more travel paths (i.e., actual, projected, and/or optimal) 2510 onto a graphical (or graphic-based) data layer. A predetermined executable grid is formed or prepared onto a function layer at 2520. A graphical map is prepared onto a map layer at 2530. The interface of the present invention projects the data layer onto the executable function layer and optionally onto the map layer. In one embodiment, the data is added to the data layer on real time basis and a data graph is prepared from the collected data. The graphical collected data is then projected onto the function layer at 2520 either as the data is collected or at some time thereafter.

In this particular example, the map 2530 may include alternative routes and/or obstacles (including resistive paths) to be accounted for by the interface of the present invention, to modify or otherwise track or alter the travel path of the travelling object. It being understood that the superposition of the travel paths 2510 onto the executable grid 2520 has been described earlier in connection with FIGS. 22 through 24.

Figure 26:
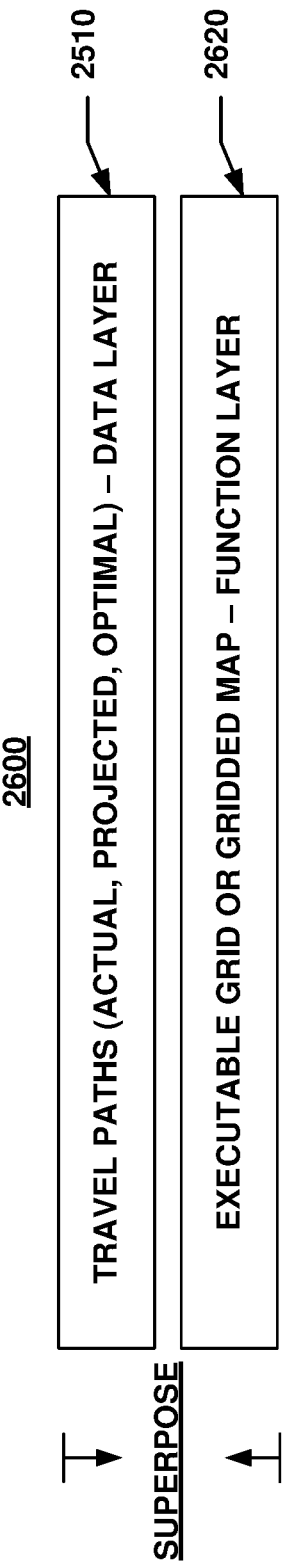
FIG. 26 illustrates an alternative process of superposing one or more travel paths (i.e., actual, projected, and/or optimal) onto an executable map.

FIG. 26 illustrates an alternative process 2600 of superposing one or more travel paths (i.e., actual, projected, and/or optimal) 2510 onto an executable gridded map 2620. The executable map 2620 may use the various features of the executable gridded map 2620 as executable outlines whose intersection with the travel path causes defined functions to be executed, such as deviation of the travel path to avoid obstacles, following different paths based on predicted obstacles, etc.

Figure 26A:
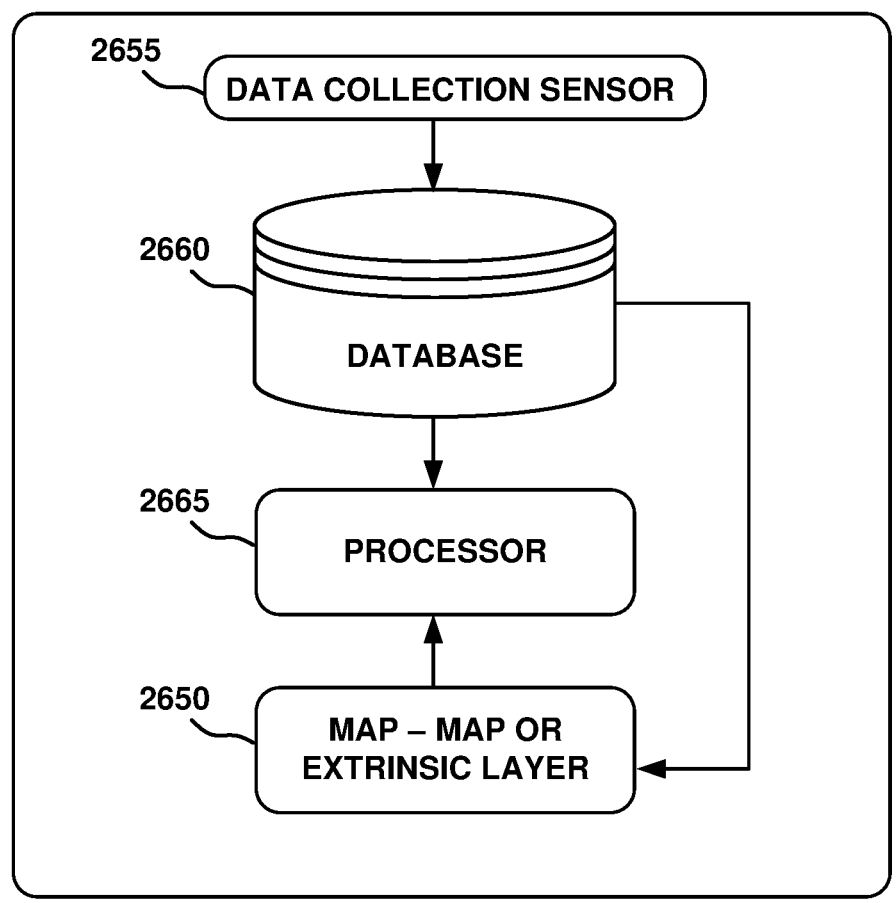
FIG. 26A illustrates an interface for implementing the processes of FIGS. 25 and 26.

FIG. 26A illustrates an interface 2650 for implementing the processes 2500 and 2600 of FIGS. 25 and 26, respectively. Interface 2650 automatically executes commands or functions with regard to collected data. It comprises a sensor 2655 for collecting data and for deriving a graphical data representation from the collected data onto the data layer 2510.

A storage, including but not limited to a database or memory 2660 stores a graphical executable grid that defines an executable outline onto a function layer 2520.

A processor 2665 overlays the data layer 2510 including the graphical data representation (or alternatively the data points as they are collected such that consecutive data points are theoretically or graphically connected or extrapolated to form a complete or partial graphical representation of collected data points) onto the function layer 2520 (or vice versa). As a result of such overlay or projection, the graphical data representation intersects the executable grid. In which event, an intersection of the executable grid by the graphical data representation causes a function embedded within an intersected outline (or alternatively or additionally within the intersected or traversed executable cell) to be executed sequentially based on the collected data.

As further illustrated in FIG. 25, a map or an extrinsic layer 2530 may optionally be overlaid onto the data layer 2510 and the function layer 2520. The map or the extrinsic layer 2530 may provide additional extrinsic details, such as the existence of obstacles, disturbances, munitions in a mine field, or various geographical landscapes, etc. that may affect, for example, the object flight/travel path or provide data to help the artificial intelligence learning process to, for instance, predict required variations to the flight/travel path.

Figure 27:
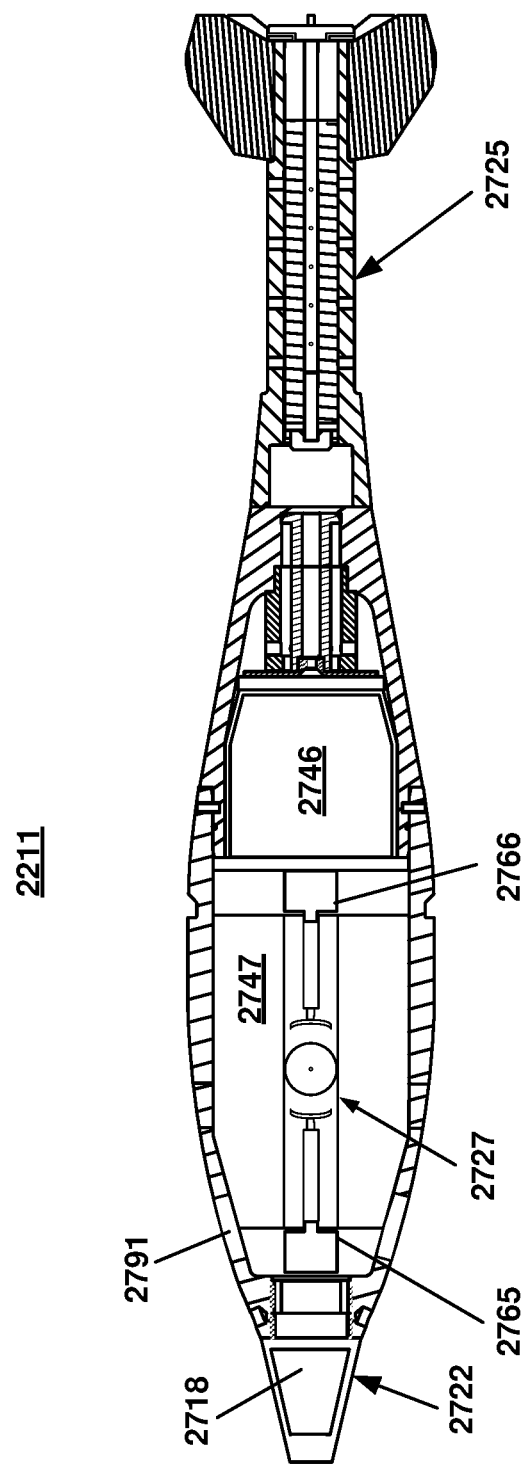
FIG. 27 is a cross-sectional view of the projectile of FIG. 22, illustrating an exemplary course self-correcting mechanism according to one embodiment of the present invention.

FIG. 27 is a cross-sectional view of the projectile 2211 of FIG. 22, illustrating an exemplary course self-correcting mechanism 2727 of the present invention. The projectile 2211 generally includes an absorbing tip 2722 that deforms upon impact with the target 2122, so that it absorbs the shock energy and prevents it from propagating internally to the components contained within the projectile 2211.

A guidance and navigation system 2718 may be located within the tip 2722. A GPS antenna 2791 allows for the acquisition of GPS satellites for pre-deployment guidance. the GPS antenna 2791 allows for the acquisition of GPS satellites, if needed. The course self-correcting mechanism 2727 may be located within a chamber 2747 and aims at correcting the course of the missile 2211.

An internal payload chamber 2746 houses a payload (not shown). The chamber 2747 may optionally contain an additional or different payload (not shown). The projectile 2211 terminates in a fin assembly 2725.

The course self-correcting mechanism 2727 will now be described in more detail in connection with FIGS. 28, 29, and 30. In a preferred, exemplary embodiment, the course self-correcting mechanism 2727 includes a mass 2800, for example a spherical metallic ball, having a center of gravity 2828. As shown in the resting position of FIGS. 28 and 29, whenever no changes are to be made to the flight path of the projectile 2211, the center of gravity 2828 of the course self-correcting mechanism 2727 generally or substantially (i.e., within an acceptable tolerance range) coincides with the center of gravity of the projectile 2211.

In this particular embodiment, the course self-correcting mechanism 2727 may further include any of two, four, or six telescoping arms 2810, 2820, 2830, 2840, 2840, 2850, 2860 each fitted at its corresponding end, with a movable pad (or flexible pad) 2811, 2821, 2831, 2841, 2841, 2851, 2861, respectively. Each of the telescoping arms 2810, 2820, 2830, 2840, 2840, 2850, 2860 is capable of moving independently so as to mass 2800 to a desired position (preferably along a track, not shown). As the mass 2800 moves its center of gravity is relocated, causing a shift in the overall center of gravity 2828 to a new position 2882 (FIG. 30), resulting in a variation in the projectile flight path, so as to compensate for undesirable extrinsic (or intrinsic) factors and to rapproach the actual flight path to the desired optimal flight path. In addition, the course self-correcting mechanism 2727 may further be provided with ruggedized servo motors 2765, 2766 (FIG. 27) that regulate the movement of the telescoping arms 2810, 2820, 2830, 2840, 2840, 2850, 2860 under the control of the guidance and navigation system 2718.

It should be understood the overall shape of the course self-correcting mechanism 2727 is not determinative, and that various shapes may be used, i.e., cylindrical, etc. It should also be clear that while an exemplary course self-correcting mechanism 2727 has been described for enablement purposes, other suitable self-correcting mechanisms may alternatively be employed.

Figure 32:
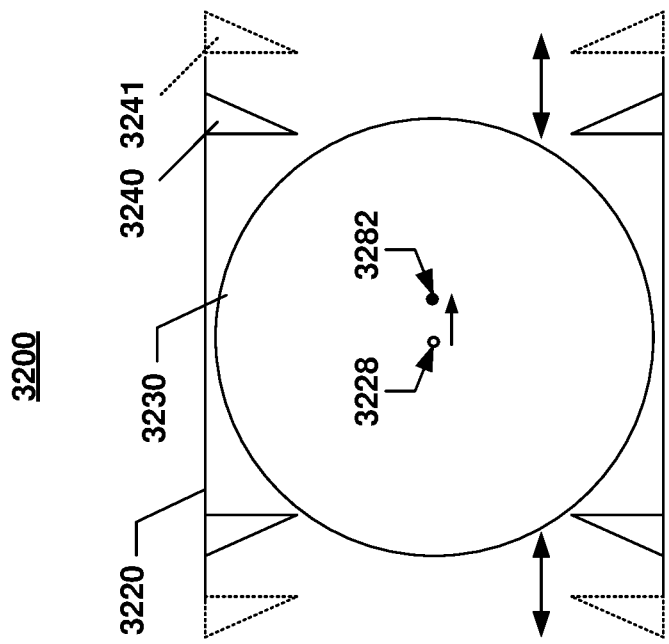
FIGS. 31 and 32 illustrate two alternative course self-correcting mechanisms according to the embodiments of the present invention.
Figure 31:
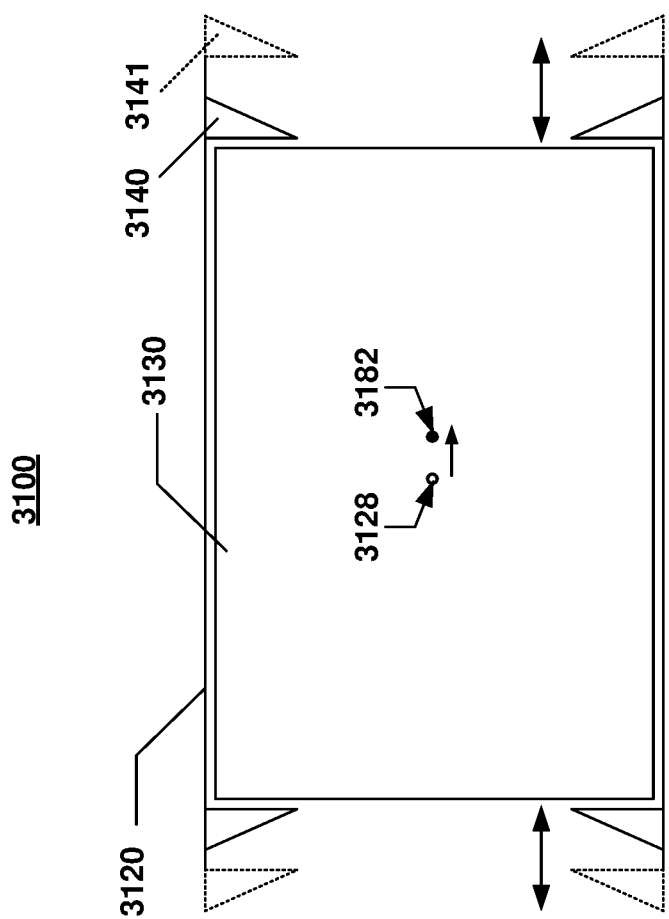

FIGS. 31 and 32 illustrate two alternative course self-correcting mechanisms 3100, 3200, respectively according to the embodiments of the present invention. In these two embodiments, the course self-correcting mechanisms 3100, 3200 employ tracks 3120, 3220 and movable arms 3140, 3240 in place of the telescoping arms 2810, 2820, 2830, 2840, 2840, 2850, 2860 of FIGS. 28, 29, 30. Each of these two alternative embodiments 3100, 3200 may employ a mass 3130, 3230 that may assume different sizes and shapes, each with a center of gravity at a resting position 3128, 3228.

As the movable arm or arms 3140, 3240 moves from the resting position to a different position, it pushes the mass 3130, 3230 to a new position. This repositions the center of gravity of the mass 3130, 3230 by translating it from a resting position 3128, 3228 to another position 3182, 3282, causing a modification of the projectile flight path. FIGS. 31, 32 illustrate the fact that the course self-correcting mechanisms 3100, 3200 may assume different shapes and sizes. As an example only and without limitation, the masses 3130, 3230 may either be cylindrical (FIG. 31) or spherical (FIG. 32).

Considering now FIGS. 33 through 37, they illustrate yet another embodiment, such as a drone system 3300. The drone system 3300 may comprise a drone 3310 and a remote control 3320. The drone 3310 may include a drone body 3330 and one or more blades. Four blades, labeled Blades 1, 2, 3, 4 are illustrated herein to cover a more complex three-dimensional embodiment.

The exemplary drone 3300 embodies a course self-correcting (or self-positioning) interface 3333 according to the present embodiment. The interface 3333 may be placed in part or in whole, within the drone body 3330 and/or the remote control 3320. The interface 3333 includes a processor capable of implementing processes similar (or equivalent) to those explained earlier in connection with the previous embodiments and particularly with the superposition processes 2500 and 2600 of FIGS. 25 and 26, respectively.

Each of the four Blades 1 through 4 may be capable of rotating and flexing (or moving) in a three-dimensional space. More specifically, and as an example only, Blade 1 is rotatably attached to the drone body 3330 by means of an arm 3340 and a hub 3350. The arm 3340 may be telescoping so that it may have a variable length on demand, as necessitated (or determined) by the interface 3333. The hub 3350 may allow Blade 1 to rotate in a two-dimensional space, or, alternatively, in a three-dimensional space. To this end, the hub 3350 may be rotatable around the arm 3340 under the control of the interface 3333.

The drone body 3330 (or alternatively the drone 3310) has a center of gravity, C, while Blade 1 has two oppositely placed terminals or ends B1 and B1–. FIG. 37 connotes the projected coordinates of the positions of the two ends B1 and B1– along the X axis as B1X and B1-X, around the center M1 of the hub 3350. Similarly, the two ends B1 and B1– may have projected coordinates B1Y, B1-Y along the Y-axis and B1Z and B1-Z along the Z-axis.

The positions of each of the two ends (e.g., B1, B1–) of each of Blades 1 through 4 are measured with respect to the center of gravity C of the drone body 3330. For example, distance D is the instantaneous or real-time distance between end (or tip) B1 relative to the center of gravity C. L1 is the distance between the end B1 or B1- and the center of the hub M1. a represents the angle between the X-axis and blade B1.

Figure 33:
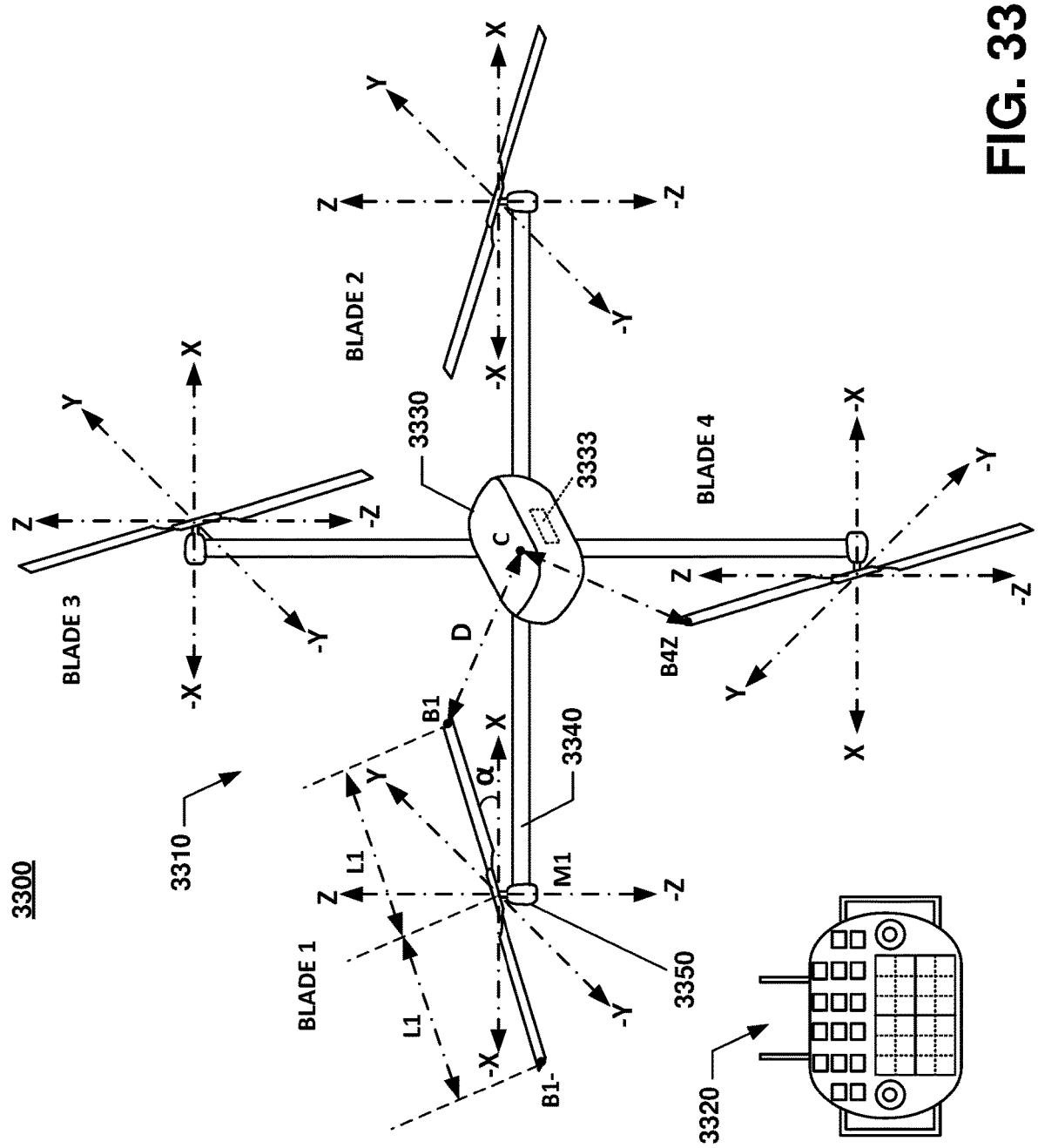
FIG. 33 illustrates an exemplary drone with four blades, which incorporates a course self-correcting interface according to yet another exemplary embodiment of the present invention.
Figure 34:
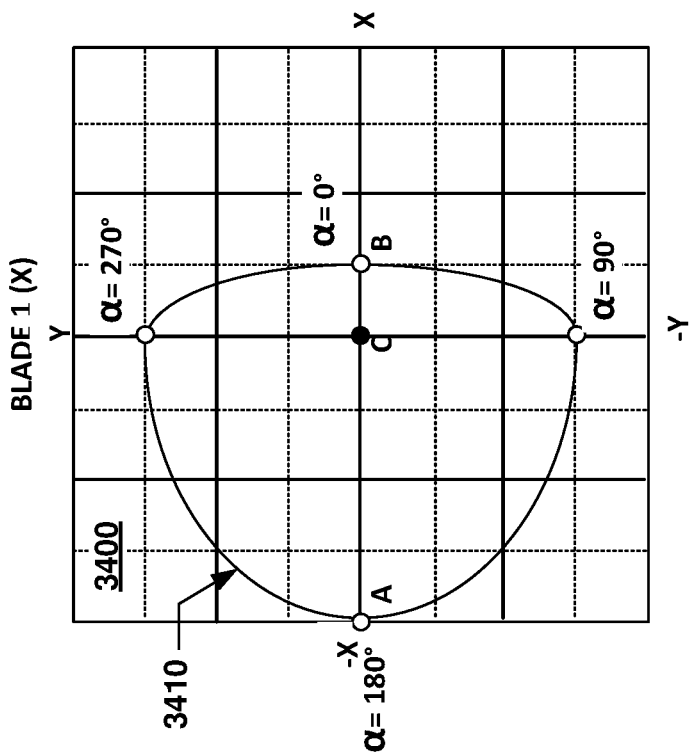
FIG. 34 illustrates an exemplary travel path of one of the four blades of FIG. 33 as projected onto an executable grid of the course self-correcting interface of FIG. 33, to effect self-correction according to one embodiment of the present invention.

FIG. 34 illustrates an exemplary travel path 3410 of one of the four blades of FIG. 33 as projected onto an executable grid 3400 of the course self-correcting interface 3333 to effect self-correction. The travel path 3410 reflects the distance D defined earlier.

Figure 35:
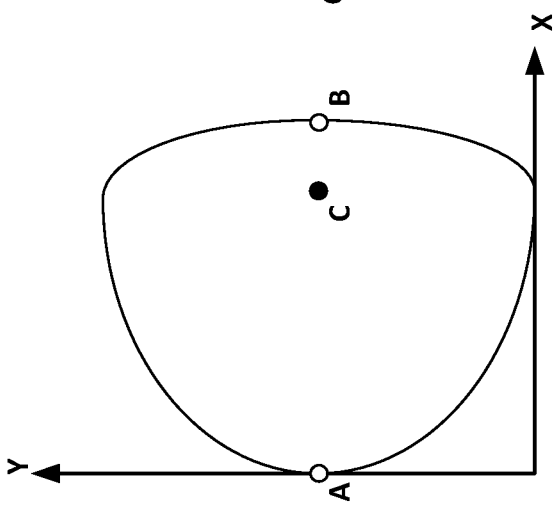
FIG. 35 illustrates three projections of the exemplary travel path of FIG. 34 in a three-dimensional space.
Figure 35:
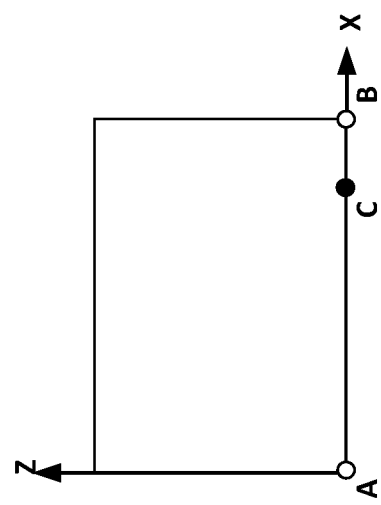
Figure 35:
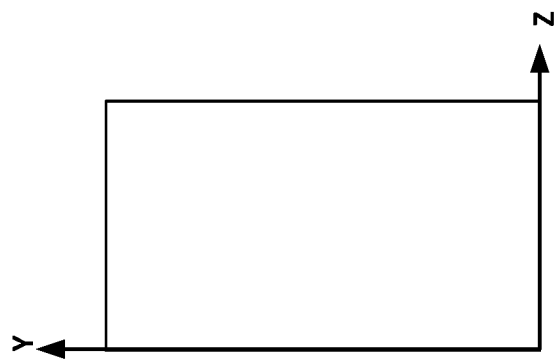
Figure 36:
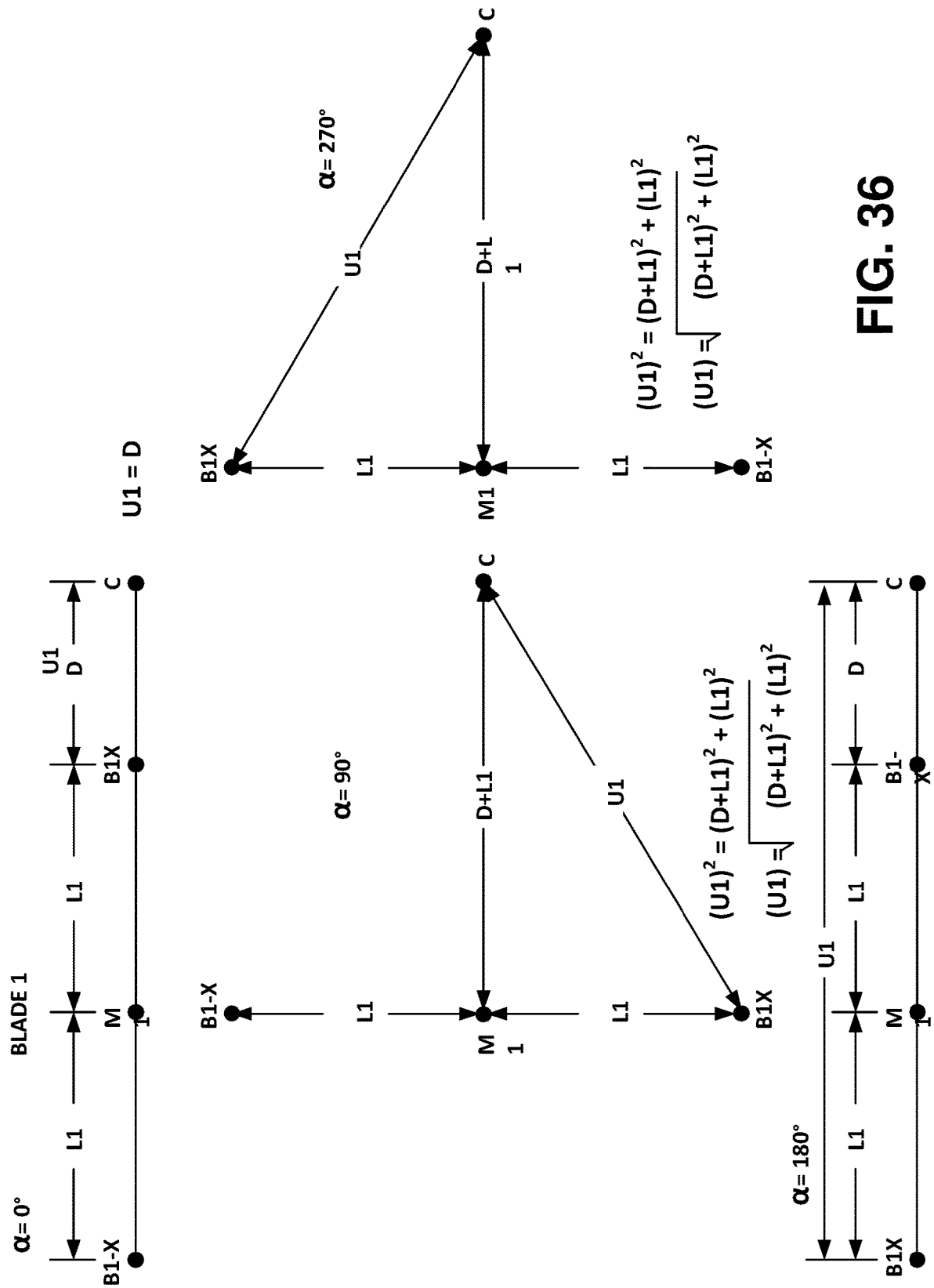
FIG. 36 provides additional positional illustrations of the blade of FIG. 34.

FIG. 35 illustrates three projections of the exemplary travel path 3410 of FIG. 34 in a three-dimensional space, along the X, Y, and Z axes;

FIG. 36 provides additional positional illustrations of Blade 1 of FIG. 34.

FIG. 37 provides real-time positional values of the four blades of FIG. 33 in three-dimensional space in a tabular format.

FIGS. 33, 34, 35, 36, 36, and 37 enable the positions of Blades 1 through 4 to be compared, not simple point by point but also graphically through a virtual path as it crosses the executable grid 3400. Using the teaching herein, it is possible to predict deviations, and to make travel path pre-adjustments in advance of the occurrence of deviations from the optimal travel path, so as to minimize or avoid the occurrence of path deviations.

Figure 38:
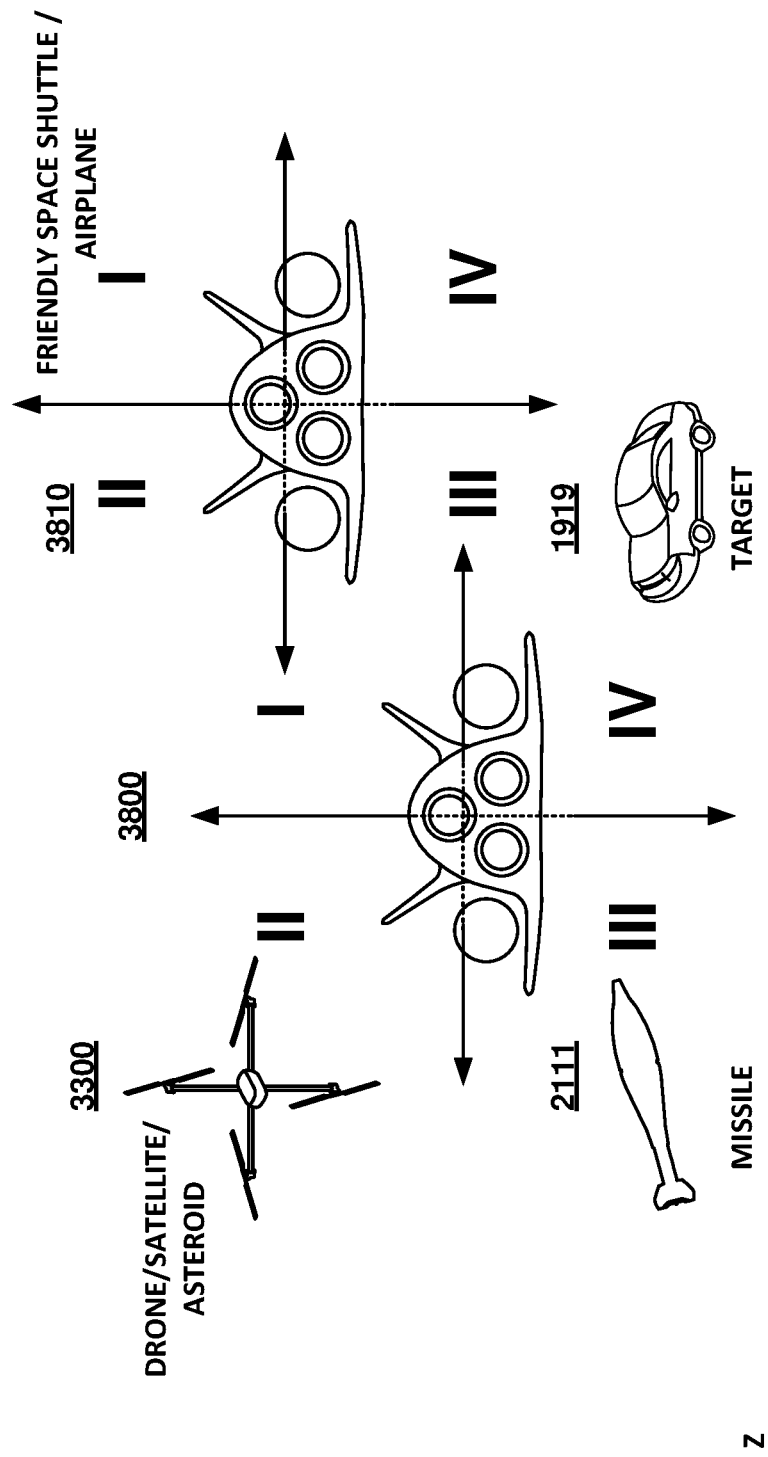
FIG. 38 represents an exemplary two-dimensional illustration, along the Y-Z coordinates, of numerous travelling objects that, individually or collectively could incorporate an interface that controls the objects' operation, according to the present invention.

FIGS. 38 through 50 illustrate yet another embodiment of the present invention, as implemented by the interface 2650 of FIG. 26A. With reference to FIG. 38, it represents an exemplary two-dimensional illustration, along the Y-Z coordinates, of numerous exemplary travelling objects which individually or collectively could incorporate interfaces 2650 that control these travelling objects operation, according to the present invention. The travelling objects could for example be a space shuttle, jet fighter, or airplane 3800, 3810; a vehicle, such as a car, a truck, a boat, etc. 1919; a drone, satellite, or asteroid 3300; or any other travelling object that could be retrofitted with the interface 2650. In the description that follows, these travelling objects will collectively or individually be referred to by the numeral reference 3800.

Figure 39:
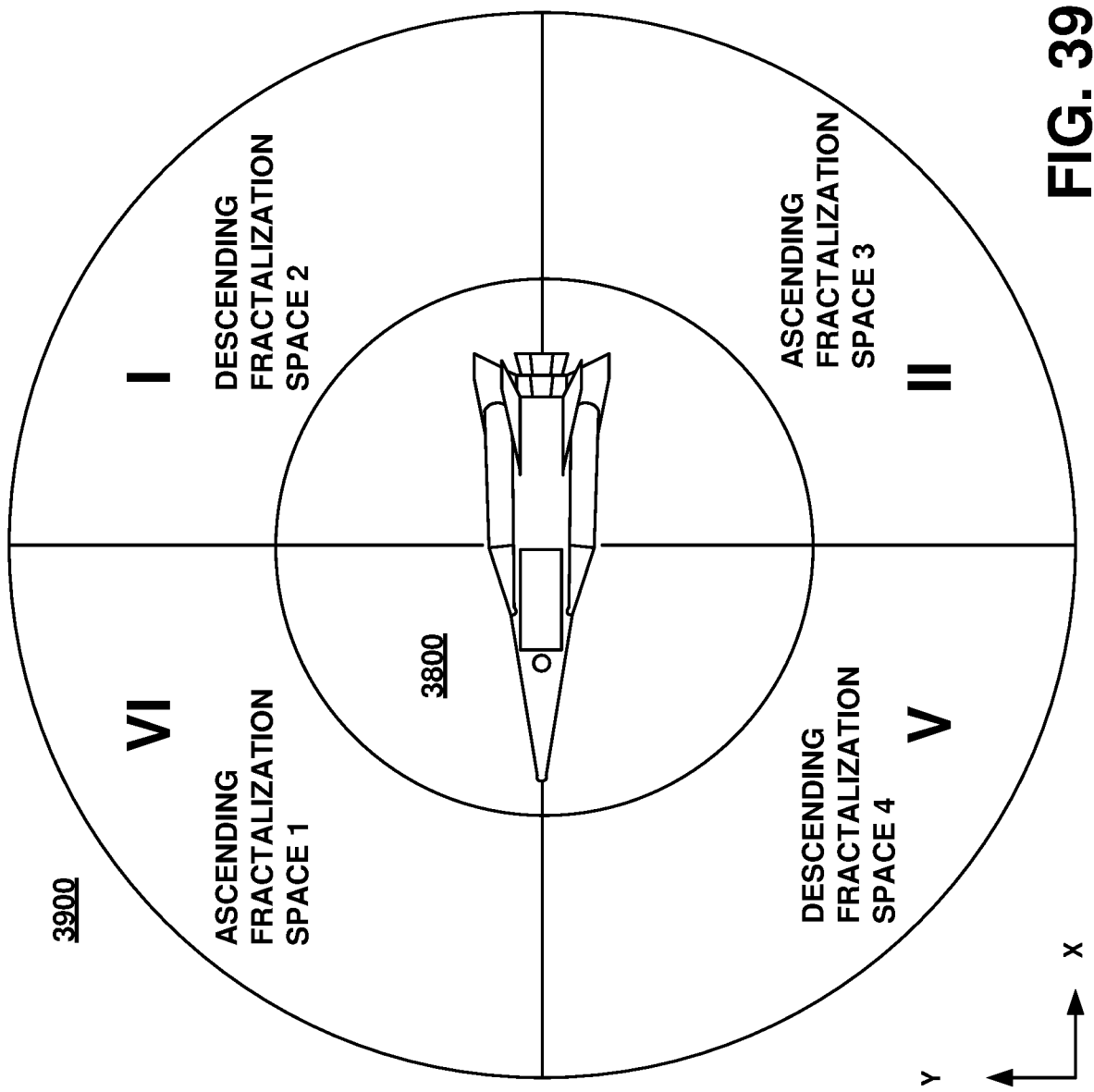
FIG. 39 illustrates an exemplary two-dimensional illustration, along the X-Y coordinates, of one of the objects shown in FIG. 38, i.e., a space shuttle, wherein the interface utilizes a space-variant fractalization scheme according to the present invention, to autonomously control the operation of the space shuttle during its flight.

With further reference to FIG. 39, it illustrates an exemplary two-dimensional illustration, along the X-Y coordinates, of one of the travelling objects shown in FIG. 38, i.e., a space shuttle 3800, wherein the interface 2650 utilizes a space-variant fractalization scheme according to the present invention, in order to autonomously and selectively collect input data and control the operation or flight path of the space shuttle 3800 during its flight.

According to this embodiment, the interface 2650 may be located as part of the onboard instruments of a travelling object (e.g., a space shuttle) 3800 in order to:

(1) Detect and precisely locate a target, such as a vehicle 1919, a missile 2111, a drone, satellite, or asteroid 3300, or another friendly space shuttle or airplane 3810, and to determine, to estimate, or to predict the flight path of the target.

(2) In response to the event detection described above or in response to a detected deviation from the intended or optimal travelling path, the interface 2650 controls the navigation of the travelling object 3800.

An exemplary space-variant fractalization scheme 4100, protocol, or architecture 4100 of the interface 2650 will now be described in connection with FIGS. 38, 39, 41, 49, 50. The interface 2650 guides the travelling object 3800 along an optimal flight path as described earlier in connection with the previous embodiments. It should be understood that while the present embodiment is described in connection with a physical flying object 3800, the same or similar embodiment of the interface 2650 could be incorporated as part of a gaming or other virtual systems such as virtual training or other applications. In addition, while the present invention is described in connection with a graphical executable grid that defines a plurality of executable outlines or cells, and a graphical data representation, the graphical executable grid, along with its executable outlines or cells, and/or the graphical data representation might not be physical graphs or representations, but rather virtual graphs or representations.

With reference to the fractalization process 5000 of FIG. 50, as soon as another object or an (anomalous) event is detected (e.g., a flight/travel path deviation is detected), the processor 2665 of the interface 2650 initiates the fractalization protocol 4100 of FIG. 41, and defines or determines its master fractal, M, as it will be described in more detail, in connection with FIG. 49.

In general, "fractalization" includes the process of using a "recursive" process. As used herein, "recursive" refers to a procedure that goes through "recursion." Recursion occurs when a thing is defined in terms of itself or of its type. Recursion occurs for example, where a function is applied within its own definition. In mathematics, a "fractal" is a subset of Euclidean space with a fractal dimension that strictly exceeds its topological dimension. A noticeable feature of fractalization is that fractals appear the same at different scales and exhibit similar patterns at increasingly smaller scales, a property called self-similarity, also known as expanding symmetry or unfolding symmetry; if this replication is exactly the same at every scale, it is called affine self-similar.

One way that fractals are different from finite geometric figures is how they scale. As an example, fractalizing by doubling the edge lengths of a polygon multiplies its area by four, which is two (the ratio of the new to the old side length) raised to the power of two (the dimension of the space the polygon resides in). Likewise, if the radius of a sphere is doubled, its volume scales by eight, which is two (the ratio of the new to the old radius) to the power of three (the dimension that the sphere resides in). However, if a fractal's one-dimensional lengths are all doubled, the spatial content of the fractal scales by a power that is not necessarily an integer. This power is called the fractal dimension of the fractal, and it usually exceeds the fractal's topological dimension.

Analytically, most fractals are nowhere differentiable. An infinite fractal curve can be conceived of as winding through space differently from an ordinary line—although it is still topologically one-dimensional, its fractal dimension indicates that it also resembles a surface.

This embodiment of the present invention introduces the concept of selective space fractalization for accurately analyzing the space surrounding a travelling vehicle or object 3800 in a two-dimensional or a multi-dimensional space. With reference to FIG. 49, it illustrates a representative architecture in block diagram form of an exemplary selective space fractalization interface 4900 for use in an autonomously traveling vehicle or shuttle 3800, according to an embodiment of the present invention.

As used herein, a "fractal space" includes (or refers to) an executable cell similar to the master fractal space (or cell) 4300 shown in FIG. 23, and described earlier in connection with FIG. 23. A "sub-fractal space" includes a sub-set of the fractal space in which a slave (or sub-servient) fractal is defined (or with which the slave ("servient" or "sub-servient") fractal is associated).

An important aspect of the present invention is that when fractalization is effected by the selective space fractalization interface 4900, the graphical executable grid, along with its executable outlines or cells, and/or the graphical data representation described earlier, are also replicated to implement the same functions embedded therewithin, as described herein.

In other terms, as the fractalization scheme descends from a lower fractal level (2) to a higher fractal level (1), or alternatively ascends from a higher fractal level (1) to a lower fractal level (2), the function(s) of the master cell or outline 4300 (FIG. 43) can either be replicated for the slave cells or outlines, or the slave fractalization functions could be derived from, or associated with the corresponding master functions. As the travel traverses or intersects with master and slave cells, then the master and the slave fractalization functions are executed automatically.

As stated earlier, in the present embodiment, there might not be a need to superpose the physical graphical data representations and the function fractalization layers to execute the fractalization functions. Although a physical superposition could be used in an alternative embodiment of the present invention.

The selective space fractalization interface 4900 can be used, for example, in a master control device that regulates multiple slave control devices or controllers in order to assist the travelling object 3800 in taking appropriate and accurate responses or inherently and automatically adjusting (or correcting) its travel route for offensive or defenses stances. It should be understood that should the terms "master" or "slave" are or become considered to insinuate or suggest improper terminology or meaning, or even if the use of these terms becomes politically incorrect, then these terms, though used in present day technology, could be substituted with other similar or equivalent terms such as: "dominant," "non-dominant," "servient," "sub-servient" or "servant."

In this particular illustration, a master fractal M controller 4910 of the selective space fractalization interface 4900 monitors the operation of a plurality of slave fractals or controllers M1, M2, M3, M4, M5, M6, M7, M8. While only 8 slave fractals are shown for illustration purpose only, a different number of slave fractals may be used in other applications. The exemplary slave fractals M1, M2, M3, M4, M5, M6, M7, M8 are as follows:

Slave fractal M1 controls or regulates an engine controller, which is provided with a sensor SM1 that monitors the operation of the engine controller and that reports the sensor data to the master fractal M.

Slave fractal M2 controls or regulates a steering controller, which is provided with a sensor SM2 that monitors the operation of the steering controller and that reports the sensor data to the master fractal M.

Slave fractal M3 controls or regulates a braking controller, which is provided with a sensor SM3 that monitors the operation of the braking controller and that reports the sensor data to the master fractal M.

Slave fractal M4 controls or regulates an alert controller, which is provided with a sensor SM4 that monitors the operation of the alert controller and that reports the sensor data to the master fractal M.

Slave fractal M5 controls or regulates a power/engine controller, which is provided with a sensor SM5 that monitors the operation of the power/engine controller and that reports the sensor data to the master fractal M.

Slave fractal M6 controls or regulates a communications controller, which is provided with a sensor SM6 that monitors the operation of the communications controller and that reports the sensor data to the master fractal M.

Slave fractal M7 controls or regulates a life support/climate controller, which is provided with a sensor SM7 that monitors the operation of the life support/climate controller and that reports the sensor data to the master fractal M.

Slave fractal M8 controls or regulates a fractal compression/expansion controller, which is provided with a sensor SM8 that monitors the operation of the fractal compression/expansion controller and that reports the sensor data to the master fractal M.

Figure 50:
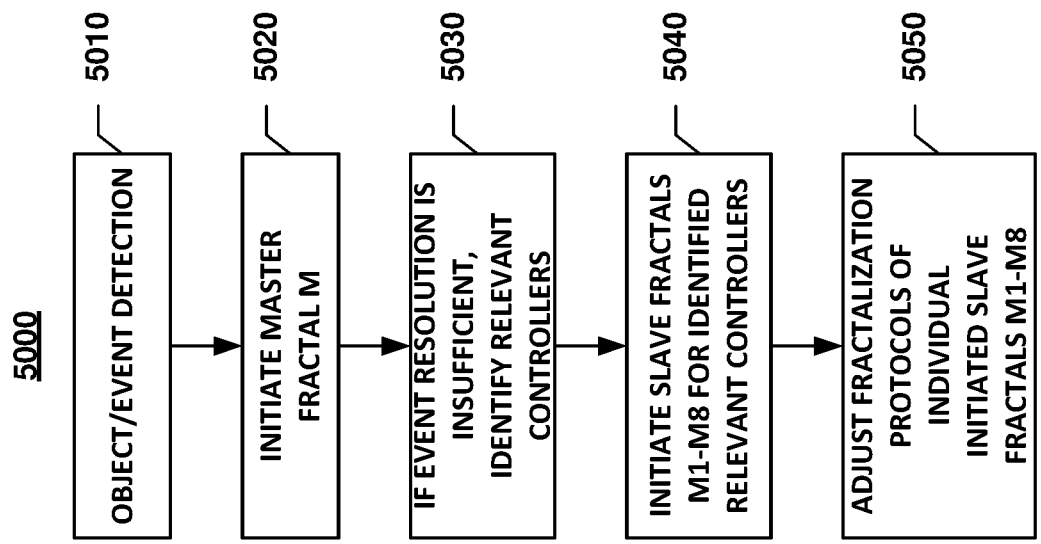
FIG. 50 is a flow chart illustrating a high-level process for using the fractalization protocol of FIGS. 48A, 48B, 49, according to one embodiment of the present invention.

Referring now to FIG. 50, in this specific exemplary embodiment, process 5000 initiates the Master Fractal, M, at step S020 upon detecting another object or an event in a surrounding space of interest at step S010. Whereupon, at step S020, process 5000 divides or segments the three-dimensional space surrounding the travelling object 3800 into 8 quadrants, only six of which (I. II, III, IV, V, VI) are illustrated in FIGS. 38, 39. This spatial segmentation is an optional step which could be either omitted or implemented at some other time during flight.

Figure 49:
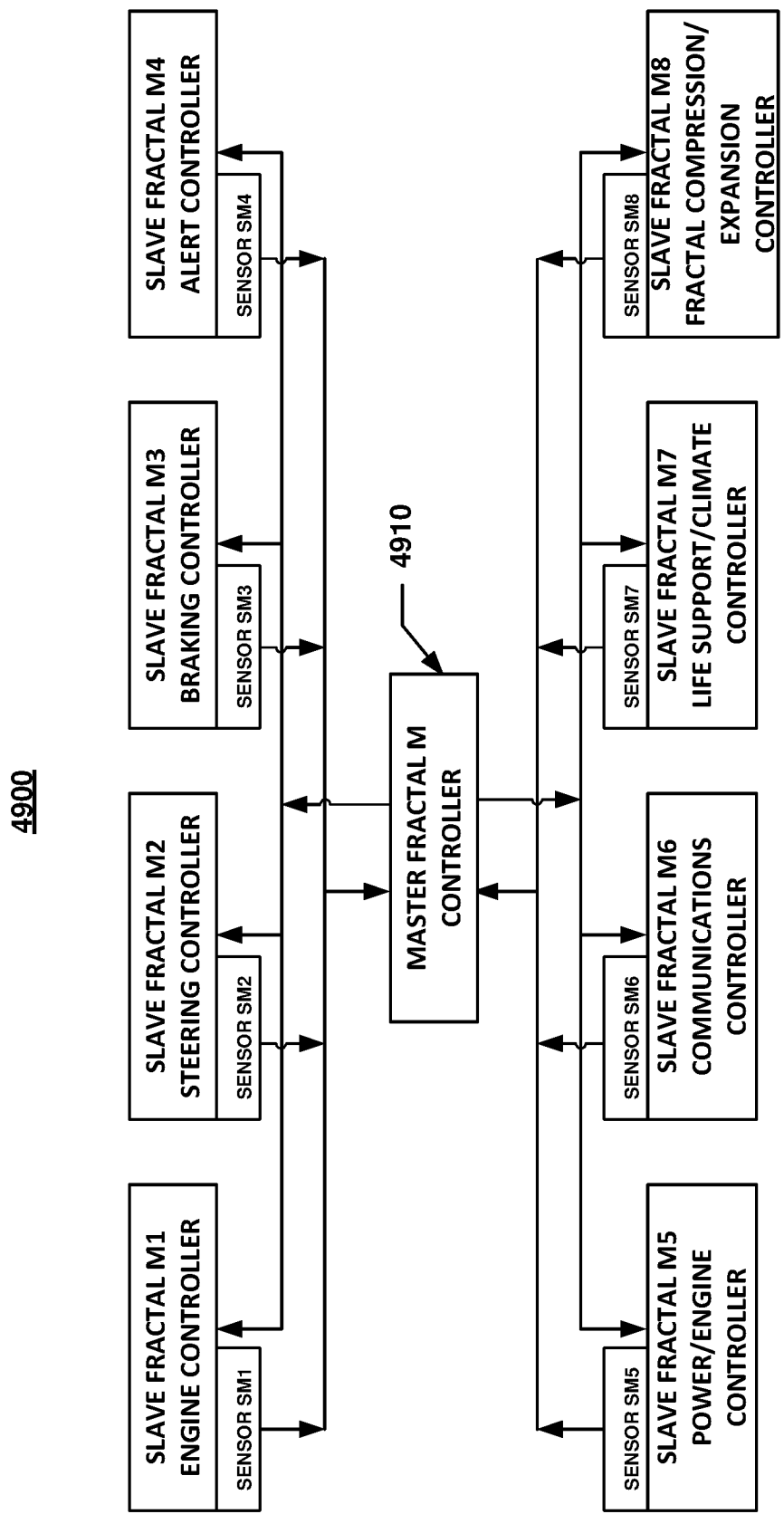
FIG. 49 illustrates a representative architecture in block diagram form of an exemplary interface for use in an autonomously traveling vehicle or shuttle, according to an embodiment of the present invention.

If at step S030 process 5000 determines that the data resolution sensed by any one or more of the sensors SM1, SM2, SM3, SM4, SM5, SM6, SM7, SM8 of FIG. 49 does not provide sufficient resolution for addressing the encountered event or object, then the master fractal M identifies the specific controller(s) that does not render sufficient data resolution. Thereafter, at step 40, the master fractal M initiates some or all of the slave fractals M1, M2, M3, M4, M5, M6, M7, M8 whose corresponding controllers have been identified at step S030.

As an illustrative example, should the space shuttle 3800 sense that its trajectory is about to be intercepted by an asteroid 3300, then the master fractal M initiates slave fractal M5 to determine the sufficiency of the engine power in taking evasive maneuvers. The master fractal M also initiates the life support/climate slave fractal M7 to determine if such evasive maneuvers will adversely affect the life support system onboard the space shuttle. The initiation of a slave fractal M1-M8 involves propagating one or more types of the following exemplary fractalizations, with the understanding the other types of fractalizations may alternatively be used:

Dynamic fractalization
Increasing or ascending fractalization
Decreasing or descending fractalization
Selective fractalization
Projected fractalization
Rotating fractalization As used herein, "dynamic fractalization" refers to a fractalization scheme that varies between different types of fractalizations, including ascending fractalization, descending fractalization, selective fractalization, projected fractalization, rotating fractalization, etc.

"Increasing or ascending fractalization" refers to a fractal replication scheme or protocol in which as the fractalization level increases, the slave function level increases. As an example, assuming that in the first slave fractalization level the sides of the designated fractalization space were divided by two, or if the function embedded within the cell or outline is a derivative of the first level, i.e., $\delta X$, the second slave fractalization level will be to divide the fractalization space by four (i.e., 2×2), or to execute a second level derivative, i.e., $\delta^2 X$, etc. Such ascending fractalization may be suitable for use when it is desired to increase the resolution of the detected object or event (step S050 of FIG. 50), so that the master fractal M (FIG. 49) focuses on, or acquires more accurate or refined data about the detected object or event.

Figure 47:
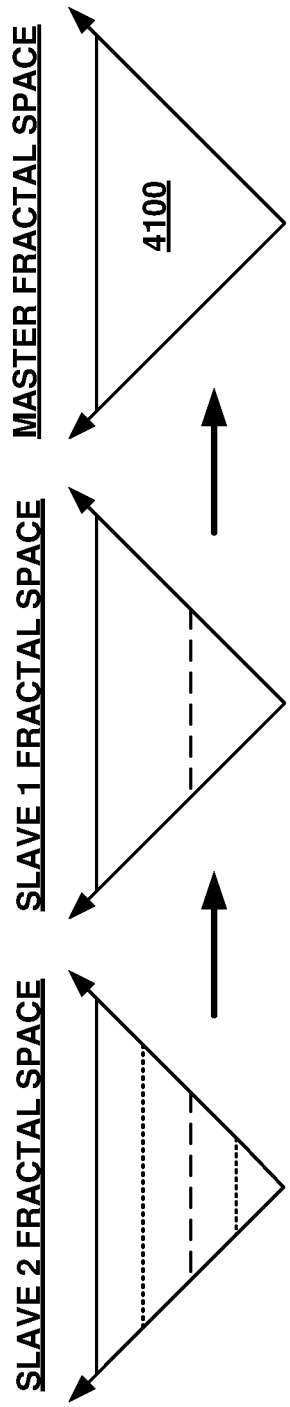
FIG. 47 represents a simplified two-dimensional ascending fractalization scheme according to one embodiment of the present invention.

FIG. 47 represents a simplified two-dimensional ascending fractalization scheme according to one embodiment of the present invention, illustrating a transition from a master fractal space, to a slave level 1 fractal space, to a slave level 2 fractal space, and so on, as needed or required.

Figure 48A:
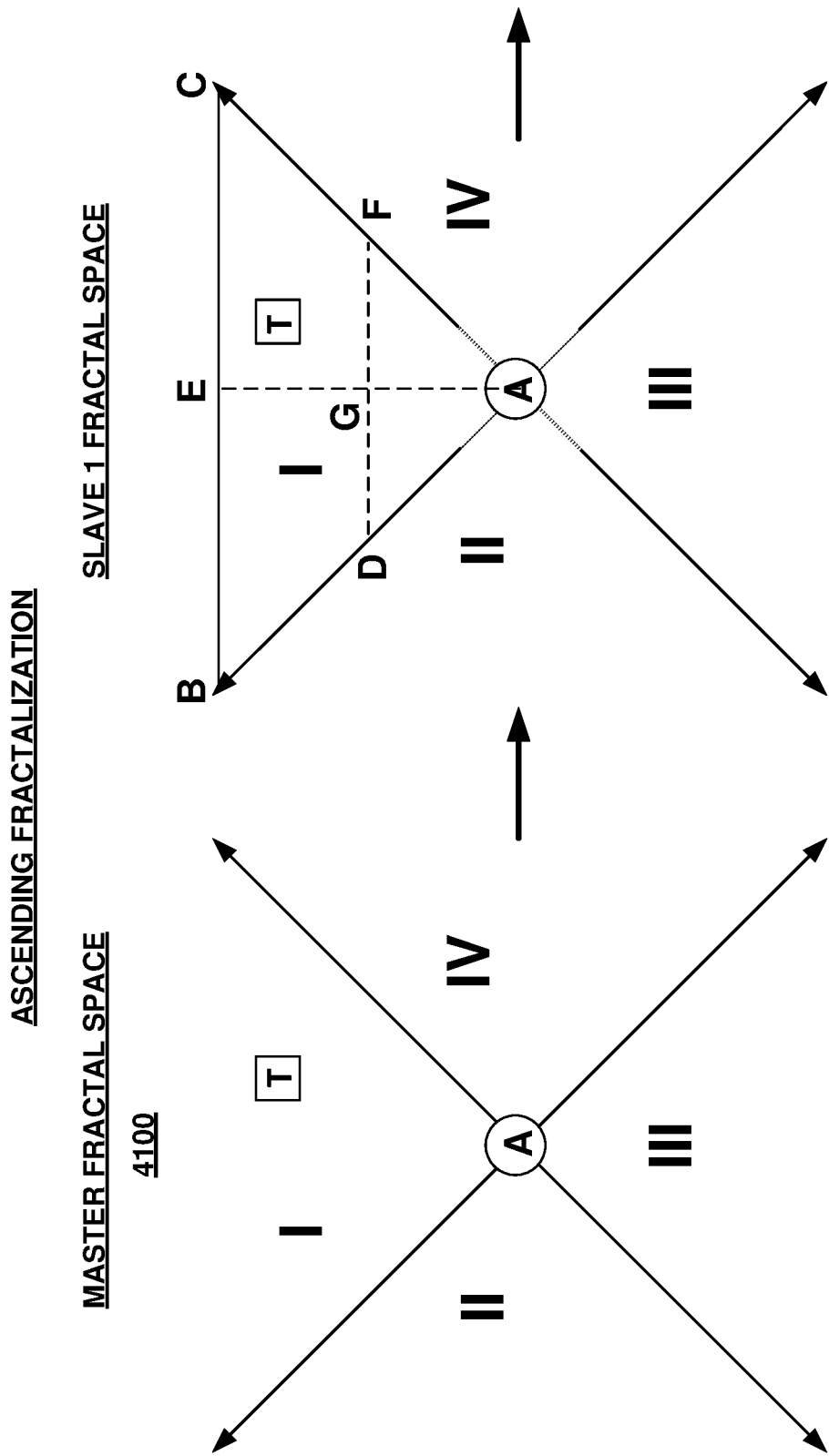
FIGS. 48A and 48B collectively represent an exemplary descending fractalization protocol or scheme, followed by an ascending fractalization scheme, as implemented by the interface of the present invention.
Figure 48B:
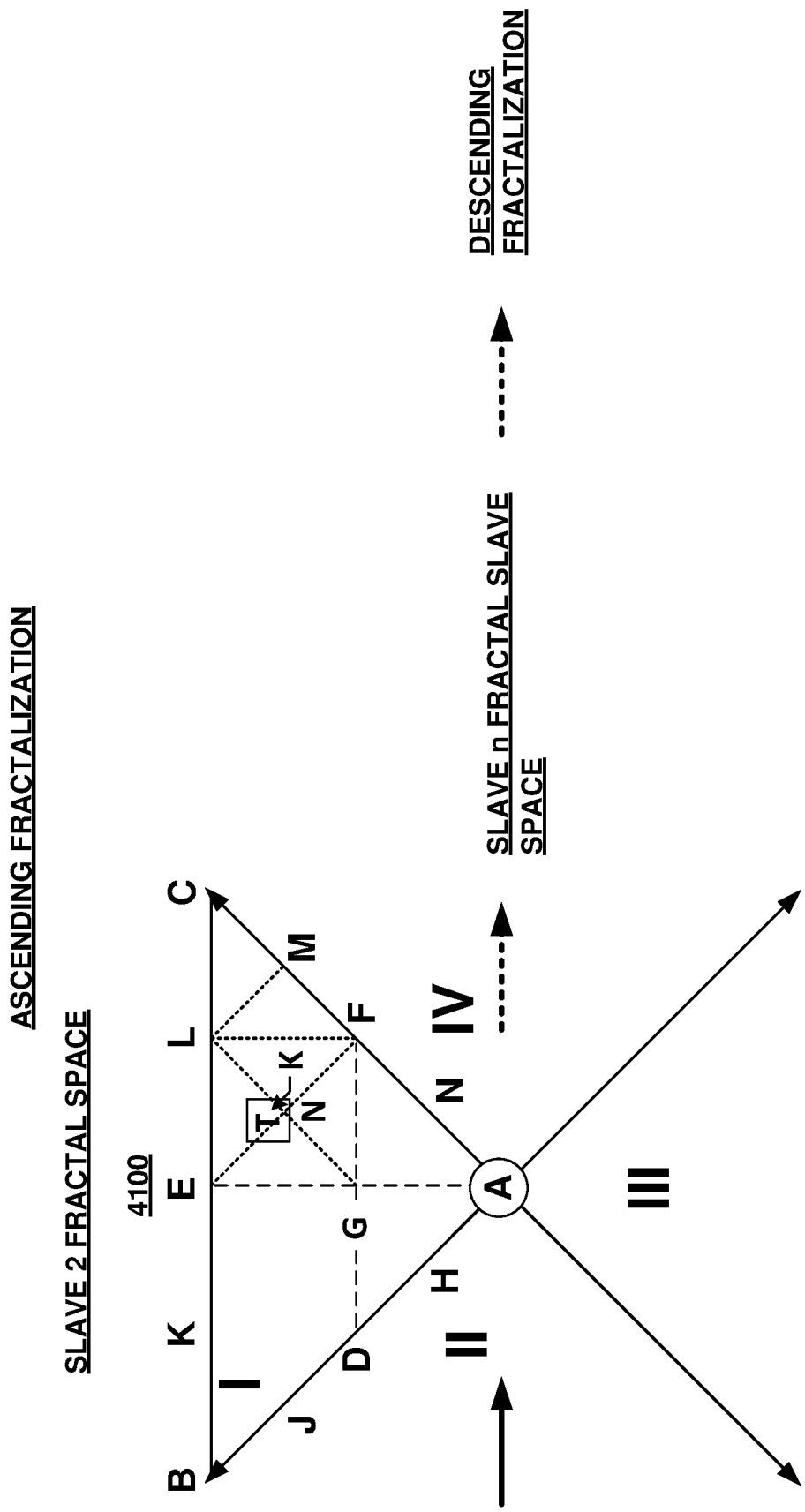

FIGS. 48A and 48B collectively represent another exemplary ascending fractalization protocol or scheme, followed by a descending fractalization scheme, as implemented by the interface 4900 of the present invention onto the object 3800 of FIGS. 38, 39. In this example, the fractalization scheme illustrates a transition from a master fractal space 4100 (with four regions I, II, III, IV). In this illustration, the object 3800 is centrally indicated by the letter "A" within a circle, while the target 1919 is indicated by the letter "T" within a square box.

The master fractal discovers the existence of the target T within the fractal space or fractal zone I. As a result, the fractalization scheme may apply the fractalization scheme only to fractal space I, resulting in a slave level 1 fractal space that divides fractal space I into four sub-slave fractal zones (or sub-spaces) defined as follows: zones ADG, AFG, DGBE, and FGEC.

The master fractal discovers the existence of the target T within the sub-slave fractal space or fractal zone FGEC. Whereupon, the fractalization scheme may apply the fractalization scheme only to sub-slave fractal space or fractal zone FGEC, resulting in a plurality of sub-sub slave fractal spaces that are delineated by the dotted lines.

The master fractal further discovers that the target T is situated in the sub-sub slave fractal triangular space ELN. Whereupon, the fractalization scheme may further apply the fractalization scheme to the desired $n^{th}$ level, as needed, until it acquires the desired resolution level for the target T. Eventually, at some point, the fractalization scheme may retrogress into a reverse descending fractalization scheme as described earlier.

"Decreasing or descending fractalization" refers to a fractal replication scheme or protocol in which as the fractalization level decreases, the slave function level decreases. As an example, assuming that in the second slave fractalization level the sides of the designated fractalization space were multiplied by four, or if the function embedded within the cell or outline is a double derivative of the first level, i.e., $\delta^2 X$, the first slave fractalization level will be to multiply the fractalization space by a factor of 2 (i.e., 4/2), or to execute a first level derivative, i.e., $\delta X$, etc. Such descending fractalization may be suitable for use when it is desired to decrease the resolution of the detected object or event (step S050 of FIG. 50), since the master fractal M (FIG. 49) does not need to focus on, or to acquire accurate or refined data about the detected object or event.

Figure 46:
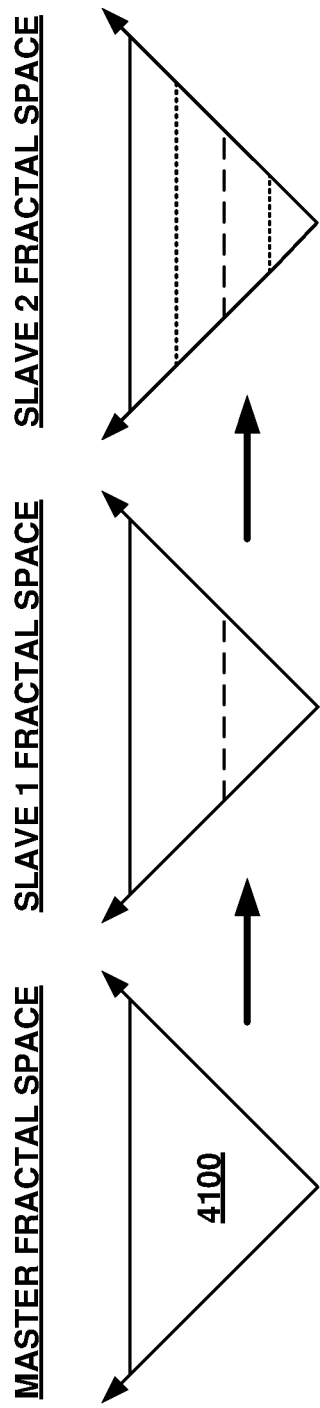
FIG. 46 represents a simplified two-dimensional descending fractalization scheme according to one embodiment of the present invention.

FIG. 46 represents a simplified two-dimensional descending fractalization scheme according to one embodiment of the present invention, illustrating a transition from slave level 2 fractal space, to a slave level 1 fractal space, and then to a master fractal space.

"Selective fractalization" refers to the process of selecting the desired fractalization for use during most of, or the entire trajectory (or travelling path) of the object 3800. Reference is made to FIG. 39.

"Projected fractalization" refers to the process of predicting the next fractalization level for the travel trajectory or action of the travelling object 3800, and programming the predicted fractalization level for execution as the conditions become suitable.

Figure 40:
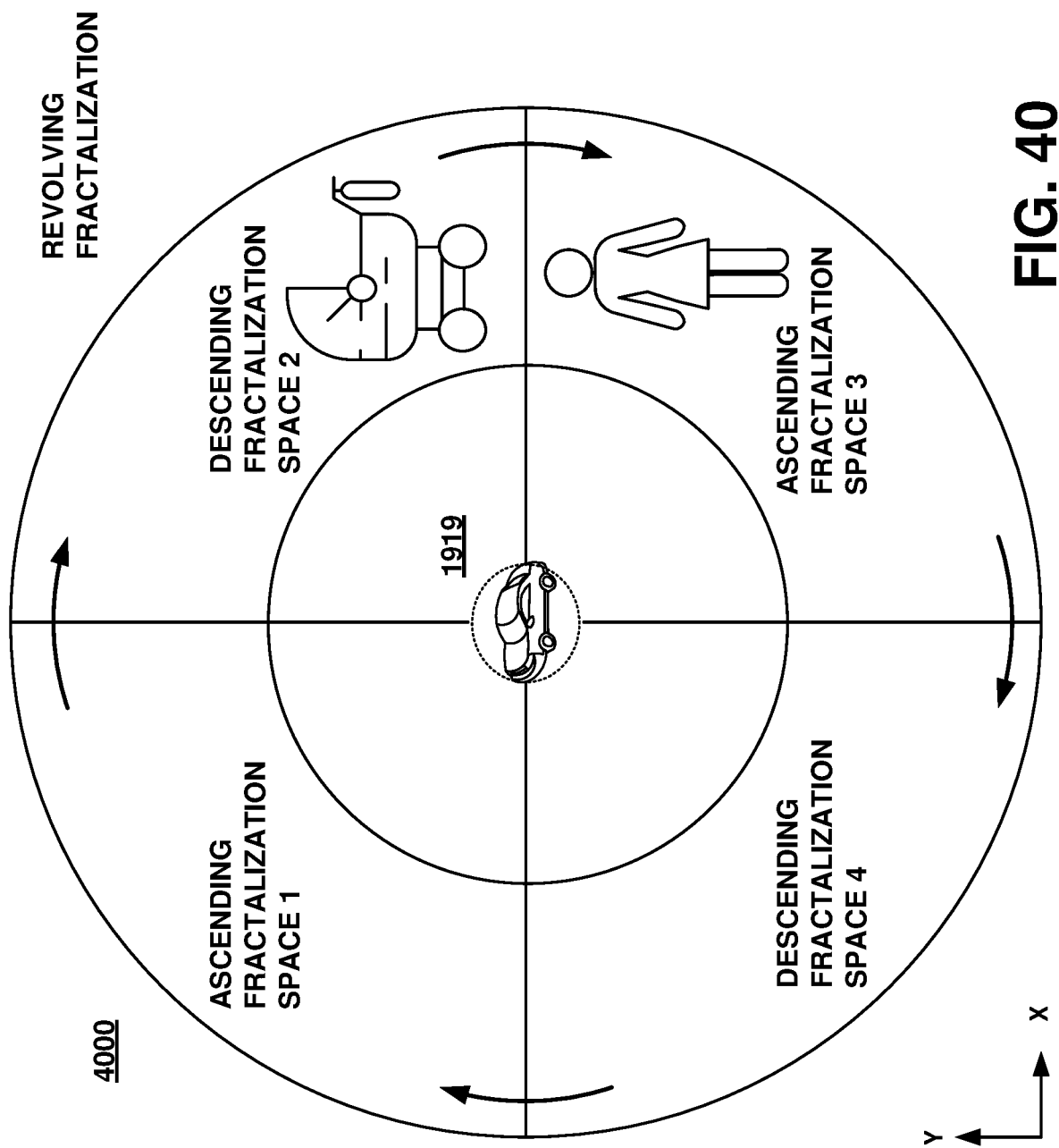
FIG. 40 illustrates an exemplary two-dimensional illustration, along the X-Y coordinates, of one of the objects shown in FIG. 38, i.e., a vehicle, wherein the interface utilizes a revolving space-variant fractalization scheme according to the present invention, to autonomously control the operation of the vehicle during its travel.

"Rotating fractalization" refers to the process of using a revolving fractalization scheme, so as to enable a scanning function (i.e., to be on the lookout) for eventual events. Reference is made to FIG. 40.

In summary, the present embodiment of the invention includes a process and a corresponding interface for deriving fractals and replicating the executable functions so that minimal calculations and more accurate calculations are derived rapidly. Because as the travel path of the physical (or virtual) object 3800 intersects the master fractal M, then all (or selected) slave fractals are executed concurrently (or sequentially in order or in a selected order) so that as soon as the travel path calculations are narrowed down to the "projected" trajectory, then the intersection(s) of the travel path with a slave fractal, derives fractalization slave values which are compared to actual (physical or virtual) values to calculate the deviation(s) from the optimal path (or to calculate the optimal corrective actions by the various controllers M1-M8 by causing the fractalization slave functions of these various controllers M1-M8 to be selectively executed.

Figure 41:
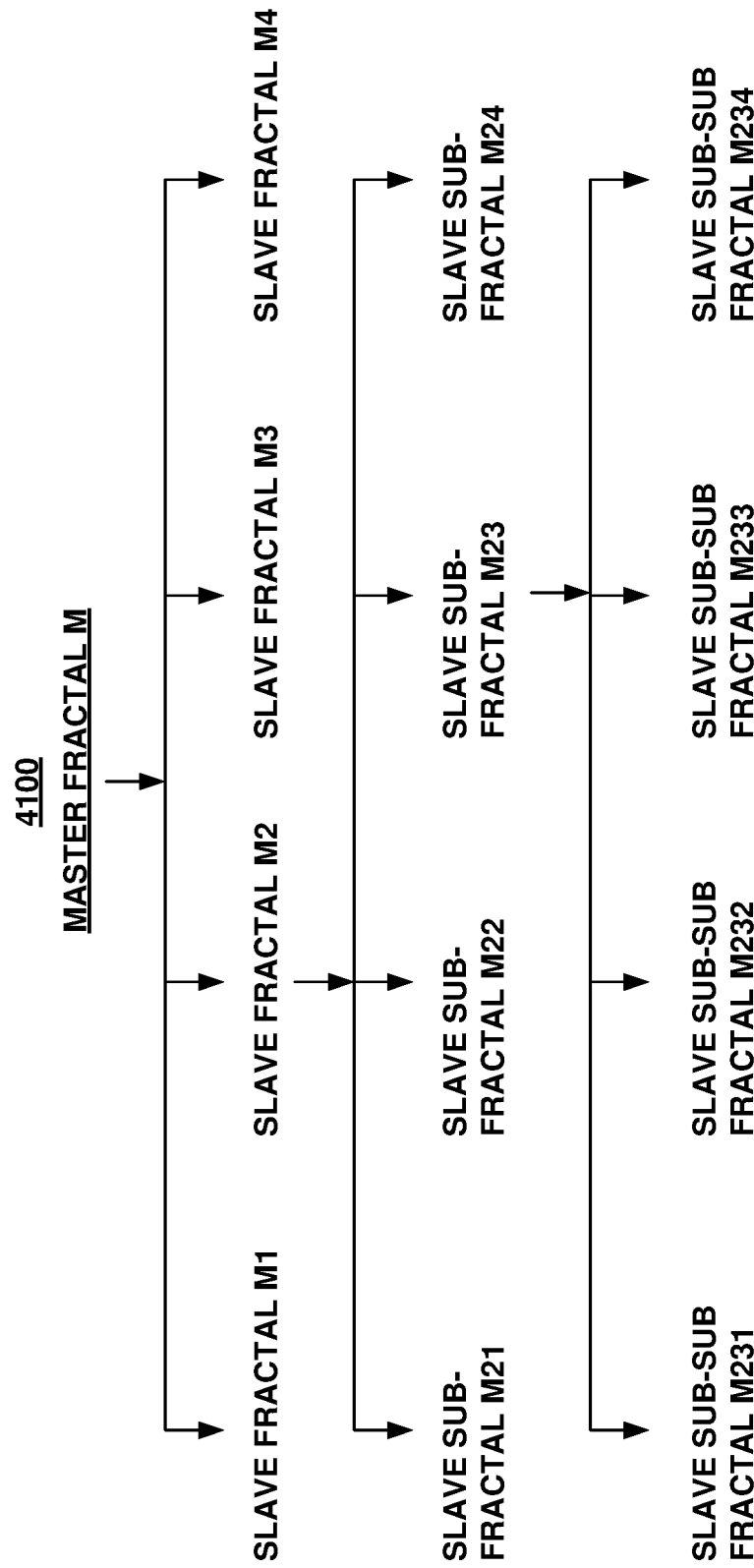
FIG. 41 is a high-level, exemplary representation of the architecture of the interface, according to one embodiment of the present invention.

With reference to FIG. 41, when the fractalization slave fractals (e.g., M2) are executed, then all (or some of) the fractalization sub-slave fractals (e.g., M21, M22, M23, M24)) of the fractalization slave fractal M2 are executed. In this illustration, only the fractalization sub-slave fractal M23 is executed. This process continues as needed (or required) to effect the most accurate calculations and corrections.

For example, when the fractalization sub-slave fractals (e.g., M2) are executed, then all (or some of) the fractalization sub-sub-slave fractals (e.g., M231, M232, M233, M234)) of the fractalization slave fractal M2 are executed. In this illustration, only the fractalization sub-sub-slave fractal M233 is executed. This process may continue iteratively as needed (or required).

Figure 42:
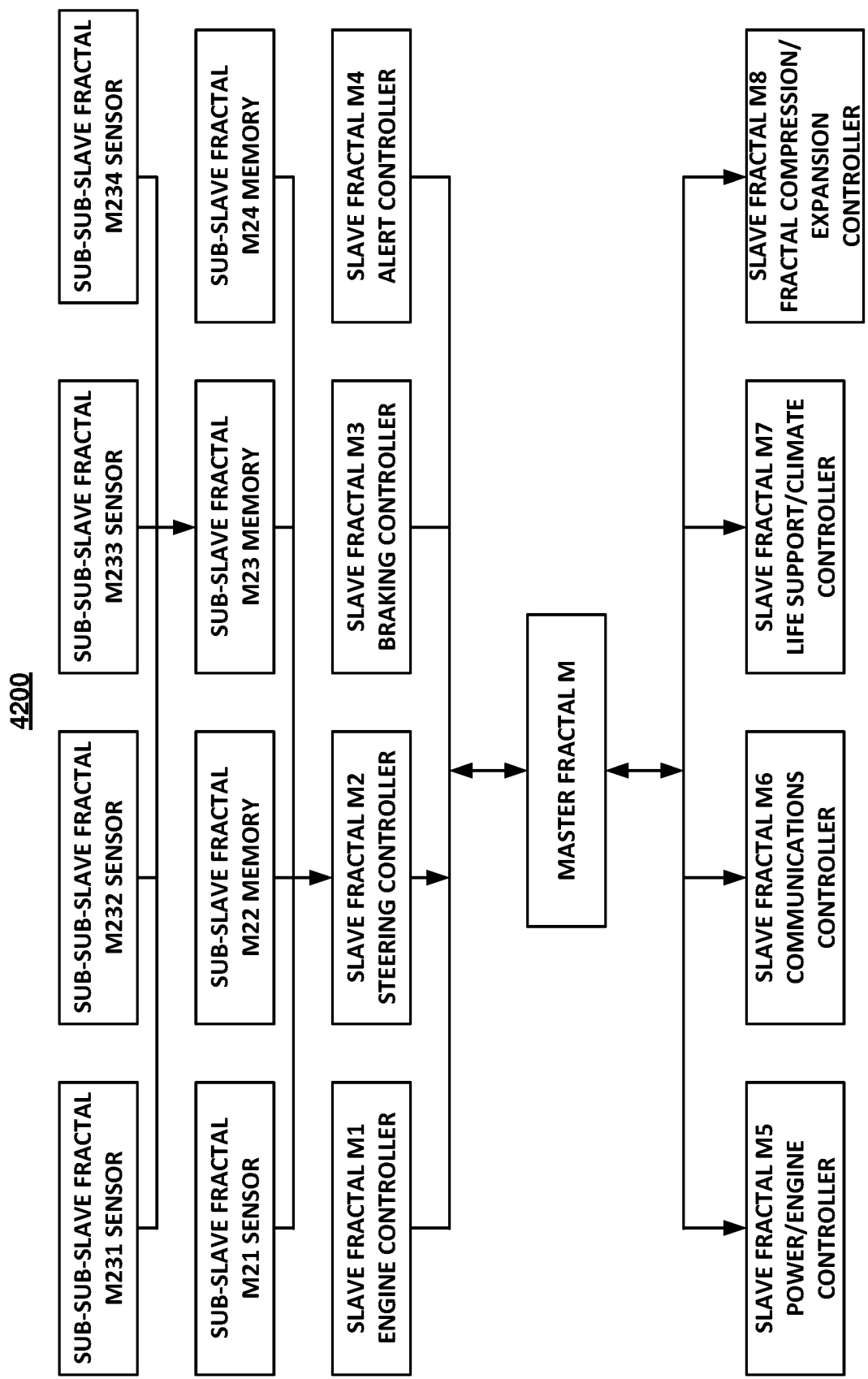
FIG. 42 is a more specific example for the architecture of the interface of FIG. 41, as it relates to the autonomously travelling vehicle of FIG. 40.

With reference to FIG. 42, it illustrates a more specific example for the architecture of interface 4100 of FIG. 41 or interface 4900 of FIG. 49, as it relates to the autonomously travelling vehicle 1919 of FIG. 40. The interface 4200 of FIG. 42 executes an ascending fractalization scheme onto the sub-sub-slave fractal M233 for the steering controller, and the corresponding sub-slave fractal M22 and slave fractal M2 and thereafter renders the results to the master fractal M. In turn, the master fractal M executes a descending fractalization scheme onto the master fractal M, so that it may selectively control or regulate the remaining slave fractals M5, M6, M7, M8 based on the data that are rendered to the master fractal.

Figure 43:
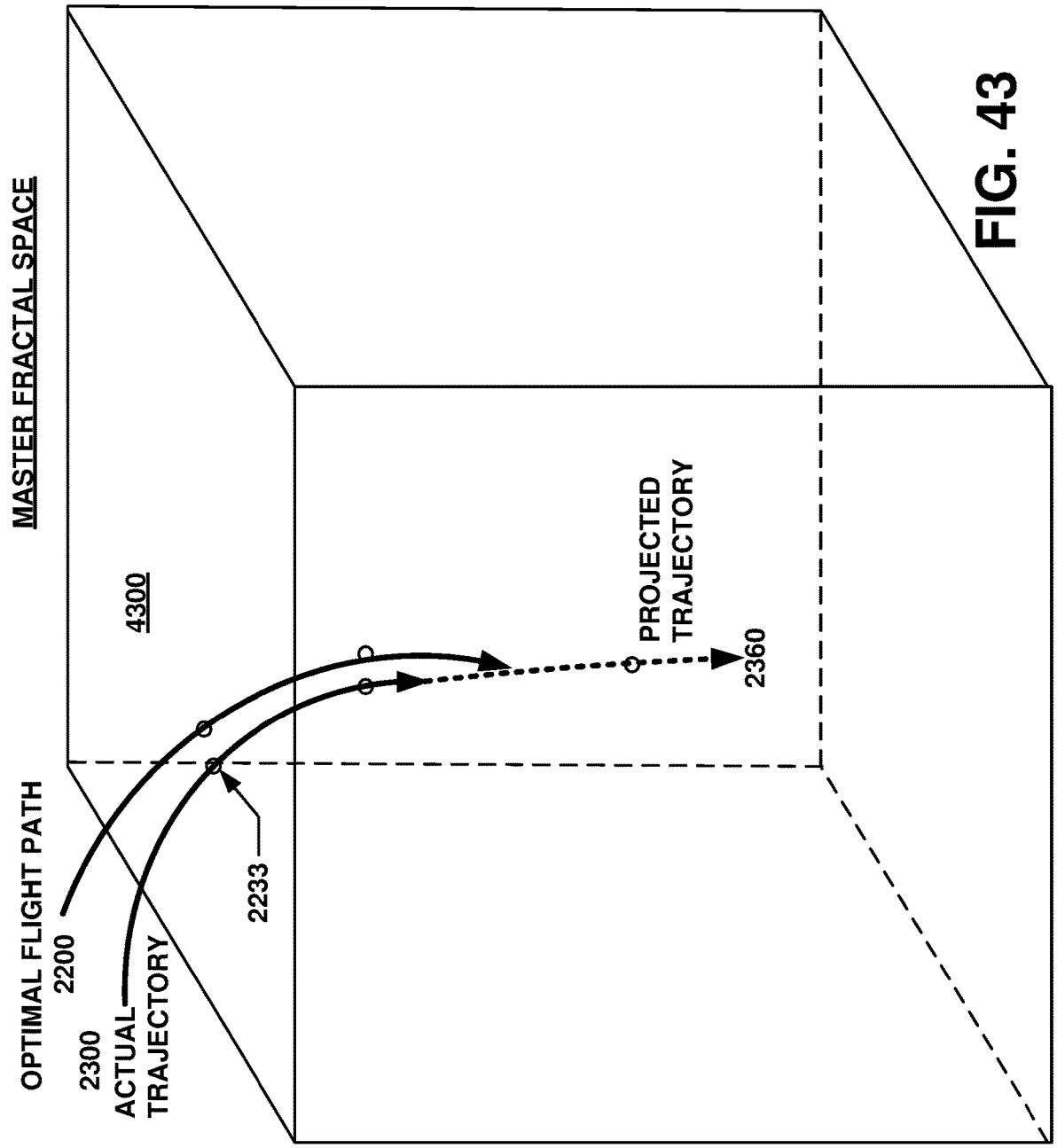
FIG. 43 illustrates a three-dimensional representation of a master fractal space, shown as an executable cell similar to that shown in FIG. 23, according to one embodiment of the present invention.

FIG. 43 illustrates a three-dimensional representation of a master fractal space 4300, shown as an executable cell similar to that shown in FIG. 23, according to one embodiment of the present invention.

Figure 44:
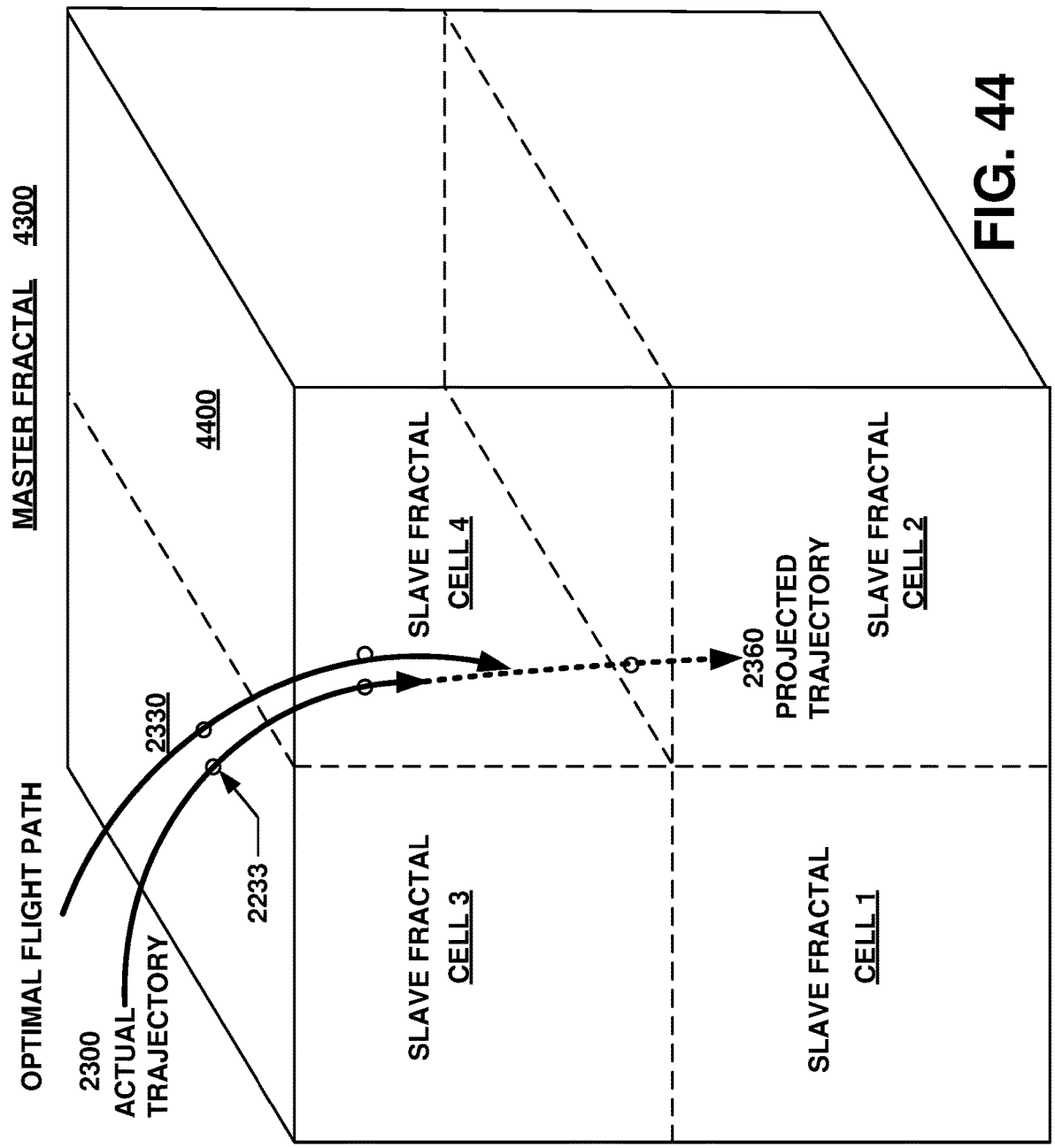
FIG. 44 illustrates an exemplary first-level (or first-tier) fractalization of the master fractal space of FIG. 43 into four three-dimensional cells, according to one embodiment of the present invention.

FIG. 44 illustrates an exemplary first-level (or first-tier) fractalization of the master fractal space of FIG. 43 into four three-dimensional cells also referred to as slave fractal cells 1, 2, 3, 4, according to one embodiment of the present invention. In this illustration, each side of the master fractal 4300 is divided by two, so that the entirety of the master fractal 4300 is divided into four cells or slave fractal cells 1, 2, 3, 4.

Figure 45:
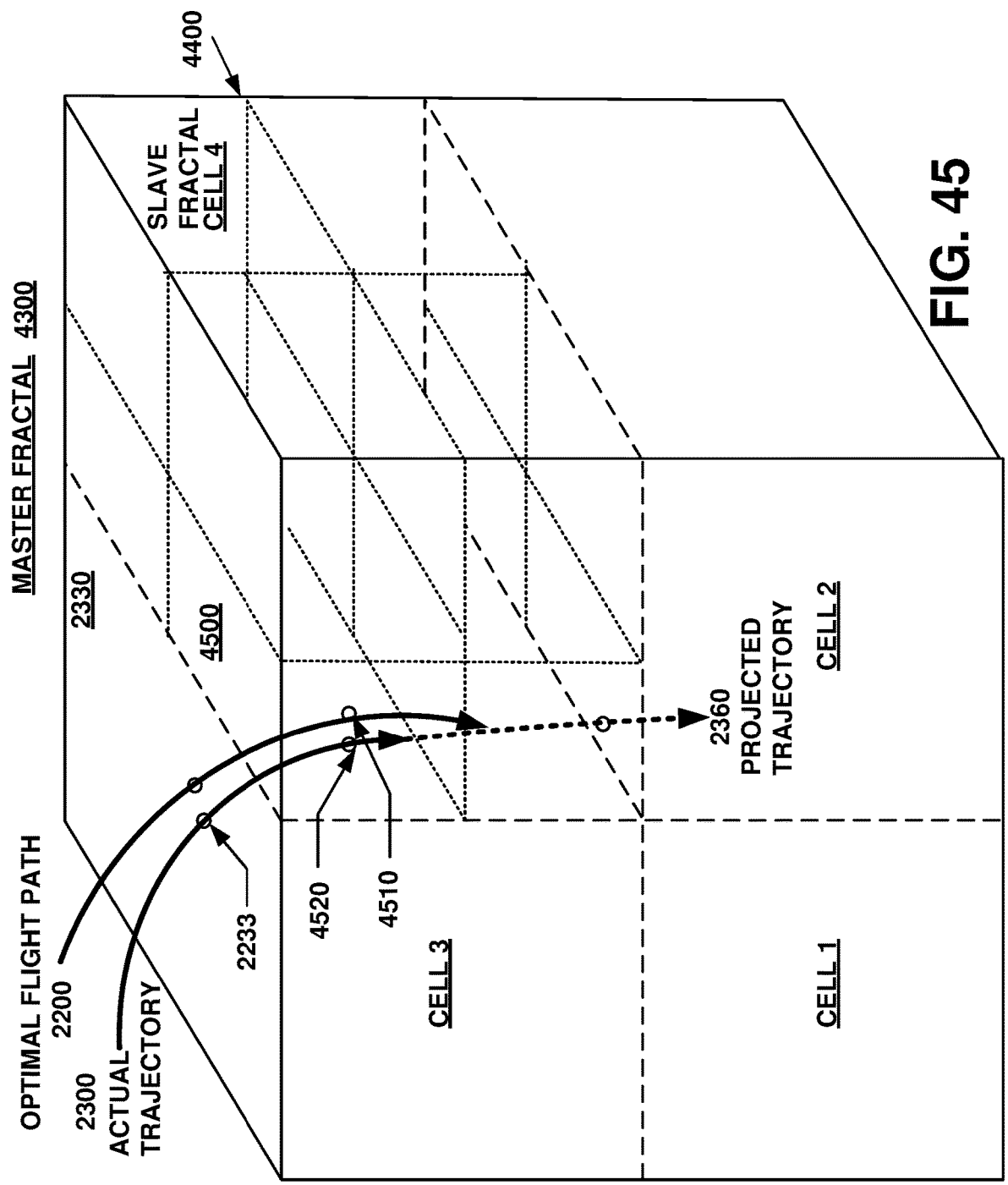
FIG. 45 illustrates an exemplary second-level (or second-tier) fractalization of one of the three-dimensional first-level fractalized cells of FIG. 44, according to one embodiment of the present invention.

FIG. 45 continues the fractalization scheme of FIG. 44 by executing an exemplary second-level (or second-tier) fractalization of one of the three-dimensional first-level fractalized cells 4400 of FIG. 44, according to one embodiment of the present invention. In this illustration, each side of the slave fractal 4400 is divided by two, so that the entirety of the slave fractal 4400 is divided into eight cells or sub-slave fractal cells that are delineated by the dotted lines. The fractalization scheme may continue iteratively, as deemed necessary. In this particular embodiment of selective fractalization, since the optimal flight path 2200 and the actual trajectory 2300 intersect the sub-slave fractal cell 4500 at 4510, 4520 respectively, then the master fractal M may determine that only the sub-slave fractal cell 4500 need to be further fractalized.

FIG. 49 illustrates a representative architecture in block diagram form of an exemplary interface for use in an autonomously traveling vehicle or shuttle, according to an embodiment of the present invention.

FIG. 50 is a flow chart illustrating a high-level process for using the fractalization protocol of FIGS. 48A, 48B, 49, according to one embodiment of the present invention.

In each of the figures described herein, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, the use of a specific sequence of steps is not meant to imply any limitations on the invention. Changes may be made with regards to the sequence of steps without departing from the spirit or scope of the present invention. The use of a particular sequence is therefore, not to be taken in a limiting sense, and the scope of the present invention is defined only by the appended claims.

As it will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As it will be further appreciated, the processes in embodiments of the present invention may be implemented using any combination of software, firmware or hardware. As a preparatory step to practicing the invention in software, the programming code (whether software or firmware) will typically be stored in one or more computer readable storage mediums for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while illustrative embodiments of the present invention are described in the context of a fully functional computer (server) system with installed (or executed) software, those skilled in the art will appreciate that the software aspects of the illustrative embodiments of the present invention are capable of being distributed as a program product in a variety of forms, and that an illustrative embodiment of the present invention applies equally regardless of the particular type of media used to actually carry out the distribution.

In addition, while the present invention has been described with reference to exemplary embodiments, it will be understood by those skilled in the art that various changes may be made and equivalents may be substituted for elements thereof without departing from the scope of the invention. Furthermore, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another. In addition, listing terms such as "a", "b", c", "first", "second", and "third" are used herein and in the appended claims for purposes of description and are not intended to indicate or imply relative importance or significance.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While particular embodiments of the present invention have been disclosed, it is to be understood that various different modifications are possible and are contemplated within the scope of the specification, drawings, abstract and appended claims.

What is claimed is:

1. An interface that autonomously collects input data to control the operation or travel path of an object during travel or flight, the interface comprising:
    at least one sensor that detects the occurrence of an event or a path deviation;
    a master fractal controller that initiates a space-variant fractalization protocol in order to autonomously collect the input data related to the detected occurrence of the event or the path deviation;
    in response to the autonomously collected input data, the master fractal controller sends control signals to control the operation or travel path of the object during travel or flight;
    wherein the master fractal controller initiates the space-variant fractalization protocol by identifying or defining a fractal space;
    wherein the fractal space contains an executable grid that defines a plurality of executable outlines or cells onto a function layer;
    wherein a plurality of individually executable commands or functions are embedded within the plurality of executable outlines or cells;
    wherein an intersection of an executable outline or cell within said plurality of executable outlines or cells, causes a command or function embedded within the intersected executable outline or cell to be executed;
    wherein the sensor derives a data representation from the autonomously collected input data onto a data layer;
    wherein the master controller overlays the data layer and the function layer so that as the data representation within the data layer and at least some of the plurality of executable outlines or cells within the function layer, the data representation intersects the executable grid; and
    wherein the master controller executes the plurality of commands or functions embedded within the intersected executable outlines or cells using the data embedded within the intersected data representation.

2. The interface of claim 1, wherein the master fractal controller identifies or defines a servient controller, and sends the control signals to the servient controller.

3. The interface of claim 2, wherein the master fractal controller further initiates the space-variant fractalization protocol by identifying or defining a sub-fractal space that represents a sub-set of the fractal space in which the servient controller is identified or defined.

4. The interface of claim 3, wherein the master fractal controller further associates a sub-servient controller with the identified or defined sub-fractal space; and
   wherein in response to the input data that is collected within the identified or defined sub-fractal space, the master fractal controller sends control signals to any one or more of the servient controller or the sub-servient controller, for controlling the operation or travel path of the object during travel or flight.

5. The interface of claim 4, wherein the master fractal controller further propagates the space-variant fractalization protocol by identifying or defining at least one sub-sub-fractal space and by associating a sub-sub servient controller with the identified or defined sub-sub-fractal space.

6. The interface of claim 1, wherein the initiated space-variant fractalization protocol includes any one or more of: a dynamic fractalization; an increasing or ascending fractalization; a decreasing or descending fractalization; a selective fractalization; a projected fractalization; a rotating fractalization.

7. The interface of claim 1, wherein the object includes any one or more of: a space shuttle, a fighter; an airplane; a vehicle including a car, a truck, a boat, a drone; a satellite; an asteroid; a munition including a missile, a projectile; a gaming or virtual training console; or an object that is retrofitted with the interface.

8. A method for autonomously collecting input data to control the operation or travel path of an object during travel or flight, the method comprising:
   detecting the occurrence of an event or a travel path deviation;
   a master fractal controller initiating a space-variant fractalization protocol in order to collect the input data related to the detected occurrence of the event or the travel path deviation;
   in response to the collected input data, the master fractal controller sending control signals to a servient controller, for controlling the operation or travel path of the object during travel or flight;
   the master fractal controller initiating the space-variant fractalization protocol by identifying or defining a master fractal space;
   wherein the master fractal space defines an executable function layer;
   wherein the executable function layer defines a plurality of individually executable commands or functions;
   deriving a data representation from the collected input data onto a data layer; and
   causing at least some of the plurality of individually executable commands or functions to be selectively executed using the collected input data onto the data layer.

9. The method of claim 8, wherein the executable function layer includes an executable graphical function layer.

10. The method of claim 8, wherein the data layer includes a graphical data layer.

11. The method of claim 8, wherein the master fractal controller further identifies or defines at least one sub-fractal space having a replicated executable function layer containing the plurality of individually executable commands or functions of the master fractal space.

12. The method of claim 11, wherein the size of any of the master fractal space and said at least one sub-fractal space varies based on the resolution sufficiency of the collected input data.

13. The method of claim 11, wherein the master fractal controller further identifies or defines at least one sub-sub-fractal space having a replicated executable function layer containing the plurality of individually executable commands or functions of the master fractal space; and
   wherein the master fractal controller further determines, estimates, extrapolates, or predicts the flight path of the target based on the commands or functions of the replicated executable function layer that are executed.

14. A non-transitory computer-readable medium comprising instructions which, when executed by a processor that forms part of an interface, cause the processor to perform a plurality of operations for automatically collecting input data to control the operation or travel path of an object during travel or flight, comprising:
   at least one sensor for detecting the occurrence of an event or a travel path deviation;
   a master fractal controller initiating a space-variant fractalization protocol in order for said at least one sensor to collect the input data related to the detected occurrence of the event or the travel path deviation;
   in response to the collected input data, the master fractal controller sends control signals to control the operation or travel path of the object during travel or flight;
   the master fractal controller initiating the space-variant fractalization protocol by identifying or defining a master fractal space that defines an executable function layer having a plurality of executable commands or functions;
   the master fractal controller further initiating the space-variant fractalization protocol by selectively deriving sub-fractal spaces and replicating the plurality of executable commands or functions of the master fractal space for the sub-fractal spaces;
   including the collected input data onto a data layer; and
   causing at least some of the plurality of individually executable commands or functions to be selectively executed using the collected input data onto the data layer.

15. The non-transitory computer-readable medium of claim 14, wherein the master fractal controller identifies or defines at least one sub-servient controller corresponding to one of the sub-fractal spaces, and sends the control signals to said at least one sub-servient controller.

16. The non-transitory computer-readable medium of claim 14, wherein the master fractal controller derives the sub-fractal spaces based on the resolution sufficiency of the input data collected by said at least one sensor.

17. The non-transitory computer-readable medium of claim 16, wherein if the master fractal controller determines that the resolution of the input data collected by said at least one sensor does not provide sufficient resolution for controlling the operation or travel path of the object, then the master fractal controller identifies said at least one sensor that that does not render the sufficient data resolution.

18. The non-transitory computer-readable medium of claim 17, wherein upon the master fractal controller identifying said at least one sensor that that does not render the sufficient data resolution, the master fractal controller selectively derives at least one sub-fractal space and replicates the plurality of executable commands or functions of the master fractal space for said derived at least one sub-fractal space.

19. The non-transitory computer-readable medium of claim 14, wherein the master fractal controller further initiates the space-variant fractalization protocol by spatially segmenting the master fractal space.

20. The non-transitory computer-readable medium of claim 14, wherein the object includes any one or more of: a space shuttle, a fighter; an airplane; a vehicle including a car, a truck, a boat, a drone; a satellite; an asteroid; a munition including a missile, a projectile; a gaming or virtual training console; or an object that is retrofitted with the interface.

\* \* \* \* \*